(12) United States Patent
Mathers

(10) Patent No.: US 12,276,248 B2
(45) Date of Patent: Apr. 15, 2025

(54) RIVER VENTURI POWER AMPLIFICATION, STORAGE AND REGENERATION SYSTEM AND METHOD

(71) Applicant: Mathers Hydraulics Technologies Pty Ltd, Bridgeman Downs (AU)

(72) Inventor: Norman Ian Mathers, Brisbane (AU)

(73) Assignee: Mathers Hydraulics Technologies Pty Ltd, Bridgeman Downs (AU)

( * ) Notice: Subject to any disclaimer, the term of this patent is extended or adjusted under 35 U.S.C. 154(b) by 307 days.

(21) Appl. No.: 17/860,842

(22) Filed: Jul. 8, 2022

(65) Prior Publication Data

US 2023/0026500 A1 Jan. 26, 2023

Related U.S. Application Data

(60) Provisional application No. 63/289,415, filed on Dec. 14, 2021, provisional application No. 63/264,480, filed on Nov. 23, 2021, provisional application No. 63/221,766, filed on Jul. 14, 2021.

(51) Int. Cl.
*F03B 17/00* (2006.01)
*F03B 17/06* (2006.01)
*H02K 7/18* (2006.01)

(52) U.S. Cl.
CPC ........ *F03B 17/061* (2013.01); *F05B 2240/97* (2013.01); *H02K 7/1823* (2013.01)

(58) Field of Classification Search
CPC ...... F03B 17/061; F03B 17/062; F03B 13/00; F03B 3/121; F03B 3/18; F03B 11/02; F05B 2240/97; F05B 2240/133; F05B 2260/421; F05B 2260/422; F05B 2240/40; F05B 2260/406; F03D 1/0675; F03D 13/20; F03D 80/00; H02K 7/1823
See application file for complete search history.

(56) References Cited

U.S. PATENT DOCUMENTS

| 1,760,632 | A | 5/1930 | Cooper |
| 6,109,863 | A | 8/2000 | Milliken |
| 11,060,500 | B2 | 7/2021 | Chen et al. |
| 2007/0231117 | A1 | 10/2007 | Gokhman |

(Continued)

FOREIGN PATENT DOCUMENTS

| CN | 115614205 | | 1/2023 |
| CN | 117989044 | A | 5/2024 |

(Continued)

OTHER PUBLICATIONS

"European Application Serial No. 22183925.1, Decision to Grant a European Patent Pursuant to Article 97(1) EPC mailed May 24, 2024", 3 pgs.

(Continued)

*Primary Examiner* — Julio C. Gonzalez
(74) *Attorney, Agent, or Firm* — Schwegman Lundberg & Woessner, P.A.

(57) ABSTRACT

Methods, systems and apparatuses including systems and methods that can be used for operating a hydrokinetic turbine such as along one or more flow channels of a river for power generation is disclosed. The hydrokinetic turbine can be positioned within the one or more flow channels or can be shaped to form one or more flows and can be turned by the flow of the river.

12 Claims, 65 Drawing Sheets

(56) References Cited

U.S. PATENT DOCUMENTS

| | | | | |
|---|---|---|---|---|
| 2009/0314353 A1* | 12/2009 | Vasshus | ............... | F03B 13/00 418/104 |
| 2013/0067899 A1 | 3/2013 | Mathers | | |
| 2013/0069369 A1 | 3/2013 | Salehpoor | | |
| 2014/0265335 A1 | 9/2014 | Andreis et al. | | |
| 2018/0298881 A1* | 10/2018 | Mathers | ............... | F03D 9/25 |
| 2020/0132041 A1 | 4/2020 | Chen et al. | | |
| 2024/0151205 A1 | 5/2024 | Mathers | | |

FOREIGN PATENT DOCUMENTS

| | | |
|---|---|---|
| EP | 4119789 B1 | 6/2024 |
| ES | 2792178 A1 | 11/2020 |
| GB | 1150873 A | 5/1969 |
| GB | 2029906 A | 3/1980 |
| IN | 202214038888 A | 1/2024 |
| IN | 202314074537 A | 5/2024 |
| WO | 2005005782 | 1/2005 |
| WO | 2006119574 | 11/2006 |
| WO | 2007140514 | 12/2007 |
| WO | 2017066826 | 4/2017 |
| WO | 2020215118 | 10/2020 |

OTHER PUBLICATIONS

"European Application Serial No. 23205927.9, Notification to Pay Further Search Fee (Rule 64) mailed Apr. 15, 2024", 10 pgs.

"European Application Serial No. 22183925.1, Extended European Search Report mailed Mar. 9, 2023", 11 pgs.

"Low Head Hydro", VerdErg Renewable Energy Limited, [Online]. Retrieved from the Internet: URL: https: www.verderg.com, (Accessed Jun. 23, 2023), 3 pgs.

"European Application Serial No. 22183925.1, Response filed Sep. 8, 2023 to Extended European Search Report mailed Mar. 9, 2023", 30 pgs.

"European Application Serial No. 22183925.1, Notification to Pay Further Search Fee mailed Dec. 5, 2022", 12 pgs.

"U.S. Appl. No. 18/496,524, Non Final Office Action mailed Sep. 30, 2024", 13 pgs.

"European Application Serial No. 23205927.9, Extended European Search Report mailed Sep. 18, 2024", 13 pgs.

"European Application Serial No. 24176393.7, Office Action mailed Sep. 30, 2024", 15 pgs.

* cited by examiner

600 ⇘

602
Adjusting a power split transmission coupling to transfer substantially all torque from a turbine rotor to a generator by working a hydraulic fluid, wherein the generator converts mechanical power to electrical power

↓

604
Diverting the hydraulic fluid at high pressure from the power split transmission coupling in response to the electrical power produced by the generator exceeding a threshold to maintain the electrical power produced by the generator at or below the threshold

↓

606
Storing the hydraulic fluid diverted from the power split transmission coupling under high pressure in a storage vessel

↓

608
Introducing the hydraulic fluid stored at high pressure to a hydraulic motor in response to the generator producing below threshold electrical power, the hydraulic motor operatively coupled to the generator and configured to transmit mechanical power to the generator for electrical power generation

FIG. 6

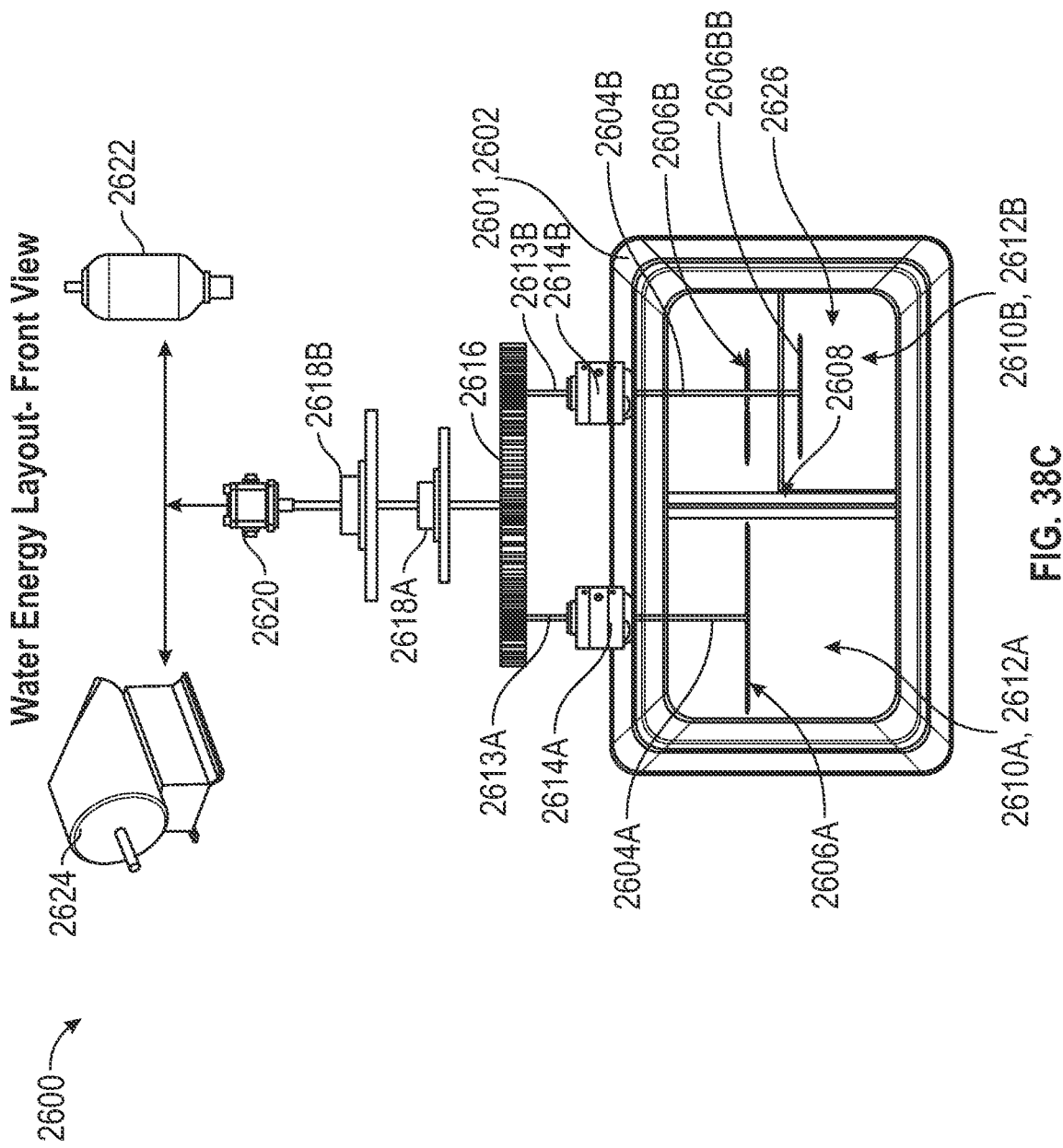

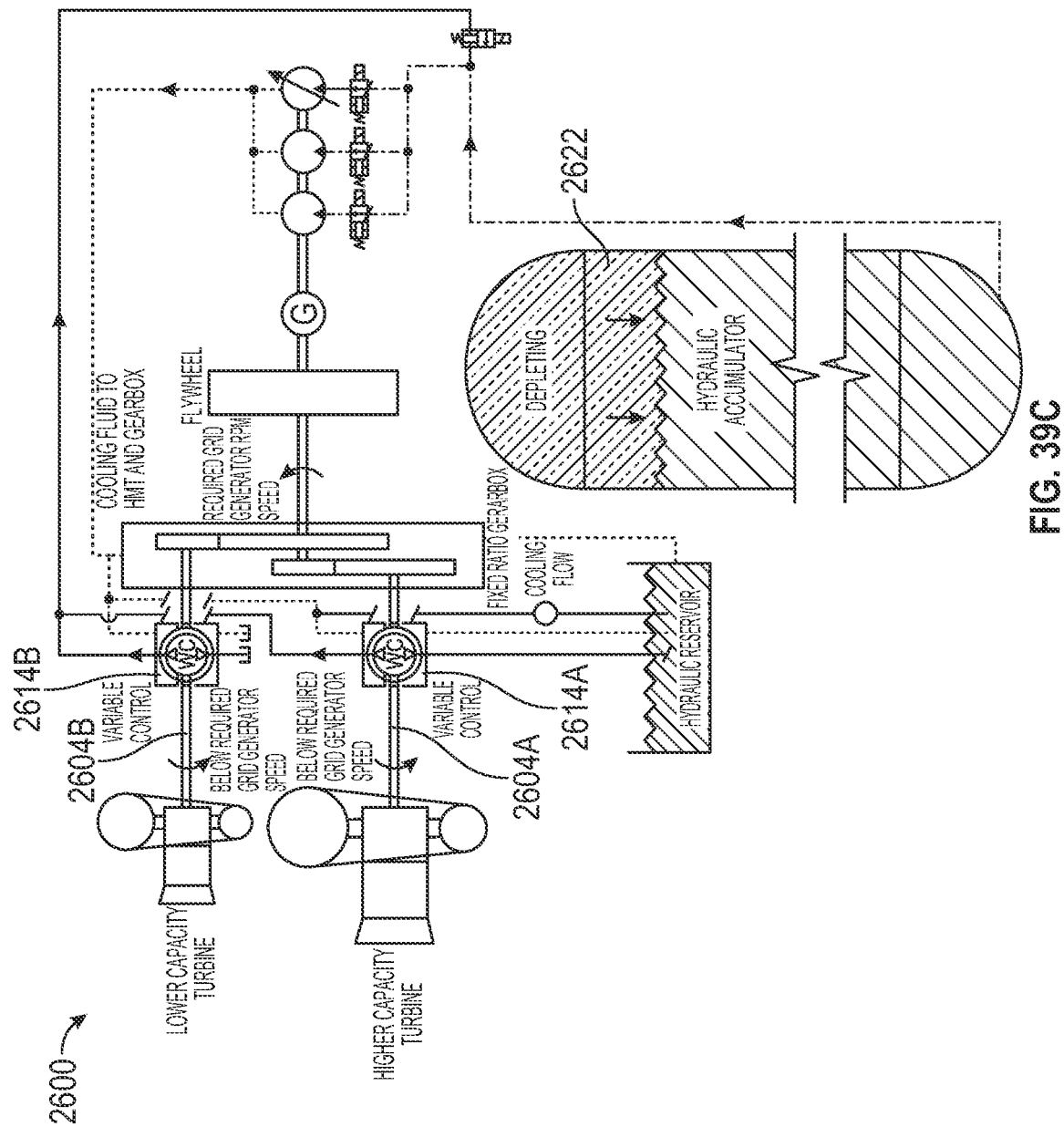

RIVER VENTURI POWER AMPLIFICATION, STORAGE AND REGENERATION SYSTEM AND METHOD

CROSS REFERENCE TO RELATED APPLICATIONS

The present application claims the benefit of priority to U.S. Provisional Patent Application Ser. No. 63/221,766, filed Jul. 14, 2021, U.S. Provisional Patent Application Ser. No. 63/264,480, filed on Nov. 23, 2021, and U.S. Provisional Patent Application Ser. No. 63/289,415, filed Dec. 14, 2021, which are incorporated by reference herein.

The present application is related to international application no. PCT/AU2016/050967, publication no. WO/2017/066826, United States publication no. US/2018/0298881, entitled "Turbine Power Storage and Regeneration" filed Oct. 14, 2016; international application no. PCT/AU2007/000772, publication no. WO/2007/140514, entitled "Vane Pump for Pumping Hydraulic Fluid," filed Jun. 1, 2007; international application no. PCT/AU2006/000623, publication no. WO/2006/119574, entitled "Improved Vane Pump," filed May 12, 2006; international application no. PCT/AU2004/00951, publication no. WO/2005/005782, entitled "A Hydraulic Machine," filed Jul. 15, 2004; U.S. patent application Ser. No. 13/510,643, publication no. U.S. 2013/0067899, entitled "Hydraulically Controlled Rotator Couple," filed Dec. 5, 2012; and international application no. PCT/AU2020/050389, publication no. WO 2020/215118, entitled RIVER POWER HARNESSING, STORAGE AND REGENERATION SYSTEM AND METHOD filed Apr. 22, 2020, the entire specification of each of which is incorporated herein by reference in entirety.

TECHNICAL FIELD

This document pertains generally, but not by way of limitation, to systems and techniques for power generation and power regeneration by harnessing river energy.

BACKGROUND

Current systems for power generation can include a turbine to harness river and/or wind energy for conversion to electrical power. River current has been used for centuries to perform various tasks. Turbines such as those used with dams are known. However, off flow from dams varies based upon the height of the water behind the dam. Off flow from the dam may be shut down for substantial periods of time if the height of the water behind the dam is low. Existing wind turbines can include a nacelle mounted atop of a tower. The nacelle can include, for example, a gearbox, electrical generator, controller, and components for orienting the turbine. The wind turbines can generally include a rotor coupled to the electrical generator through the gearbox. The rotor can include a plurality of blades configured to generate a torque on the rotor in response to an applied loading. Electrical power can be produced by the generator in response to the torque of the rotor.

Many turbine systems include a gearbox and/or a mechanical brake for reducing the energy input to the generator, for instance, to prevent the generator from exceeding a maximum power rating. In one example, the total power input into an electrical grid must be substantially equal to the total electrical demand on the system in order to maintain a desired frequency of the electrical grid. Accordingly, existing turbines can reduce the energy input into the generator (by the application of mechanical brakes, adjusting the gear ratio of the gearbox, or adjusting the pitch of the turbine blades) to prevent an increase in frequency of the electrical grid. As a result, some turbines fail to convert the full potential of wind energy into electrical power when the energy input exceeds the maximum power rating of the generator.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 6 is a method of operating a turbine including power split transmission coupling with a power regeneration mode, according to an embodiment.

FIG. 38C is a plan view of a front end of the water flow capturing apparatus and also showing other components of the system of FIG. 38A.

FIG. 39C is a schematic diagram of the system of FIG. 39A during a regeneration (discharging) mode of operation.

DETAILED DESCRIPTION

Figure 1:
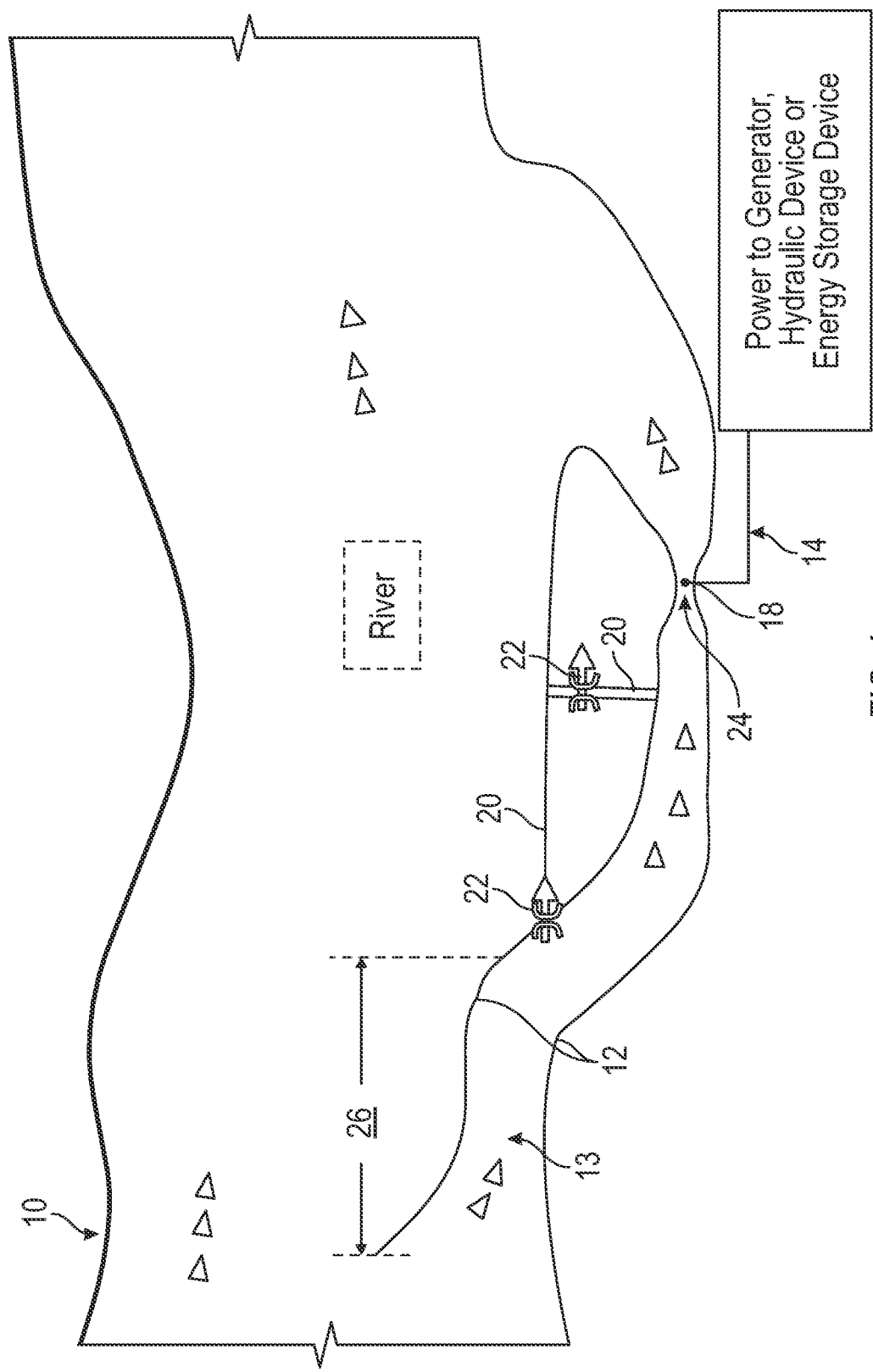
FIG. 1 is a highly schematic view of a modified river and one or more flow channels configured as venturi to concentrate river flow adjacent/through/along a modified river bank (or other structure) along with a power system including one or more hydrokinetic turbines.

The present application relates to systems and techniques for turbine power storage and regeneration using river energy. As used herein the term "turbine" unless otherwise described can connote either a wind turbine or a hydrokinetic turbine. The following detailed description includes examples intended to be illustrative of the subject matter disclosed herein and are in no way intended to be limiting. Features and steps described in relation to one or more examples may be combined with the subject matter of other examples and methods provided in this disclosure. The following examples are sufficient to enable one of skill in the art to practice the systems and techniques described in the following detailed description.

The present inventor has recognized, among other things, that a problem to be solved can include inconsistency of reliance on green energy power such as hydrokinetic power, wind power or other renewable energy source alone (with wind—lack of such wind or high gusts can limit generation opportunities). The present inventor has further recognized, among other things, river energy is a predictable, reliable largely untapped energy source that can be used to supplement other forms of power (wind, wave, solar, etc.).

The present inventor also recognizes that rivers provide potential untapped power generating sites. The present inventor further recognizes rivers, and in particular, the banks, flow courses and other features thereof, could be modified to facilitate turbine energy capture for power generation. For example, flow channels (also referred to as funnels or tunnels) could be fabricated by modifying the river bank with heavy machinery. Alternatively, such tunnels could be drilled in rock or formed of concrete so as to pass through obstacles such as hills, mountains or islands. These tunnels could have various locations along the river bank and could extent through obstacles if necessary. Turbines could be placed in various locations along (and within) the tunnels. Advantageously, the tunnels can be constructed in the shape of venturi tubes for highly efficient concentration of river flow to higher velocity if needed. The turbines, and indeed hydrokinetic turbines and other devices disclosed herein can be combined with a power system as will be discussed in further detail subsequently in the remainder of this application. It should be noted that although river power generation and/or regeneration systems can be utilized in combination with wind turbines and other devices, according to many embodiments supplementing river power generation with wind power generation is not necessary. The hydrokinetic power and other regeneration systems discussed in reference to FIGS. 1E-45A exemplify systems, apparatuses and principles that could be used with river power generation and/or regeneration systems. Thus, rather then wind turning the blades of one or more wind turbines, water such as river flow would turn the blades of one or more hydrokinetic turbines. Other aspects and components of the power and other regeneration systems discussed in reference to FIGS. 1E-45A could be maintained and utilized with the river power generation and/or regeneration systems discussed herein.

In some cases, power generated by the turbines (whether water, wind or a combination of both) can be stored as energy in accumulators. In yet further embodiments, modifications to the flow channel, such as terraforming of the bank to modify the shape of the flow channel to concentrate river flow are contemplated. Such modifications of the flow channel can include creating convoluted channel shapes (e.g., a restriction, a more open section followed by a second restriction). Further concepts include the use of position adjustable flow control valves that allow flow of water to be precisely controlled to bypass the turbines such that water flow passing the turbine has a desired velocity. In instances of high river volume, flow control valve(s) can be opened to reduce flow volume and slow the flow velocity within the flow channel upon reaching the turbine.

The present inventor also recognizes further apparatuses and systems that do not necessitate the river bank, flow course, etc. be modified for power generation. Examples of this apparatus and system are provided in FIGS. 33-45A. According to these examples, the present inventor recognizes a man-made venturi apparatus can be constructed of metal, plastic, concrete or other suitable material. Thus, the venturi apparatus could be formed as a pipe, tunnel or other construct. This venturi apparatus can be placed within the river, such as seated on the river bottom or suspended in the river flow stream. This venturi apparatus allows river flow to enter the apparatus, pass therethrough into a venturi section and exit the apparatus. The river flow stream can turn one or more turbines within the venturi section as further discussed and illustrated in FIGS. 33-45A.

With regard to wind gusts or rapid water flow velocity that occur causing overspeed conditions, it is understood that these can fluctuate in velocity and volume. Similarly, river current (referred to a flow herein) can fluctuate in velocity and volume. The inventor recognizes limiting the power captured by a turbine rotor where rotor speeds exceed a rated speed (max power rating) of an electrical generator within the turbine, such as for generating electrical power. The present subject matter can help provide a solution to this problem, for instance, by including a power split transmission coupling within the turbine system. The systems and methods disclosed herein can store energy during a period of turbine rotor velocity is low or to fast (exceeding the rated speed of the generator). During periods of rotor velocity below the rated speed, the system can operate in a regeneration mode. For instance, the turbine can include one or more motors or flywheels operatively coupled to the generator. Previously stored energy can be applied to the motor or one or more flywheels for increasing power generation during periods of below rated speed operation.

In an example, an energy system can include one or more turbine rotors. The turbine rotor can include one or more blades attached to the turbine rotor. The blades can be configured to produce a rotor torque on the rotor in response to a river loading applied to the blades. For instance, the blades can include an airfoil shape to rotate the turbine rotor in response to river loading. A power split transmission coupling can be operatively coupled to the turbine rotor by an input shaft and to a generator by an output shaft. The power split transmission coupling can be configured to transmit the rotor torque to the output shaft at an adjustable torque ratio of the input shaft. The power split transmission coupling can divert hydraulic fluid in response to the output shaft exceeding a threshold power, torque, or angular velocity. By diverting hydraulic fluid, the power transmitted to the generator, and accordingly the power produced by the generator can be adjusted.

A hydraulic fluid storage vessel can be configured to store the diverted hydraulic fluid under pressure. The turbine system can include at least one hydraulic motor. The hydraulic motor can include a motor output configured to receive the hydraulic fluid stored under pressure and generate a torque on the motor output in response. The generator can be operatively coupled to the output shaft and the motor output to produces electrical power in response to at least one of: torque applied by the output shaft, torque applied by the motor output, or both.

In an example, the power split transmission coupling includes an input shaft coupled to the turbine rotor. The input shaft can rotate in response to the rotor torque. The output shaft can rotate at an output speed. The power split coupling can include a cam ring and a hub disposed between the input shaft and the output shaft. A hydraulic fluid can be disposed between the cam ring and the hub. The hub can include a plurality of circumferentially spaced slots configured to house a plurality of vanes therein. The vanes can be configured to be movable, such as between a retracted position, a fully extended position, or any partially extended position therebetween. In the retracted position, the input shaft is independently rotatable with respect to the output shaft. In the one or more extended positions, the plurality of vanes are configured to work the hydraulic fluid and transmit torque from the input shaft to the output shaft at an adjustable torque ratio. The power split transmission coupling includes an inlet port communicatively coupled to a hydraulic fluid source. The hydraulic fluid can be transported from the hydraulic fluid source to the power split transmission coupling. The power split transmission coupling can include an outlet port having a closed configuration and an at least partially open configuration. The hydraulic fluid can be released from the power split transmission coupling through the outlet port in response to a power applied to the output shaft exceeding a threshold power. The released hydraulic fluid can exit the power split transmission coupling and can be stored under pressure.

River flow and/or wind conditions can be inconsistent, in an example, the power split transmission coupling can transmit a constant power to the generator during inconsistent river and/or wind conditions by adjusting the volume of hydraulic fluid diverted from the power slit transmission coupling. For instance, the power split transmission coupling can reduce river and/or wind jitter effects on the turbine system. The power split transmission coupling can operate at high volumetric efficiency thereby increasing the efficiency of power generation. In an example, mechanical braking or turbine blade adjustments may need to be applied in order to prevent the generator from receiving more than the maximum rated power. By diverting hydraulic fluid from the power split transmission coupling, the application of mechanical braking or the feathering of the turbine blades is unnecessary to prevent the generator from exceeding the maximum rated power.

In an example, the turbine can be operated in a power generation cycle and in a regeneration cycle. In the power generation cycle, the power split transmission coupling can be adjusted (e.g., by a computer controller) to transfer substantially all torque from the turbine rotor to the generator by working the hydraulic fluid. In response, the generator can convert mechanical power to electrical power. The power split transmission coupling can divert the hydraulic fluid at high pressure from the power split transmission coupling in response to the electrical power produced by the generator exceeding the threshold power. Diverting the hydraulic fluid can maintain the electrical power produced by the generator at or below the threshold. The hydraulic fluid diverted from the power split transmission coupling under high pressure can be stored in a storage vessel. In a regeneration cycle, the hydraulic fluid stored at high pressure can be introduced to a hydraulic motor in response to the generator producing below threshold power. The hydraulic motor can be configured to transmit mechanical power to the generator for electrical power generation. As a result, the generator can operate at or closer to maximum power output for a higher percentage of the life of the generator. For instance, river flow and/or wind conditions may not facilitate full power operation of the turbine during all periods of operation. The turbine can operate closer to the maximum operational power or maximum efficiency as a result of the regeneration mode.

It should be understood by one of ordinary skill in the art that the power applied to the generator is a function of the rotational speed of the generator rotor as well as the torque applied to the generator rotor and the electrical power load of the generator. Accordingly, one of ordinary skill would appreciate that examples discussed herein including electrical power or mechanical power terms can include examples of corresponding rotational speed, power, or torque. For instance, a system configured to operate below a threshold power can also include an equivalent example of the same system configured to operate below a threshold rotor speed corresponding to the threshold power value for a given system.

FIG. 1 shows a man-modified river 10 having a modified bank 12 with an exemplary shape that funnels and magnifies river flow along a flow channel 13. The shape of the flow channel 13 and bank 12 shown is exemplary and is contemplated to be more exaggerated. The shape can differ from the shape illustrated. Portions of the bank 12 may or may not be modified by human activity according to some examples. In some cases, the bank 12 may not be modified by human activity and other structures (e.g. concrete barriers, wood, etc.) can be utilized to form the flow channel 13. The flow channel 13 can be formed of natural materials (e.g., sand, rock, etc.) that formed the river bank or adjacent area or can be constructed of another material that is man-made or man-modified for example. In FIG. 1, the river bank 12 has been modified to the serpentine shape having a reduced cross-sectional region or regions in order to better magnify river flow. The modified river 10 includes a power system 14 that communicates with power systems such as a power grid, battery station, etc. The power system 14 can include one or more turbines 18 and optionally can further include one or more wind turbines, one or more power split couplings, one or more wave power generators, etc.

As shown in FIG. 1, the modified bank 12 can position the flow channel 13 with an inlet advantageously positioned relative to the directions of water flow (current indicated by arrows). The flow channel 13 can be shaped to funnel and magnify river flow to the turbine(s) 18. One or more bypass channels 20 can be formed in the bank 12 or river floor along the flow channel 13. The one or more bypass channels 20 can comprise tunnels or other type of flow diverter, for example. These bypass channels 20 can include one or more flow control valves 22. Flow control valves 22 can be position adjustable to be selectively opened, partially closed and fully closed to control the volume (and hence speed) of flow along the flow channel 13 to the water turbine 18. Opened or partially closed flow control valves 22 can bypass an amount of the flow away from the water turbine(s) 18 as desired such as back to the main river. The locations for the one or more bypass channels 20 is purely exemplary and other locations are contemplated. The one or more bypass channels 20 can be man-made (e.g., formed of metal, concrete or another material not native to the river) or can be shaped from natural materials native to that location such as rock, sand, etc.

It should be noted that flow channel 13 can be formed from and along the river bottom using pipe, tunnel or other material(s) rather than being formed from the river bank 12 in some cases. The flow channel 13 can be submerged within the river, and indeed, can be below the river surface in some cases.

According to the example of FIG. 1, the one or more flow channels 13 can be shaped with at least one section configured as venturi tube 24. This shape can facilitate highly efficient river flows that are steady and reliable plus the shape can delay river flow so that it occurs less rapidly than would otherwise be the case (a time delay being over hours, minutes, etc.) in a natural setting or with a non-venturi tube shaped passage. The turbine(s) 18 may be positioned within the one or more flow channels 13 or closely adjacent thereto (within a few hundred meters of an entrance/exit). It is contemplated that the one or more turbines 18 can be positioned at any position and any number within the extent of the one or more flow channels 13 as is practically feasible. However, if possible, it can be advantageous to place at least one of the one or more turbines 18 at the most restricted point in the flow channel 13 where the river flow would have a greatest velocity such as at, within or just downstream of the venturi tube 24. Further turbines 18 can be placed in other locations within or adjacent the flow channel 13.

The one or more flow channels 13 can include an initial inlet section 26. This inlet section 26 can project out into or toward a mainstream of the river 10 and can have a length and orientation as desired to capture adequate flow and maintain the velocity of the captured flow. The length of this section can be adjustable in some cases depending on the volume and velocity of the main flow of the river. The inlet section 26 can be formed of natural materials (e.g., sand, rock, etc. from the river bank 12) or can be man-made as desired.

The one or more turbines 18 can be constructed in the manner described in the subsequent FIGS., for example. The one or more turbines 18 can include blades for capturing load of water as known in the art. Likewise, the power system 14 can be constructed in the manner described in subsequent of the FIGS. and can include a hydraulic power system as will be discussed in further detail subsequently. In some cases, the power system 14 can include other sources of power generation including for hydraulic power generation in parallel or series with the one or more turbines 18. This can include wind turbines and other power generation sources. However, such supplemental sources of power generation are not necessary and are optional.

Figure 1A:
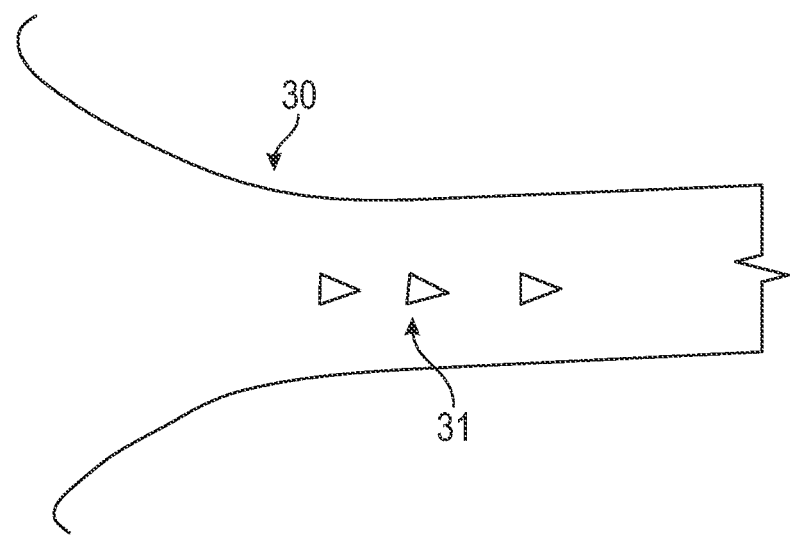
FIG. 1A is a highly schematic view of a portion of one of the flow channels designed to capture and magnify river flow.

FIG. 1A provides a high-level schematic of a flow channel 30. This flow channel 30 can be shaped as a funnel and can be located mid-stream, along a hank or in another location along the river. The flow channel 30 can be shaped to magnify and funnel the flow of water along the low channel 30. This shape can increase the velocity of the river flow in a restricted region 31 where flow is relatively more restricted as compared with an inlet of the flow channel 320 as indicated with arrows. As shown in FIG. 1A, the flow channel 30 does not necessarily include a venturi.

Figure 1B:
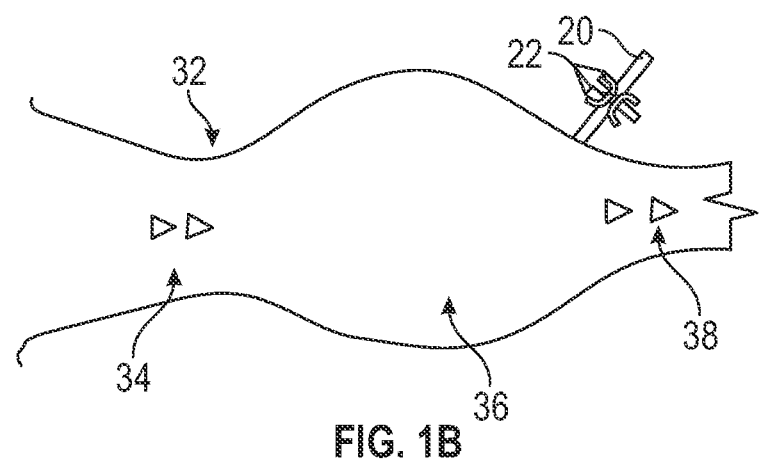
FIG. 1B is a highly schematic view of a portion of a second one of the flow channels designed to capture and magnify river flow.

FIG. 1B shows another example of a flow channel 32. The flow channel 32 can have a convolute shape and include at least two restriction sections where the flow of the river through the flow channel 32 is relatively more restricted and at least one pool section where the flow of the river is relatively less restricted as compared to the flow in that at least two restriction sections. Thus, the flow channel 32 includes a first restriction region 34, a pool or non-restricted region 36 and a second restriction region 38. As shown, the restriction regions 34 and 38 can be shaped to magnify and funnel the flow of water along the river. This shape can increase the velocity of the river flow in the restricted regions 34 and 38 as indicated with arrows. The pool 36 can comprise a reservoir where flow velocity decreases relative to the flow velocity of the restricted regions 34 and 38.

For simplicity, the one or more bypass channels 20 and flow control valve(s) 22 are shown a high level in FIG. 1B and comprise through-bank tunnels. Turbines and other features of the power system 14 shown in FIG. 1 are not specifically illustrated in FIGS. 1A and 1B with the recognition that the flow channels 30 and/or 32 would each contain at least one turbine or have a turbine positioned closely adjacent thereto as discussed in reference to FIG. 1. According to some examples, the one or more bypass channels 20 can be gated or otherwise closed (together or sequentially) such as by using the flow control valve(s) previously discussed. By gating or otherwise closing or opening bypass channels 20 as desired, this can reduce/delay/control/increase flow volume and flow velocity within the flow channel reaching the one or more turbines as desired.

Figure 1C:
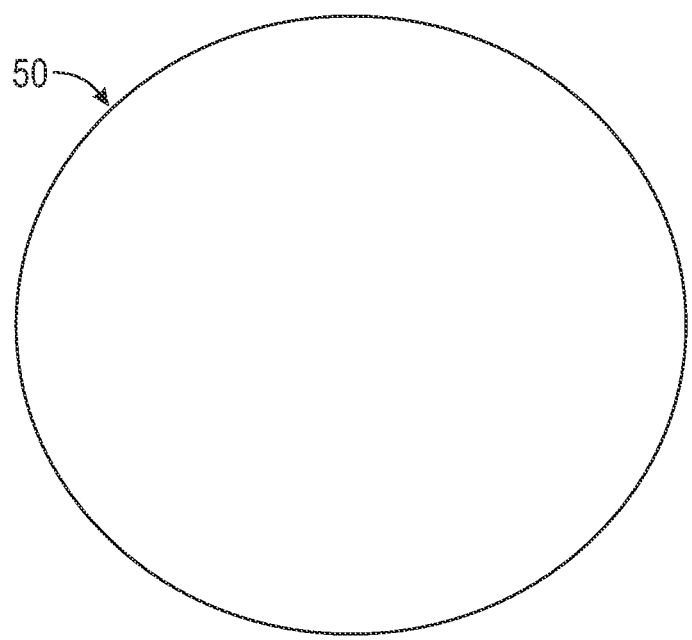
FIG. 1C is a cross-sectional view of one example of the flow channel.
Figure 1D:
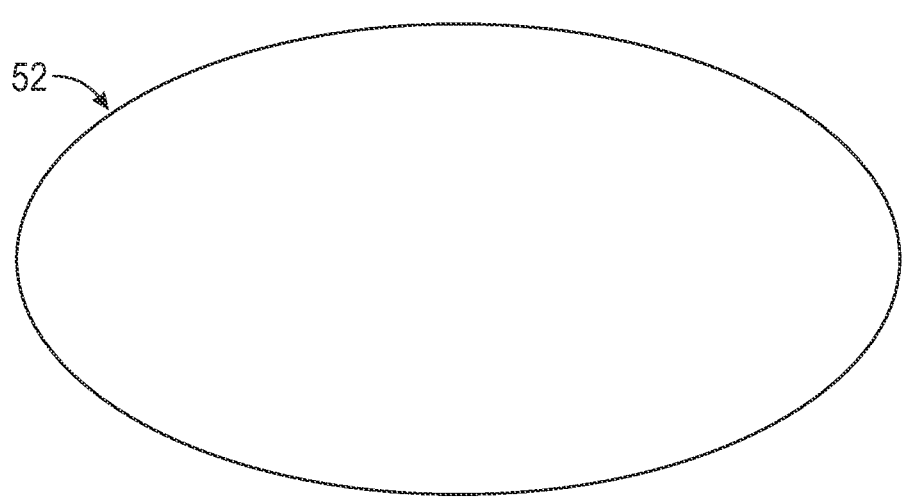
FIG. 1D is a cross-sectional view of another example of the flow channel.

FIG. 1C shows a cross-sectional view of a flow channel 50 that can comprise any of the flow channels previously discussed. Flow channel 50 can be provided with a generally circular shape in cross-section such as desirable for use in deeper water sections. FIG. 1D shows a cross-sectional view of a flow channel 52 that can be any of the flow channels previously discussed. Flow channel 52 can be provided with an oval shape in cross-section. This oval shape in cross-section can be desirable in regions of shallow water.

It should be understood that the size (e.g., volume and diameter) of the flow channels 50, 52 and 13 is purely exemplary in the FIGS. A careful study should be undertaken to properly size the channels (e.g., provide for a proper cross-sectional area and volume) relative to the characteristics (speed, volume flow rate, mass flow rate) of the main river flow such that inertia of the water passing through the channels 50, 52 and 13 can be maintained or is not substantially reduced before passing to the turbine(s).

Figure 1E:
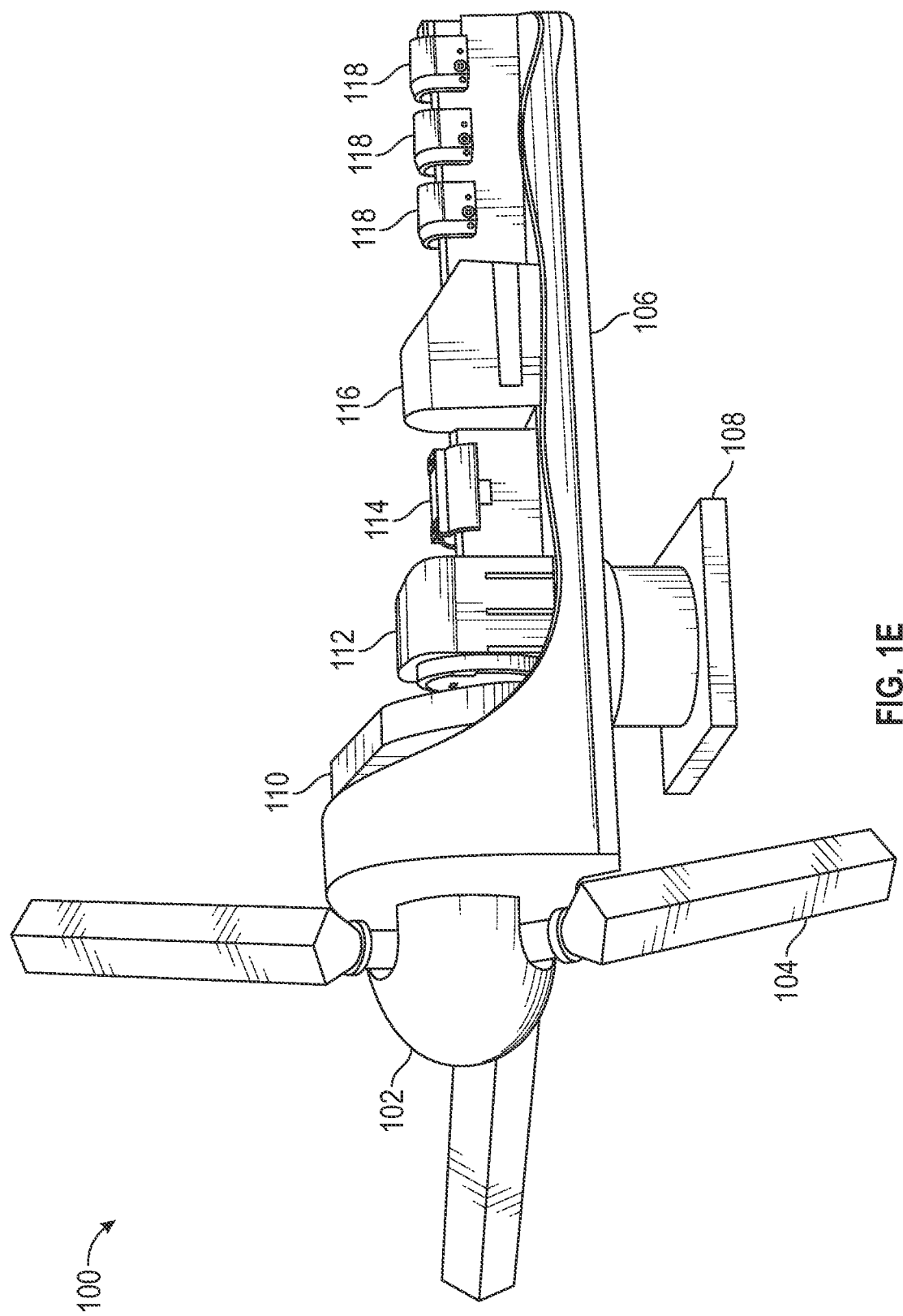
FIG. 1E is a perspective view of a turbine according to one embodiment.

FIG. 1E shows a perspective view of an exemplary turbine 100, which can be either a hydrokinetic turbine or wind turbine. The turbine 100 (or modifications thereof as known in the art or discussed herein) can be utilized with the systems and apparatuses of FIGS. 1-1D and FIGS. 2-45A. Thus, the turbine 100 is merely exemplary of one possible turbine that could be utilized with the apparatuses and systems discussed herein.

Figure 3:
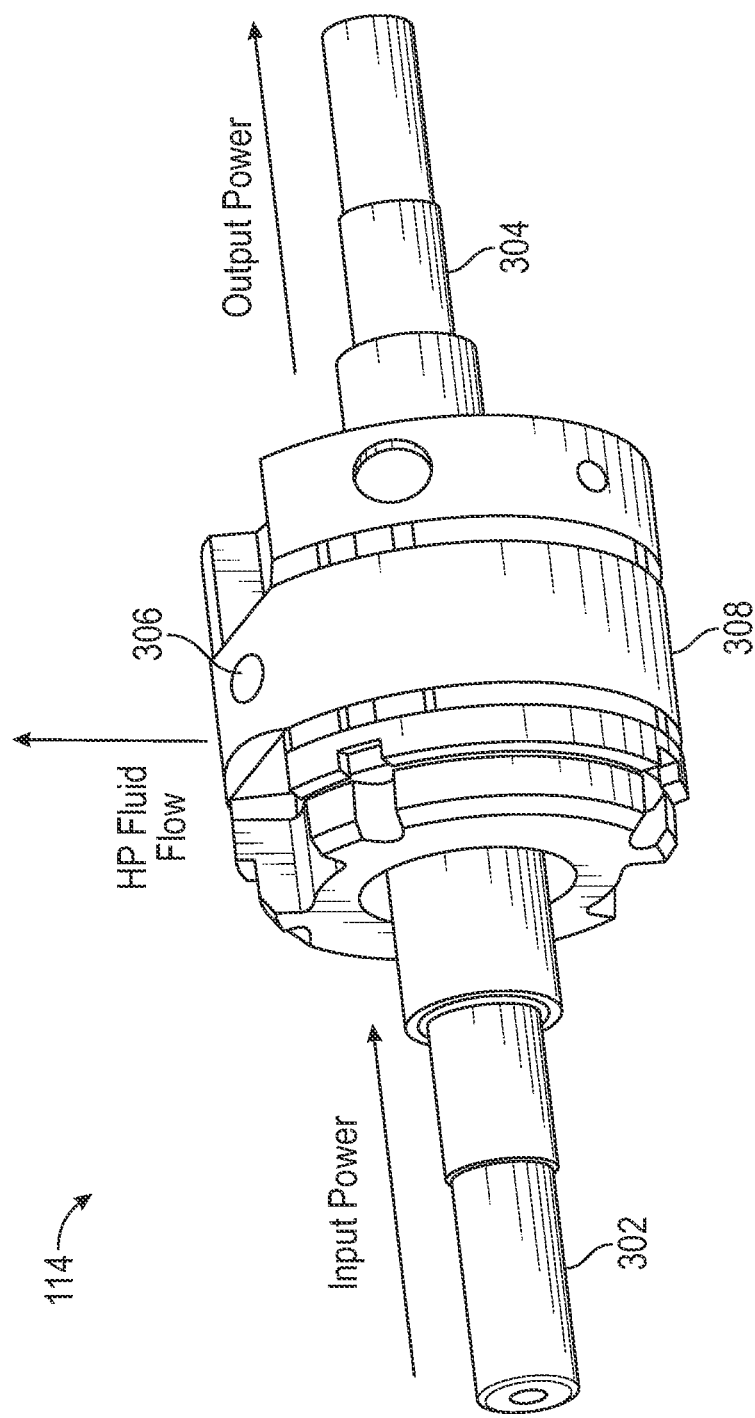
FIG. 3 is a perspective view of a variable power split transmission coupling according to an embodiment.

In FIG. 1E, the turbine 100 can include a turbine rotor 102 and at least one turbine blade 104. The turbine blade 104 can be rotatably coupled to the turbine rotor 102. For instance, the turbine blade 104 can include an airfoil shape and the pitch of the airfoil with respect to a river flow can be adjustable. The turbine rotor 102 can be mounted to a nacelle 106, for example, by a bearing 110. A tower 108 can support the nacelle 106 in the river at a location sufficiently above the ground to provide clearance for rotation of the turbine blades 104. The nacelle 106 can house, and also support in some examples, a gearbox 112, a power split transmission coupling 114, a generator 116, and at least one hydraulic motor 118. The turbine blade 106 can generate a torque in response to a river loading and transmit that torque to the turbine rotor 102. The turbine rotor 102 can transmit the torque generated by the turbine blade 104 to the generator 116. Electrical power can be produced by the generator 116 in response to the application of torque to a generator rotor 120 resulting in a rotation of the generator rotor within a stator of the generator 116. The turbine rotor 102 can be coupled to the generator 116 by one or more linkages (rotary shafts). The gearbox 112 and the power split transmission coupling 114 can be operatively coupled to the one or more linkages between the turbine rotor 102 and the generator 116. For instance, the turbine rotor can include a turbine rotor shaft. The gearbox 112 can include an input coupling attached to the turbine rotor shaft and an output coupling. The gearbox 112 can include one or more sprockets and gears arranged to rotate the output coupling at a speed corresponding to a ratio of the rotational speed of the input coupling (i.e., the turbine rotor shaft). In other words, the gearbox 112 can rotate the output coupling at a faster, slower, or equal speed of the turbine rotor shaft. The one or more linkages can further include an input shaft 122 of the power split transmission coupling 114 (as shown in FIG. 3 and described herein). The power split transmission coupling 114 can divert hydraulic fluid under high pressure to a storage vessel. The hydraulic fluid stored under high pressure can be used for auxiliary power purposes including, but not limited to, supplying high pressure hydraulic fluid to a hydraulic motor 118 for power generation or regeneration, pumping fluid, supplying cooling fluid to components of the turbine 100, or the like.

Figure 4:
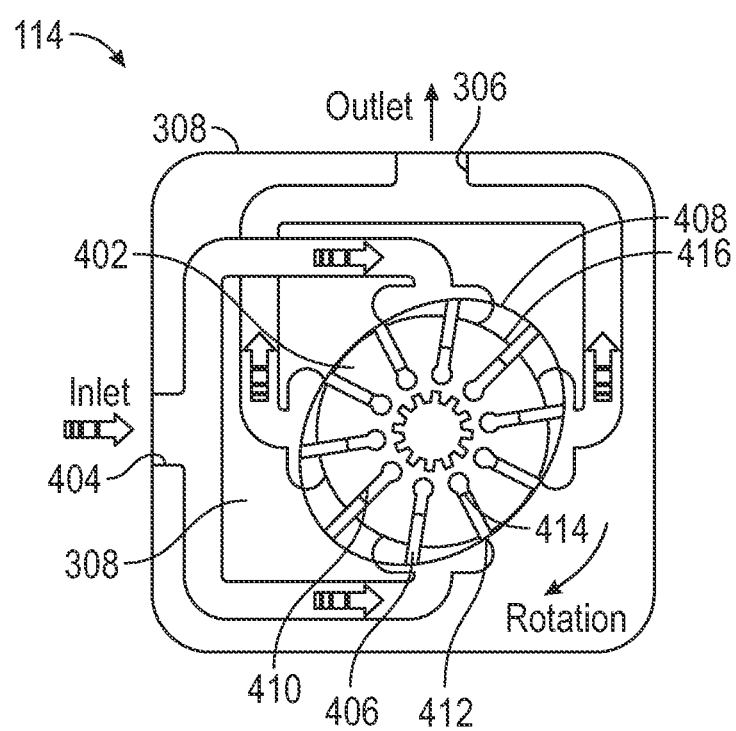
FIG. 4 is a cross section view of an exemplary power split transmission coupling.

The hydraulic motor 118 can also be coupled to the generator rotor 120 for supplying increased torque and power to the generator 116. In the example of FIG. 1, the turbine 100 includes three hydraulic motors 118 and one of the hydraulic motors 118 is capable of operating at a variable displacement. In an example, a plurality of hydraulic motors 118 can be more efficient than a single larger hydraulic motor 118. For instance, where the maximum power output of the hydraulic motor 118 can exceed the maximum power of the generator 116, the hydraulic motor 118 can be de-stroked to operate at lower than maximum capacity. Some hydraulic motors 118 operate less efficiently when de-stroked. The greater the degree of de-stroking, the less efficient the hydraulic motor 118 can operate. In an example, the hydraulic motor 118 can include a similar design to the power split transmission coupling 114 (as shown in FIGS. 3 and 4 and described herein). Instead of diverting hydraulic fluid to reduce the torque delivered to the generator 116, the hydraulic motor 118 can produce torque on the generator rotor 120 in response to the application high pressure hydraulic fluid to the hub and vanes of the hydraulic motor 118.

Figure 2:
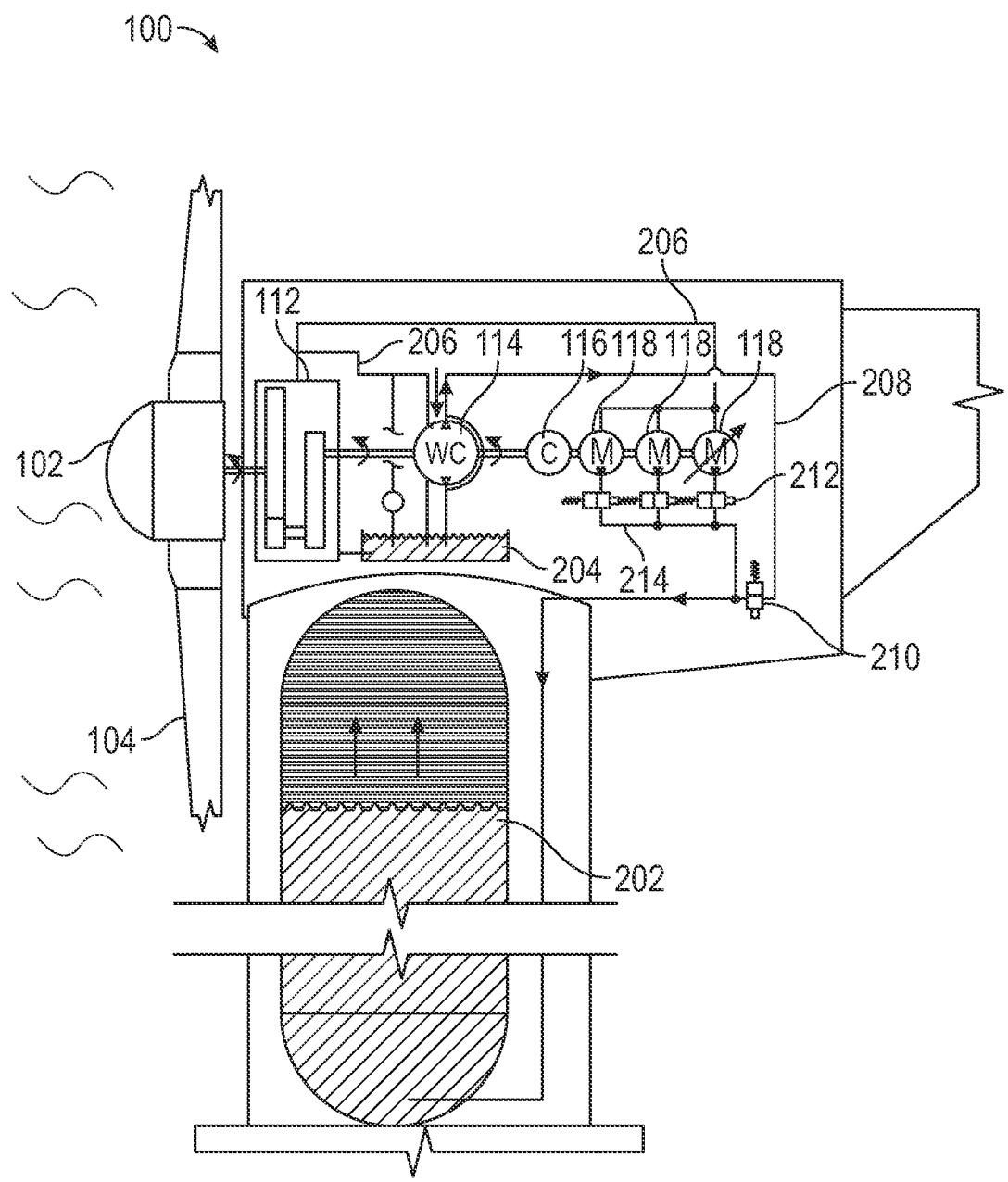
FIG. 2 is a system diagram of a turbine including a power split transmission coupling for regeneration according to an embodiment.

FIG. 2 depicts a turbine system diagram according to an example of the turbine 100. The turbine 100 can include the turbine rotor 102, turbine blades 104, gearbox 112, power split transmission coupling 114, generator 116, and a plurality of hydraulic motors as previously described herein. The example, of FIG. 2 further includes a hydraulic storage vessel 202, a hydraulic fluid reservoir 204, and a cooling circuit 206. Where the mechanical power of the turbine rotor 102 exceeds the maximum power of the generator 116, the power split transmission coupling 114 can draw hydraulic fluid from the reservoir 204 into the power split transmission coupling 114 and divert the hydraulic fluid at high pressure to the hydraulic storage vessel 202. The power split transmission coupling 114 can include an inlet port and outlet port (as shown in FIG. 3 and described herein). The inlet port can be coupled to the reservoir 204 to communicate the hydraulic fluid from the reservoir 204 to the power split transmission coupling 114. A hydraulic storage conduit 208 can couple the power split transmission coupling 114 to the hydraulic storage vessel 202. The high pressure hydraulic fluid can be stored at high pressure in the storage vessel 202. For instance, high pressure hydraulic fluid can be hydraulic fluid at pressures including, but not limited to, 20 bar, 100 bar, 300 bar, 500 bar, or other pressure. The hydraulic storage conduit 208 can include at least one cutoff valve 210 located along the hydraulic storage conduit between the power split transmission coupling 114 and the hydraulic storage vessel 202. The communication of hydraulic fluid from the power split transmission coupling 114 and the hydraulic storage vessel can be interrupted or stopped where the cutoff valve 210 is in the closed position. Closing the cutoff valve can prevent reverse flow of hydraulic fluid from the hydraulic storage vessel 202 to the power split transmission coupling 114.

In an example, the turbine system 100 includes at least one hydraulic regeneration conduit 214 coupled between the hydraulic storage vessel 202 and at least one hydraulic motor 118. For instance, the hydraulic regeneration conduit 214 can be connected to the hydraulic storage conduit 208 between the hydraulic storage vessel 202 and the cutoff valve 210 as shown in FIG. 2. In the regeneration mode, the turbine 100 can direct hydraulic fluid from the hydraulic storage vessel 202 to the one or more hydraulic motors 118 through the hydraulic regeneration conduit 214. The hydraulic regeneration conduit 214 can include one or more regeneration valves 212. In the open position, high pressure hydraulic fluid can flow from the hydraulic storage vessel to at least one hydraulic motor 118 through the regeneration valve 212. Torque can be supplied to the generator rotor 120 in response to the high pressure hydraulic fluid passing through the hydraulic motor 118.

In an example, the hydraulic fluid can include, but is not limited to water, a water glycol mixture, hydraulic oil, or the like. The power split transmission can operate with water as a fluid medium for transmitting torque from the input shaft to the output shaft resulting in cost savings over more expensive fluids. Couplings, fittings, hoses, conduits, and the like can leak hydraulic fluid in the course of normal operation. The use of water as the hydraulic fluid can result in an environmentally friendly solution. In an example, glycol or ethylene glycol can be added to water to form a water glycol mixture. For instance, the water glycol mixture can include a lower freezing point and a higher boiling point than pure water.

In the example of FIG. 2, the reservoir 204 can include a fluid storage tank for holding the hydraulic fluid at low pressures, such as atmospheric pressure. In an example, the reservoir 204 can include a large body of water, such as an ocean, lake, river, storage pod, tank, or the like. For instance, the large body of water can include a naturally occurring body of water. The reservoir can provide hydraulic fluid for cooling various components of the turbine 100 or for storing the hydraulic fluid at high pressure generated by the power split transmission coupling 114. In an example, where the hydraulic fluid from the reservoir 204 is not stored under high pressure, it can be returned to the reservoir 204. For instance, where the hydraulic fluid is circulated in a cooling circuit (described further below), the hydraulic fluid can be returned to the reservoir 204.

The hydraulic storage vessel 202 can be configured to store high pressure hydraulic fluid for long durations of time. For instance, the hydraulic storage vessel 202 can contain pressures of up to 350 bar for hours, days, weeks, or months. In the example of FIG. 2, the hydraulic storage vessel 202 is a hydraulic accumulator. The accumulator can be charged with a gas or a liquid, such as nitrogen gas or liquid nitrogen, to increase the storage pressure of the accumulator. In an example, the stored hydraulic fluid can provide up to 1 megawatt of power or more.

The cooling circuit 206 can circulate hydraulic fluid (e.g., from the reservoir 204) in a conduit. In the example, shown in FIG. 2, the hydraulic fluid diverted from the power split transmission coupling 114 can be circulated through the cooling circuit 206. The cooling circuit 206 can transfer heat away from the turbine components including, but not limited to, the gearbox 112, power split transmission coupling 114, generator 116, or the like. For instance, the cooling circuit 206 can include one or more heat exchangers to transfer the heat away from the turbine components. In an example, water can be the hydraulic fluid used as a cooling source for the turbine powertrain. In an example, hydraulic fluid exiting the hydraulic motor 118 can circulate through the cooling circuit 206 before returning to the reservoir 204. Optionally, the water can be combined with fire retardants (e.g., foaming agents) for reducing the flammability of the hydraulic fluid. In an example, the hydraulic fluid can be a water glycol mixture with good fire retardant properties. The hydraulic fluid can mitigate damage to the generator 116 and risk of fire and accordingly the generator 116 can be operated at rated power. In an example, hydraulic fluid (e.g., water glycol) can be used to extinguish developing fires. For instance, the cooling circuit 206 can include fire extinguishing nozzles that release the hydraulic fluid to extinguish fire.

FIG. 3 shows a perspective view of an example of the power split transmission coupling 114 (sometimes referred to herein simply as power split coupling, hydraulic coupling or simply coupling). As previously described, the power split transmission coupling 114 can include an input shaft 302 and an output shaft 304. Furthermore, according to some examples a thru shaft arrangement is also contemplated. The torque applied to the output shaft 304 can be adjusted according to an adjustable torque ratio of the input shaft 302. In an example, the torque of the output shaft 304 can be reduced according to the adjustable torque ratio of the power split transmission coupling 114. Displacing hydraulic fluid through an outlet port 306 of the power split transmission coupling 114 can decrease the adjustable torque ratio (i.e., reduce the amount of torque on the output shaft 304 in relation to the torque of the input shall 302. A hub (shown in FIG. 4 and described herein) can be fixably attached to the input shaft 302. The hub can be rotatable within the cam ring 308. In an example, the cam ring 308 can be fixably attached to the output shaft 304. The power split transmission coupling 114 can have a through drive mode and a power split mode. In the through drive mode, the hub and the cam ring rotate in a substantially fixed 1:1 ratio (i.e., the output torque is substantially equal to the input torque). The power split mode, the power split transmission coupling 114 can mitigate excess power or shock being applied to the generator. For instance, adjustable torque ratio of the power split transmission coupling 114 can be adjusted so the torque of the output shaft 304 is constant where there can be variation of torque applied to the input shaft 302. In an example, the power split transmission coupling 114 can include a housing. The cam ring 308 and hub 402 can be disposed within the housing. The hydraulic fluid can be included in a cavity between the housing and the cam ring 308, input shaft 302, output shaft 304, or other components for lubrication or coolant.

FIG. 4 is an example of a cross section view of the power split transmission coupling 114 located perpendicular to the input shaft 302 and centered within the hub 402. The cam ring 308 includes the inlet port 404, the outlet port 306, and a cam ring surface 408. The cam ring surface 408 can be an elliptical shape. The inlet port 404 can extend from the outer portion of the cam ring 308 and divide into at least two conduits, each extended to opposite quadrants of the cam ring surface 408 in the example shown in FIG. 4. The outlet port 306 can extend from the outer portion of the cam ring 308 and divide into at least two conduits, each extended to opposite quadrants of the cam ring surface 408 and adjacent to the inlet port quadrants. The inlet port 404 and outlet port 306 can terminate at the cam ring surface 408 forming one or more apertures in the cam ring surface 408. In the example of FIG. 4, the elliptical shape of the cam ring 308 can be symmetrical. Symmetry of the cam ring 308 can balance the forces applied to bearings of the power split transmission coupling 114. For instance, bearings supporting the input shaft 302 and the output shaft 304. Balanced forces can extend the life of the power split transmission coupling 114 as mechanical stress and fatigue are reduced.

The hub 402 can be located at the center axis of the cam ring surface 408. As shown in FIG. 4, the hub 402 can include a circular shape sized to fit within the elliptical shape of the cam ring surface 408. For instance, the hub 402 can be sized with a clearance fit to the cam ring surface 408, such as a precision running fit to allow for the hub 402 to rotate within the cam ring 308 with minimal clearance. The hub 402 can include a plurality of circumferentially spaced slots 410 extended radially outward from the center axis of the hub 402. Each slot 410 can be sized and shaped to support a vane 406 therein. The inner portion of the slot 410 can include a signal passage in communication with a high pressure fluid.

As shown in the example of FIG. 4, the vane 406 can be located within the slot 410. The vanes can be extended radially outward from the center axis of the hub 402 in response to the application of the high pressure fluid to the base 414 of the vane 406 through the signal passage. In an example the high pressure fluid can be high pressure hydraulic fluid. A tip 412 of the vane 406 can contact the cam ring surface 408 in a fully extended position. Each vane 406 can extend and retract throughout the rotational cycle of the hub 402. For instance, the tip 412 can be substantially flush with the outer surface 416 of the hub 402 in a first orientation of the hub 402 and then be displaced to a partially extended position or a fully extended position as the hub 402 rotates from the start of a first quadrant to the start of the second quadrant. In the retracted position, the input shaft 302 can be independently rotatable with respect to the output shaft 304.

In an example, the tip 412 can include a roller bearing (referred to herein as a roller vane). The roller vane can decrease friction between the vane 406 and the cam ring surface 408 and can be used in a large scale power split transmission coupling 114 (e.g., 200 kilowatts or greater). Where the hydraulic fluid includes an environmentally friendly or non-flammable fluid (such as water glycol), the roller vane can be used to reduce friction between the vane 406 and the cam ring 308. The vane 406 can also include a coating to reduce friction, increase corrosion resistance, or reduce wear. For instance, the vane 406 can include a diamond-carbon coating or diamond-dust coating to improve the corrosion resistance of the vane 406. The coating can be selected from a variety of coatings to reduce friction where a particular hydraulic fluid is used in the power split transmission coupling 114. The diamond-dust coating can reduce corrosion where water glycol is used in the power split transmission coupling 114.

As previously stated the power split transmission coupling 114 can include a through drive mode and a power split mode. In the through drive mode, the input shaft 302 and the output shaft 304 can include a 1:1 adjustable torque ratio. For instance, the input shaft 302 and the output shaft 304 can rotate together (i.e., at the same angular velocity). The hydraulic fluid between the hub 402 and the cam ring 308 can be pressurized by the power split transmission coupling 114. For instance, where the vane 406 is extended, a pressure can be applied to the hydraulic fluid by the vane 406. Torque is transferred from the hub 402 to the cam ring 308 by the pressurized hydraulic fluid on the cam ring 308. The outlet port 306 can be closed (i.e., deadheading). With the hydraulic fluid trapped within the power split transmission coupling 114, substantially all of the torque from the hub 402 can be transferred to the cam ring 308. The torque applied to the generator 116 can be substantially equal to the torque of the input shaft 302. The power split transmission coupling 114 can operate in the trough drive mode where the power applied to the input shaft 302 is lower than the rated power of the generator 116 (e.g., at low turbine rotor speed). Efficiency of the turbine 100 can be maximized by operating the power split transmission coupling 114 in the through drive mode where the turbine rotor power is below the rated power of the generator 116 (e.g., when river and/or wind speed is low).

In the power split mode, the outlet port 306 can be open or partially open. Hydraulic fluid can exit the power split transmission coupling 114 through the outlet port 306. The pressure of the hydraulic fluid between the hub 402 and the cam ring 308 can be reduced as a result of the exiting (diverted) hydraulic fluid. Accordingly, less than substantially all of the input shaft 302 torque can be transferred to the output shaft 304. In an example, the volume between vanes 406 in the inlet quadrants of the cam ring 308 increase as the hub 402 rotates within the cam ring 308. The volume between the vanes 406 in the outlet quadrants of the cam ring 308 decrease as the hub 402 rotates within the can ring 308. The increasing volume in the inlet quadrants draws the hydraulic fluid into the power split transmission coupling 114. For instance, the increasing volume can generate a negative pressure that draws hydraulic fluid into the power split transmission coupling 114. The decreasing volume in the outlet quadrants can increase the pressure of the hydraulic fluid, for instance, by compressing the hydraulic fluid. A portion of the hydraulic fluid in the outlet quadrant can be diverted through the outlet port 306 in response to the power transferred from the input shaft 302 to the output shaft 304 exceeding a threshold level (e.g., a maximum rated generator power). The diverted hydraulic fluid can be stored under pressure (e.g., the pressure at which the hydraulic fluid exits the power split transmission coupling 114) and stored in the storage vessel 202. Stated another way, the hydraulic fluid exiting the power split transmission coupling 114 can be high pressure hydraulic fluid.

The adjustable torque ratio of the power split transmission coupling 114 can be adjusted to provide a desired output shaft condition including but not limited to, an output shaft torque, power, rotational speed, or the like. The difference in the torque of the input shaft 302 and the torque of the output shaft 304 is proportional to the volume of high pressure hydraulic fluid diverted from the power split transmission coupling 114. For instance, the outlet port 306 can include an adjustable valve. An orifice of the adjustable valve can be adjusted to increase or decrease the flow rate of fluid flowing through the outlet port 306. Increasing the flowrate of hydraulic fluid through the outlet port 306 can decrease the amount of torque transferred from the input shaft 302 to the output shaft 304. In an example, the extension of the vane 406 can be controlled to achieve the desired output shaft condition. The position of the tip 412 of the vane 406 can be adjusted to a location flush with the outer surface 416 of the hub 402, a location in contact with the cam ring 308, or any location therebetween. The adjustable torque ratio can be controlled by any number of mechanical or electromechanical devices including, but not limited to, an electric motor, servo, flow control valve, mechanical linkage, hydraulic motor, hydraulic system, pneumatic motor, pneumatic system, or the like. In an example, the adjustable torque ration can be controlled by a computer in communication with the electromechanical device.

In an example, the stored hydraulic fluid can be supplied under high pressure to a hydraulic motor 118 to increase the power produced by the generator 116. For instance, where the power applied to the generator rotor 120 is below the maximum rated power of the generator 116, additional power can be supplied to the generator 116 from the hydraulic motor 118. In an example, reducing the power transmitted to the generator rotor 120 can prevent damage to the generator 116 or prevent the oversupply of power to an electric grid and accordingly an undesired increase in the electrical frequency of the grid. In the power split mode, power generated by the turbine rotor 102 is not wasted by reducing the power transmitted to the generator 116. Instead, the excess power is stored as high pressure fluid to be used at another time or location, such as used to provide additional power to the generator 116 when river and/or wind speed is low or to provide additional power to another turbine operating below maximum production. In an example, the power split transmission coupling 114 can smooth the torque and/or power transmitted from the input shaft 302 to the output shall 304. For instance, an inconsistent input shaft torque can be converted to a constant output shaft torque by the power split transmission coupling 114. In an example, the energy efficiency of the power split transmission coupling 114 can be 90% or greater. In comparison, a piston pump can have an energy efficiency of only 70%. The power split transmission coupling 114 can operate at power capacities over one megawatt, such as two megawatts, three megawatts, or more.

Figure 5:
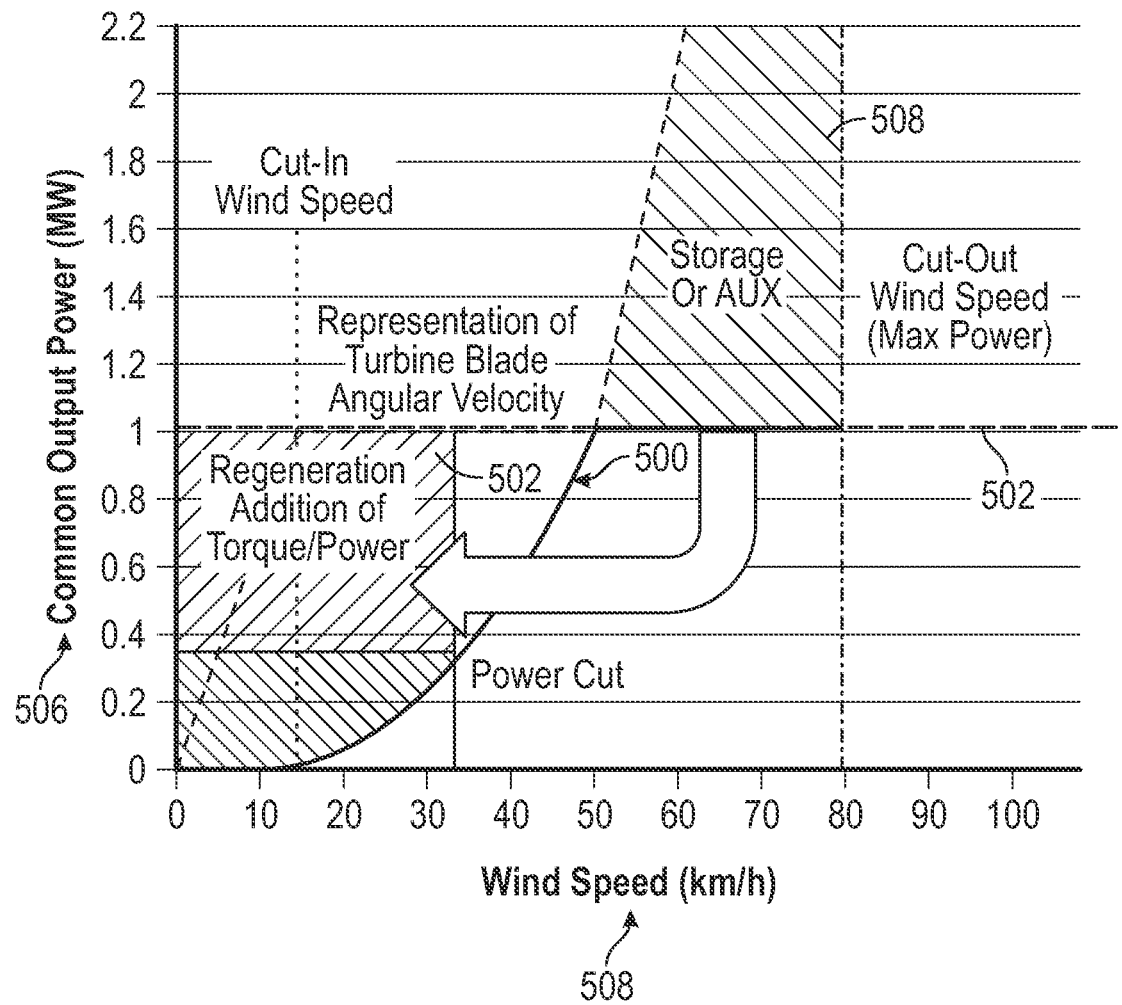
FIG. 5 is a chart depicting one example of the output power of a turbine according to river and/or wind speed.

FIG. 5 is an example of a chart depicting the power output of the generator 116 of the turbine 100. Although the chart of FIG. 5 is plotted with wind speed v. common output power, it is recognized a similar or modified chart could be generated plotting river speed v. common output power. Thus, the principals discussed herein would be applicable to river power systems as discussed in FIGS. 1-1E and FIGS. 33-45A.

In FIG. 5, a power curve 500 represents the amount of power produced by the generator 116. The rated power 502 is the maximum power that can be safely produced by the generator (e.g., a one megawatt for the exemplary generator 116 shown). The horizontal axis of the chart represents the river and/or wind speed 504 (i.e., river and/or wind loading subjected to the turbine 100). As the river and/or wind speed 504 increases, the amount of power 506 (represented by the vertical axis) produced by the generator 116 can increase. For instance, the power 506 can increase at a cubic rate as the river and/or wind speed 504 increases. As previously stated, the river and/or wind speed can be converted to torque by the turbine blades 104 and transmitted to the generator 116 through one or more of the turbine rotor 102, the gearbox 112, or the power split transmission coupling 114. Where the river and/or wind speed is sufficient produce power 506 in excess of the rated power 502, the pitch on existing turbine blades can be adjusted or mechanical braking can be applied at a location along the linkage between the rotor 102 and the generator 116 in order to prevent overpowering the generator 116. Accordingly, any power in excess of the rated power 502 (excess power 508) is uncaptured (wasted).

Power exceeding the rated power 502 (i.e., excess power 508) can be captured by including the power split transmission coupling 114 in the turbine 100. The turbine rotor 102 can over speed compared to existing turbines. Diversion of power to the hydraulic fluid prevents excess power from reaching and damaging the generator 116. The excess power 508 can be stored as high pressure hydraulic fluid and used for regeneration 510. Where river and/or wind speed 504 is low and the generator is producing less than rated power 502, the turbine 100 can operate in a mode of regeneration 510. In regeneration 510, the stored power of the high pressure hydraulic fluid can be applied to the hydraulic motor 118 to transmit torque to the generator rotor 120. Regeneration 510 provides additional power production where river and/or wind speed 504 is too low for production at rated power 502.

In an example, regeneration 510 can increase the overall efficiency of the turbine 100. For instance, the turbine can operate at rated power 502 for a higher percentage of the turbine lifespan. Accordingly, regeneration 510 can result in more viable river and/or wind farm locations. In an example, regeneration 510 can produce a consistent amount of power 506. For instance, the power split transmission coupling 114 can mitigate fluctuations in power generation resulting from river and/or wind jitter. In an example, excess power 508 (i.e., auxiliary power) can be used for other applications utilizing hydraulic power.

FIG. 6 is a diagram of an exemplary method 600 of operating the turbine 100 including the power split transmission coupling 114. The method 600 includes power generation and regeneration modes. At 602, the method 600 includes adjusting the power split transmission coupling 114 to transfer substantially all torque from a turbine rotor 102 to the generator 116 by working the hydraulic fluid, wherein the generator 116 converts mechanical power to electrical power. In an example, working the hydraulic fluid includes operating the power split coupling 114 in the through drive mode or power split mode as previously described herein. In an example, working the hydraulic fluid includes applying pressure to the hydraulic fluid by applying torque to the input shaft 302 and generating high pressure hydraulic fluid.

At 604, the method 600 further includes diverting the hydraulic fluid at high pressure from the power split transmission coupling 114 in response to the electrical power produced by the generator 116 exceeding a threshold to maintain the electrical power produced by the generator 116 at or below the threshold. In an example, the threshold power can include, but is not limited to, the rated power 502.

At 606, the hydraulic fluid diverted from the power split transmission coupling 114 under high pressure can be stored in the storage vessel 202. At 608, the hydraulic fluid stored at high pressure can be introduced to the hydraulic motor 118 in response to the generator 116 producing below threshold electrical power. The hydraulic motor 118 can be operatively coupled to the generator 116 and configured to transmit mechanical power to the generator 116 for electrical power generation. For instance, the hydraulic motor 118 can include an output that is coupled to the generator rotor 120.

Figure 7:
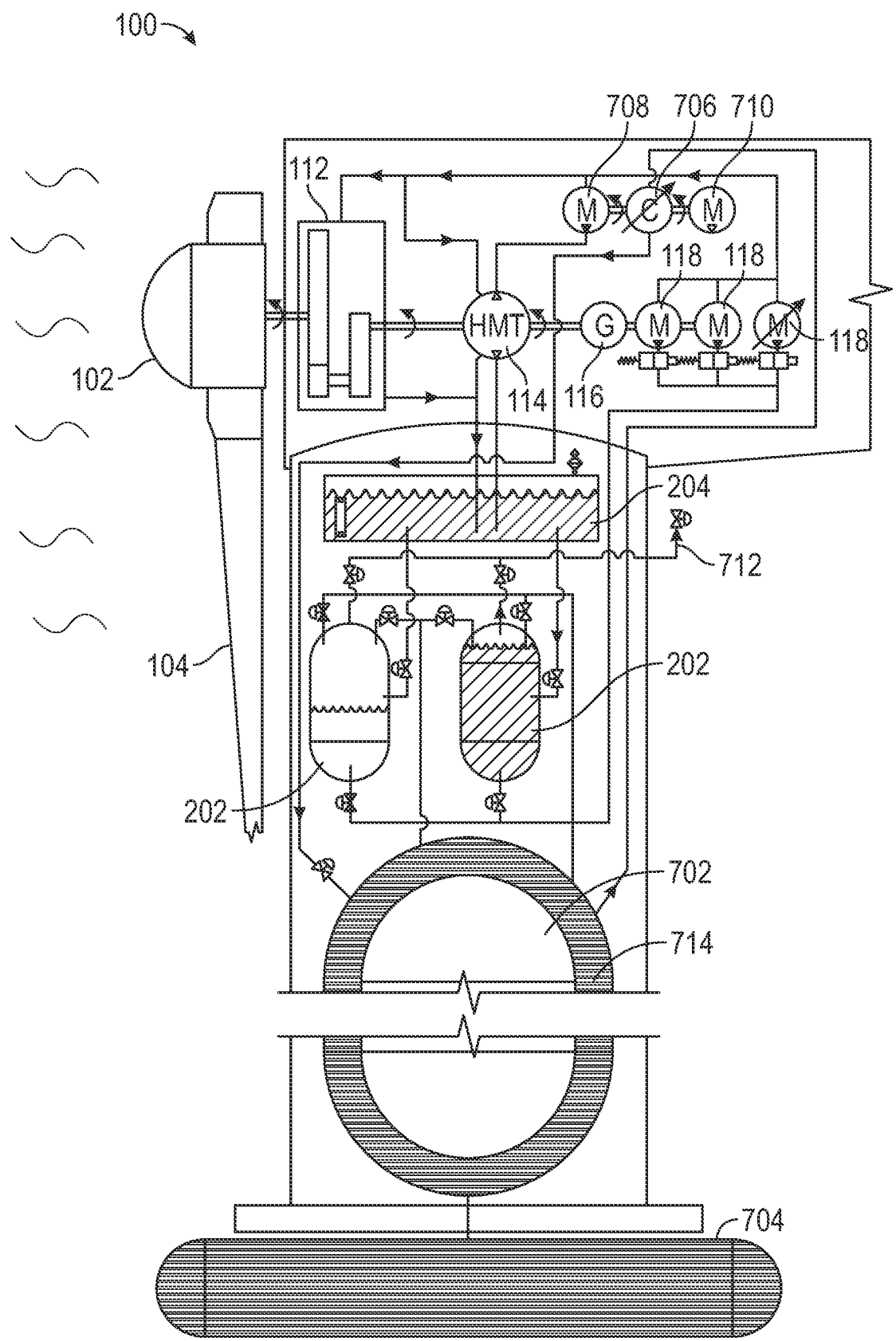
FIG. 7 is a system diagram of a turbine including a plurality of storage vessels, a high pressure chamber, and an auxiliary pressure source according to an embodiment.

FIG. 7 is a system diagram of an exemplary turbine 100 including at least one storage vessel 202, a high pressure chamber 702, and an auxiliary pressure source 704. As shown in FIG. 7, the turbine 100 can include two storage vessels 202. In an example, high pressure hydraulic fluid can be diverted from the power split transmission coupling 114 to each of the storage vessels 202. One storage vessel 202 can be filled or pressurized while another storage vessel 202 is releasing high pressure hydraulic fluid (e.g., for regeneration 510). In an example, each storage vessel 202 can be filled or releasing high pressure hydraulic fluid simultaneously. In an example, each of the storage vessels 202 can operate independently. For instance, each storage vessel 202 can be in a state of filling, charging (pressurizing), storing, or releasing high pressure hydraulic fluid.

Compressed gas can be supplied to the storage vessel 202 to maintain or increase the pressure of the high pressure hydraulic fluid. For instance, the high pressure hydraulic fluid can be stored at 20 bar, 100 bar, 300 bar, or other pressure greater than atmospheric pressure. In an example, the storage vessel can be vented to atmospheric pressure and filled with hydraulic fluid from the reservoir 204. The hydraulic fluid can be pressurized by the compressed gas.

The high pressure chamber 702 and the auxiliary pressure source 704 can store compressed gas (high pressure gas), such as air or nitrogen. The compressed gas can be stored at pressures above atmospheric pressure. In an example, the compressed gas can be stored at 100 bar, 200 bar, 300 bar, or higher. The compressed gas can be pressurized by a compressor 706. The compressor 706 can include a piston compressor, rotary screw compressor, centrifugal compressor, or the like. In an example, the compressor 706 can be powered by the high pressure hydraulic fluid. For instance, high pressure hydraulic fluid exiting the power split transmission coupling 114 can be diverted to a hydraulic compressor motor 708. The hydraulic compressor motor 708 can provide mechanical power to drive the compressor 706. In an example, the compressor 706 can be powered by an electric motor 708.

In an example, a first storage vessel 202 can be vented to atmospheric pressure by a release valve 712. Hydraulic fluid (e.g., water glycol) can flow through conduit coupled from the reservoir 204 to the first storage vessel 202 filling the first storage vessel 202. Compressed gas can flow from the high pressure chamber 702 to the first storage vessel 202.

The compressed gas can raise the pressure of the hydraulic fluid stored in the first storage vessel 202 (i.e., pressurize the hydraulic fluid). The second storage vessel 202 can include a mixture of high pressure hydraulic fluid (pressurized hydraulic fluid) and compressed gas. High pressure hydraulic fluid can be released from the second storage vessel 202 and transported to one or more hydraulic motors 118 for regeneration 510. Where the second storage vessel 202 is releasing high pressure hydraulic fluid, the high pressure chamber 702 can supply compressed gas to maintain the pressure of the high pressure hydraulic fluid within the second storage vessel 202. Where the first storage vessel 202 is full, the release valve 712 can be closed and compressed gas can be introduced to the first storage vessel 202. The compressed gas can pressurize the hydraulic fluid in the first storage vessel 202. The first and second storage vessels 202 can release high pressure hydraulic fluid for regeneration 510 or another working purpose. The high pressure chamber 702 can supply compressed gas to the first and second storage vessels 202 to maintain the high pressure hydraulic fluid in each storage vessel 202. Where the second hydraulic storage vessel 202 has been depleted of high pressure hydraulic fluid, the release valve 712 can open the second storage vessel 202 to atmospheric pressure. Hydraulic fluid from the reservoir 204 can be supplied to the second storage vessel 202. The first storage vessel 202 can release high pressure hydraulic fluid while the second storage vessel 202 is being filled. Where the second storage vessel is filled with hydraulic fluid, compressed gas can be supplied to the second storage vessel 202 to pressurize the hydraulic fluid. This exemplary cycle can be repeated during operation of the turbine 100.

The auxiliary pressure source 704 can include, but is not limited to, an additional compressed gas storage vessel. In an example, the additional compressed gas can be pressurized from a geothermal or river energy source. For instance, an auxiliary turbine can be powered by steam from a geothermal source or from river current pressure. The auxiliary turbine can be coupled to a compressor, such as compressor 706 or another compressor. The auxiliary pressure source 704 can be coupled to the high pressure chamber 702 to supply compressed gas to the high pressure chamber 702. The auxiliary pressure source 704 can increase the efficiency of the turbine 100 by utilizing alternative power sources to pressurize the compressed gas and the high pressure hydraulic fluid. In an example, the auxiliary pressure source 704 can be buried underground to increase the safety of storing the high pressure compressed gas.

In an example, the turbine 100 can include a super charge chamber 714. The compressed gas remaining in the storage vessel 202 upon the depletion of the high pressure hydraulic fluid can be released to the super charge chamber 714. The gas in the super charge chamber 714 can be stored at a pressure between atmospheric and the pressure of the gas in the high pressure chamber 702. In an example, the gas in the super charge chamber 714 can be further pressurized by the compressor 706 and returned to the high pressure chamber 702.

Figure 8:
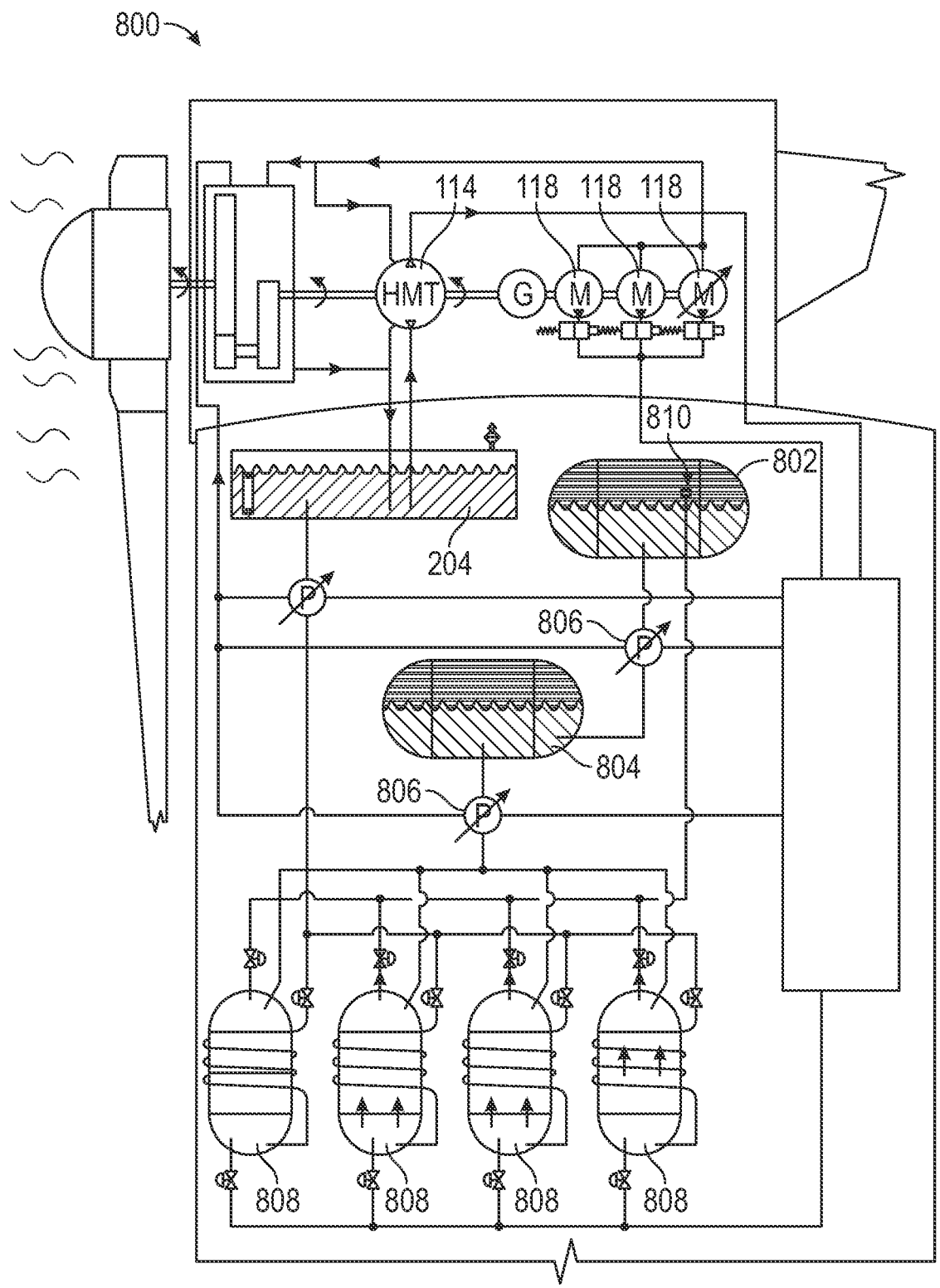
FIG. 8 is a system diagram of turbine including one or more cyclic gas work chambers and a condenser for charging the storage vessel with nitrogen according to an embodiment.

FIG. 8 depicts an exemplary system diagram of a turbine 800 including a thermodynamic liquid nitrogen cycle for compressing the hydraulic fluid. In the example of FIG. 8, the turbine 800 can include a condenser 802, a liquid storage chamber 804, at least one hydraulic pump 806, one or more accumulators 808, and a throttling valve 810 coupled together in series to form a circuit. The hydraulic fluid can be diverted from the power split transmission coupling 114 to the one or more accumulators 808. Liquid nitrogen can also be transported to the one or more accumulators 808. The liquid nitrogen can be supplied to the accumulator 808 under higher than atmospheric pressure and at a temperature below a boiling point of liquid nitrogen. The temperature of the liquid nitrogen can rise in the accumulator 808 and the liquid nitrogen can evaporate in to a gas phase. In an example, hydraulic fluid from the reservoir 204 can be circulated around the accumulator 808 to transfer heat to the accumulator 808 and to the liquid nitrogen accordingly to facilitate the nitrogen phase change. In an example, heat from a geothermal source can be transferred to the liquid nitrogen in the accumulator 808, for instance, by using a heat exchanger. Expansion of the liquid nitrogen to nitrogen gas can pressurize the hydraulic fluid. For instance, energy from a phase transition of the nitrogen can be transferred to the hydraulic fluid. As a result, high pressure hydraulic fluid from within the accumulator 808 can be supplied to the one or more hydraulic motors 118 for regeneration 510 or another hydraulic working purpose.

Where the hydraulic fluid is depleted from the accumulator 808, the nitrogen gas can be released from the accumulator 808 and transported to the throttling valve 810. As shown in FIG. 8, the throttling valve 810 can be mounted to the condenser 802 and the exit of the throttling valve 810 can open into the condenser 802. According to the Joule-Thompson effect, the nitrogen gas can condense and cool (e.g., to 77 to 90 k) to liquid nitrogen (e.g., at 0.13 to 1 bar) as a result of the expansion of the nitrogen gas exiting the throttling valve 810. Liquid nitrogen can be stored at much lower pressures than nitrogen gas (e.g., 0.13 to 20 bar) thereby reducing the structural requirements for storing the nitrogen. Liquid nitrogen also occupies less volume than nitrogen gas reducing the amount of gas for operating the turbine 800. The pump 806 can transfer the liquid nitrogen from the condenser 802 to the liquid storage chamber 804 (e.g., between 1 bar to 20 bar and 90 k to 120 k). The liquid storage chamber 804 can hold the liquid nitrogen until it can be used for pressurizing the hydraulic fluid in the accumulator 808. Another pump 806 can supply the liquid nitrogen from the liquid storage chamber to the accumulator 808. In an example, a lower volume of hydraulic fluid can be used as a result of the inclusion of the liquid nitrogen cycle in the turbine 800.

Figure 9:
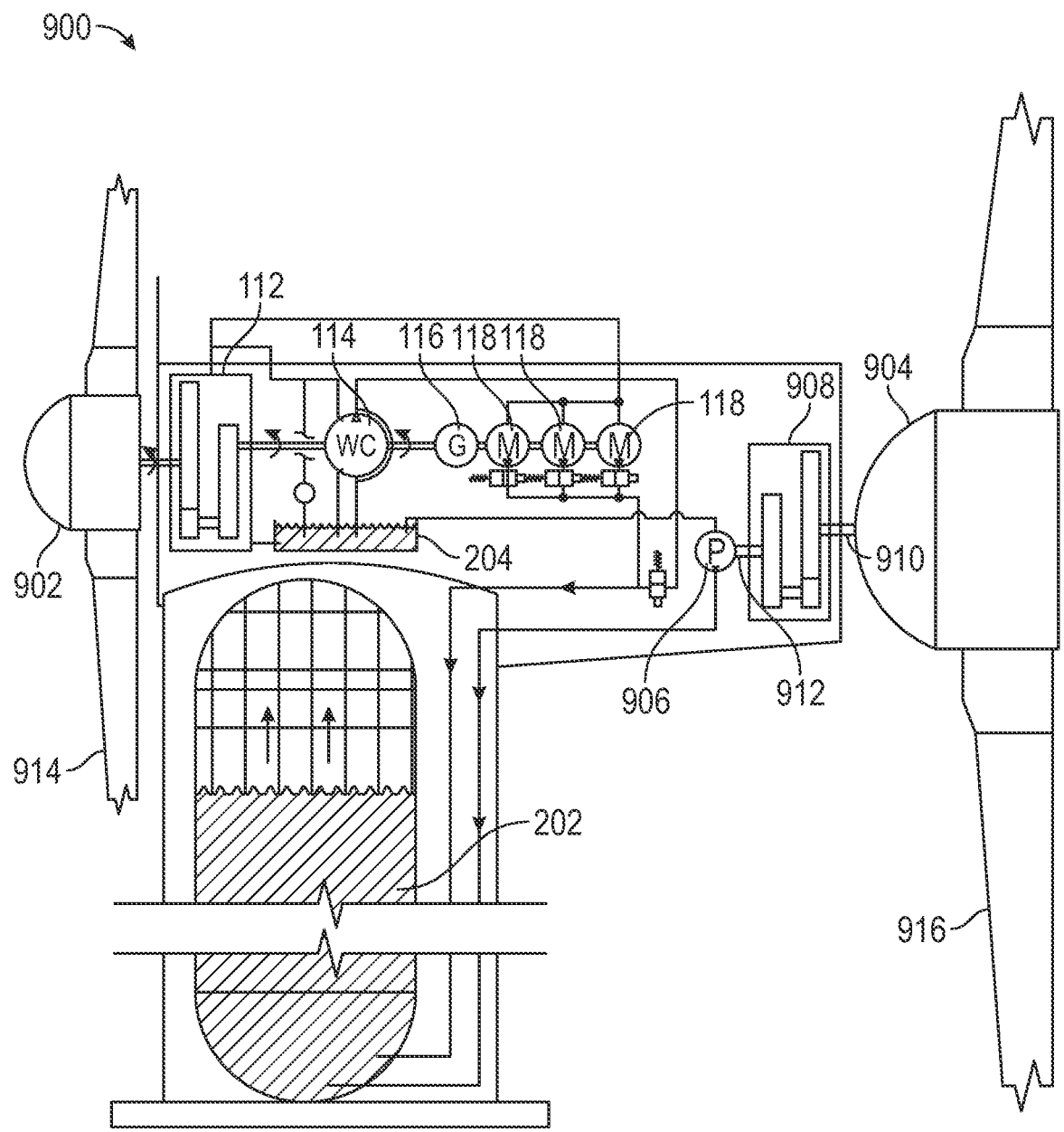
FIG. 9 is a system diagram of a turbine including more than one turbine rotor, according to an embodiment.

FIG. 9 is an example of a turbine 900 including a first turbine rotor 902 and a second turbine rotor 904. The first turbine rotor 902 can be coupled to a first end (e.g., front) of the nacelle 106. As shown in the example of FIG. 9, the second turbine rotor 904 can be coupled to a second end (e.g., rear) of the nacelle 106. The turbine 900 can include a gearbox 112, power split transmission coupling 114, generator 116, one or more hydraulic motors 118, a reservoir 204, and a storage vessel 202 as previously described herein. The first turbine rotor 902 can be coupled to the generator 116 via the one or more linkages (rotary shafts). The gearbox 112 and the power split transmission coupling 114 can be operatively coupled to the one or more linkages between the turbine rotor 102 and the generator 116. The power split transmission coupling 114 can divert hydraulic fluid under high pressure to the storage vessel 202. The hydraulic fluid stored under high pressure can be used for auxiliary power purposes including, but not limited to, supplying high pressure hydraulic fluid to a hydraulic motor 118 for power generation or regeneration 510, pumping fluid, supplying cooling fluid to components of the turbine 900, or powering other machinery.

The second turbine rotor 904 can provide mechanical power to an auxiliary hydraulic pump 906. The second turbine rotor 904 can be coupled to the auxiliary hydraulic pump 906 through a second gearbox 908. The second gearbox 908 can be coupled to a second turbine rotor shaft 910 at an input of the gearbox 908 and coupled to an auxiliary hydraulic pump shaft 912 at an output of the gearbox 908. The gearbox can adjust the rotational speed and/or torque of the auxiliary hydraulic pump shaft 912 with respect to the second turbine rotor shaft 910. For instance, the rotational speed or torque of the auxiliary hydraulic pump shaft 912 can be ratio of the second turbine rotor shaft 912, such as a higher, lower, or equal speed or torque of the second turbine rotor shaft 912. The auxiliary hydraulic pump 906 can pressurize hydraulic fluid from the reservoir 204 and deliver high pressure hydraulic fluid to the storage vessel 202. In an example, the auxiliary hydraulic pump 906 can provide high pressure hydraulic fluid to be used for regeneration 510 or other purpose.

In an example, the first turbine blades 914 can be shorter than the second turbine blades 916. For instance, the first turbine blades can be 65 meters long and the second turbine blades can be 105 meters long. The second turbine blades 916 can capture river energy that is not absorbed by the first turbine blades 914. The first turbine blades 914 and second turbine blades 616 can be configured for increased efficiency and can be specially configured for each turbine 900 and location. The length of the first turbine blades 914 and the second turbine blades can include, but is not limited to, 10, 30, 60, 80, 100, 120, or 140 meters long. The distance between the first turbine rotor 902 and the second turbine rotor 904 can be configured for improved energy capture from the river. In an example, incorporation of the second turbine rotor 904 can improved the efficiency of the turbine 900. Without the second turbine rotor 904 the average power output from the turbine 900 can be about thirty-percent of the rated power. With the addition of the second turbine rotor 904, the average power output of the turbine 900 can be about fifty-percent of the rated power. The cost of adding the second turbine rotor 904 to the turbine 900 can be low in proportion to the additional power output gained.

Figure 10:
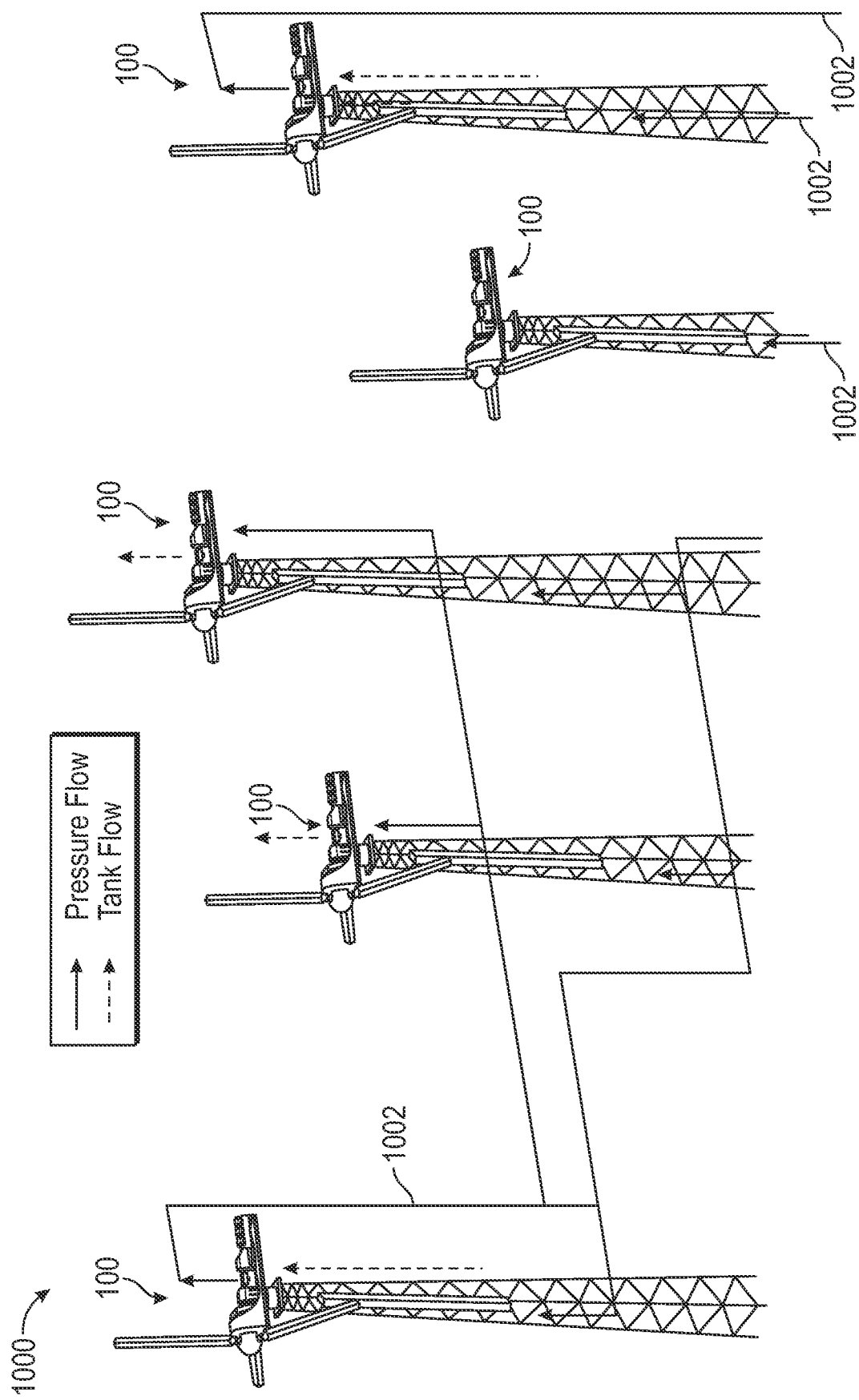
FIG. 10 is a diagram of a network of turbines, wherein one or more turbines are interconnected to at least one other turbine with a pressure communicating line.

FIG. 10 is a network 1000 of turbines 100 including pressure communicating lines 1002 coupling the hydraulic motor 118 of one turbine 100 to a high pressure fluid source of another turbine 100. For instance, the high pressure fluid source can include, but is not limited to, a storage vessel 202, high pressure chamber 702, auxiliary pressure source 704, super charge chamber 714, condenser 802, liquid storage chamber 804, accumulator 808, or other. In the example of FIG. 10, there are at least two turbines 100, each turbine 100 can be hydraulically coupled to at least one other turbine 100, wherein the diverted hydraulic fluid from at least one turbine 100 can be stored at high pressure. The high pressure hydraulic fluid can be transferable to the hydraulic motor 118 of at least another turbine 100 for producing electrical power.

The turbine 100 within network 1000 can operate in various modes. For instance, the turbine 100 can be generating power, storing power (e.g., by accumulation of high pressure hydraulic fluid), regenerating power (e.g., by providing high pressure hydraulic fluid to at least one hydraulic motor 118), sharing power (e.g., by transferring stored high pressure hydraulic fluid to another turbine 100), or any combination thereof. In an example, at low river loadings, the generator 116 can be disengaged from the turbine rotor 102. The storage vessel of that turbine 100 can then be utilized for storing high pressure hydraulic fluid. The stored high pressure hydraulic fluid (i.e., power) can be transmitted to at least one other turbine 100. The other turbine 100 can operate at rated power 502, maximum efficiency, or both. In other words, turbines 100 with excess power generation can divert power (i.e., high pressure hydraulic fluid) to other turbines 100 operating below rated power and accordingly provide higher electrical generation within a network 1000 of turbines 100.

FIGS. 11-18 and FIGS. 19-32 draw upon the apparatuses, systems, networks, methods and techniques previously described and contemplate further system functionality modes. Traditional high pressure hydraulic accumulators require high volumes of fluid to store large amounts of energy. The disclosed systems and techniques greatly reduce fluid volumes as low compressibility can require relatively large reservoirs. By redirecting fluid into other chambers where work can be done at a later time. Additionally, the fluid required for the systems can be greatly reduced. Thus, the current inventor contemplates the use of intensifiers which can allow gas pressures to be relatively higher. These intensifiers can increase pressures that are typically reduced due to the gas expansion in staging and reciprocating regenerating modes. Thus, energy is stored in the expandable gas and by achieving higher pressures, power density can be increased. As will be discussed below, intensifiers include that the fluid can simply be re-used in different chambers or reciprocated between two or more chambers rather than returned to reservoirs.

As used below and previously, the power split transmission (e.g., item 114 of FIG. 1) may be referred to as the fluid coupling/torque amplifier. However, it should be noted that the term torque amplifier describes only one use of this apparatus (amplification). Instead of the hydraulic power being used for amplification it can used as hydraulic power to be used for any practical purpose such as in the techniques and systems described subsequently.

It should also be noted that the turbine system examples described herein are only one of many applications that can utilize the disclosed systems and techniques. For example, hydraulic hybrid vehicles could benefit from and utilize the disclosed systems and techniques. In such hybrid vehicles, low volumes of fluid can be re-used. with higher pressure gas chamber to reduce weight for a given power density. For example 20 litres of fluid could be staged or reciprocated 10 times making it equivalent to 200 litres with traditional accumulators.

Figure 11:
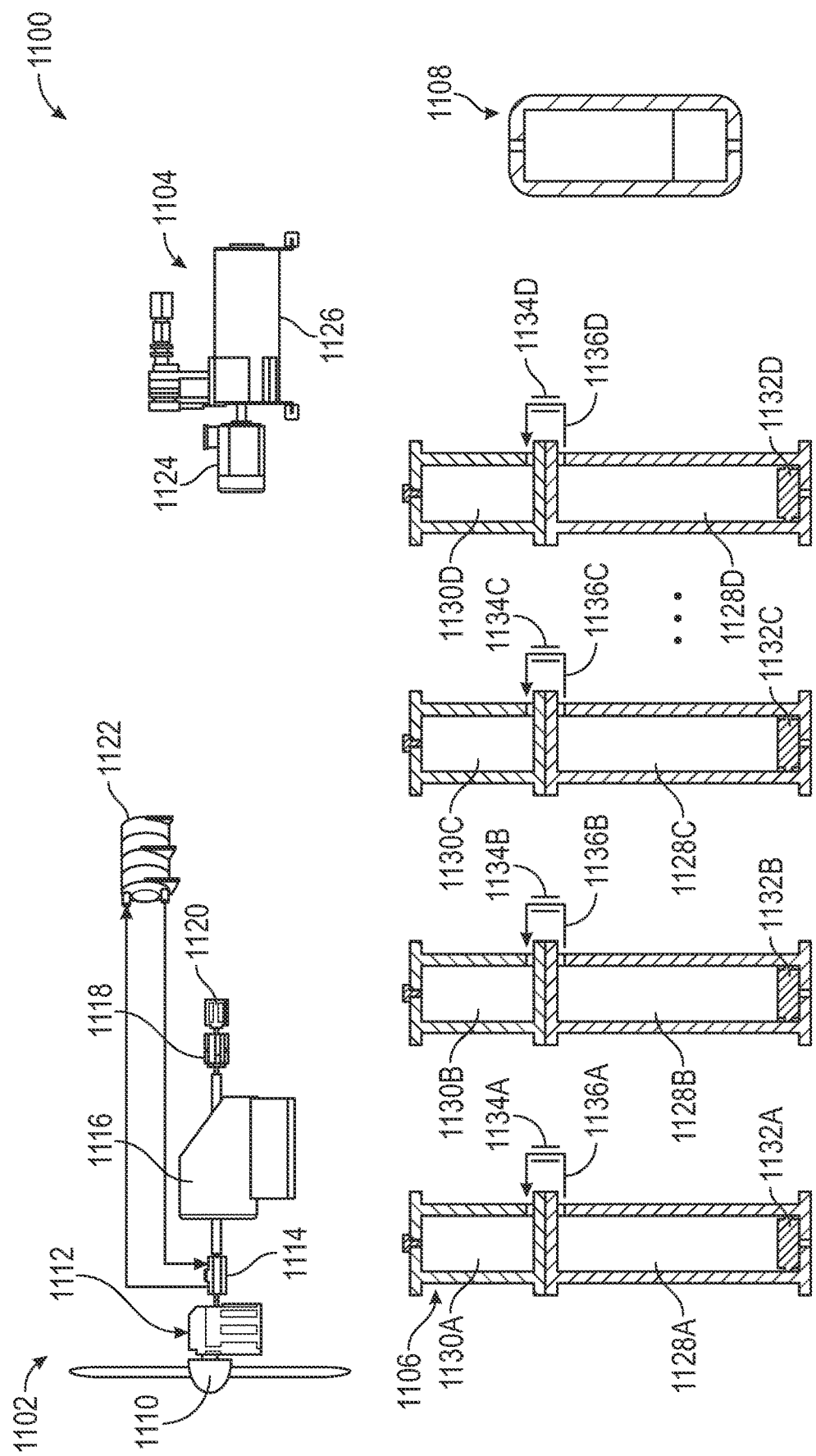
FIG. 11 is a diagram of a first system according to one example embodiment that includes various turbine components and additional subsystems and apparatuses to provide staging and reciprocating hydraulic power regeneration.

FIG. 11 shows a system 1100 according to an example of the present application. The system 1100 can include a first subsystem 1102 such as for a gas turbine as previously described in prior examples. The system 1100 can in some cases further include a second subsystem 1104, a third subsystem 1106 and a higher pressure gas chamber 1108. As previously described in reference to previous FIGS., the first subsystem 1102 can include a turbine 1110, a gearbox 1112, a power split transmission 1114, a generator 1116, a motor 1118, a makeup pump 1120 and a hydraulic reservoir 1122. The second subsystem 1104 can include a motor 1124 and a compressor 1126. The third subsystem 1106 can include a plurality of hydraulic fluid/lower pressure gas reservoirs 1128A, 1128B, 1128C and 1128D and a plurality of intermediate pressure gas reservoirs 1130A, 1130B, 1130C and 1130D. The third system 1106 can additionally include pistons 1132A, 1132B, 1132C and 1132D and valves 1134A, 1134B, 1134C and 1134D.

The communication between various subsystems and apparatuses of the system 1100 will be described in further detail with reference to FIGS. 12-18. Although the plurality of hydraulic fluid/lower pressure gas reservoirs 1128A, 1128B, 1128C and 1128D and the plurality of intermediate pressure gas reservoirs 1130A, 1130B, 1130C and 1130D illustrated in close proximity (e.g. abutting in the examples provided in FIGS. 11-18 such need not be the case. Having the two components of the third subsystem 1106 remote from one another is also contemplated herein.

The hydraulic fluid/lower pressure reservoirs 1128A, 1128B, 1128C and 1128D can comprise a plurality of accumulators (or part of a single accumulator having chambers for example) as previously described herein, and thus, together the hydraulic fluid/lower pressure reservoirs 1128A, 1128B, 1128C and 1128D can in some cases comprise a portion or all of the hydraulic reservoir 1122. In other examples such as those of FIGS. 11-18, the hydraulic fluid/lower pressure reservoirs 1128A, 1128B, 1128C and 1128D can be used in addition to the hydraulic reservoir 1122. Although four hydraulic fluid/lower pressure reservoirs 1128A, 1128B, 1128C and 1128D and four intermediate pressure gas reservoirs 1130A, 1130B, 1130C and 1130D are illustrated in the example provided, the number can vary as desired according to the application for the system 1100, for example.

Valves 1134A, 1134B, 1134C and 1134D can be arranged along communication lines 1136A, 1136B, 1136C and 1136D between the hydraulic fluid/lower pressure reservoirs 1128A, 1128B, 1128C and 1128D and the plurality of intermediate pressure gas reservoirs 1130A, 1130B, 1130C and 1130D. The pistons 1132A, 1132B, 1132C and 1132D can reside in the hydraulic fluid/lower pressure reservoirs 1128A, 1128B, 1128C and 1128D and can separate hydraulic fluid from gas as will be described subsequently.

Figure 12:
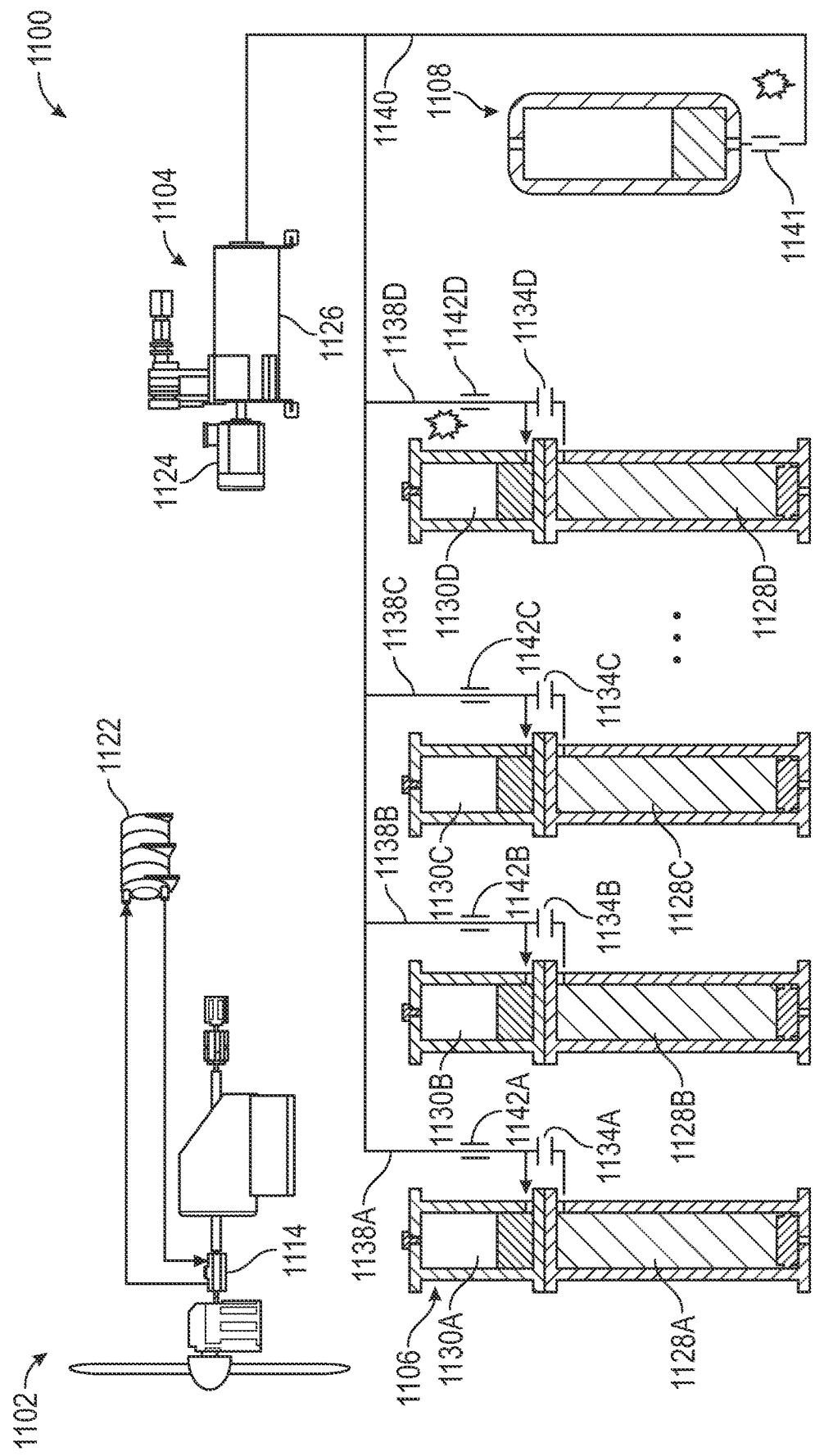
FIG. 12 is a diagram of the system of FIG. 11 operating in a charging mode to provide gas at various pressures to various chambers/reservoirs.

FIG. 12 shows the system 1100 with subassemblies 1102, 1104, 1106 and apparatuses as previously described in a charging mode where the higher pressure gas chamber 1108 and the intermediate pressure gas reservoirs 1130A, 1130B, 1130C and 1130D can be filled with pressurized gas to an intermediate pressure. Such gas in the higher pressure gas chamber 1108 can have a pressure of 350 Bar according to one example. However, other pressures are contemplated. Such charging can be accomplished, for example, with excess energy generated from river. Such charging can additionally include using the power split transmission 1114 as previously described to communicate hydraulic fluid to the hydraulic reservoir 1122 as illustrated and previously described. FIG. 12 illustrates the hydraulic fluid/lower pressure reservoirs 1128A, 1128B, 1128C and 1128D as being filled with a gas to a lower pressure (e.g., at 10 Bar). Again, although 10 Bar is used, such use is exemplary and other pressures are contemplated. Similarly, the example of FIG. 12 shows the plurality of intermediate pressure gas reservoirs 1130A, 1130B, 1130C and 1130D as being filled with gas to an intermediate pressure (e.g., at 210 Bar). Again, although 210 Bar is used, such use is exemplary and other pressures are contemplated.

According to the example of FIG. 12, the excess power can be used to drive the compressor 1126 such as directly via a shaft or via the motor 1124, which can be powered by the generator, for example. The compressor 1126 is arranged to communicate (along communication lines 1138A, 1138B, 1138C and 1138D with the plurality of intermediate pressure gas reservoirs 1130A, 1130B, 1130C and 1130D and additionally can communicate with the higher pressure chamber 1108 via communication line 1140 through valve 1141. During this portion of the charging mode, valves 1134A, 1134B, 1134C and 1134D can be closed such that pressure within the hydraulic fluid/lower pressure reservoirs 1128A, 1128B, 1128C and 1128D (at lower pressure) is not filled with gas pressurized by the compressor and does not communicate with the plurality of intermediate pressure gas reservoirs 1130A, 1130B, 1130C and 1130D.

Valves 1142A, 1142B, 1142C and 1142D are disposed along communication lines 1138A, 1138B, 1138C and 1138D and are illustrated as being opened to allow for gas to begin to fill the intermediate pressure gas reservoirs 1130A, 1130B, 1130C and 1130D to the intermediate pressure. Valve 1140 can additionally be opened to allow gas to fill the higher pressure chamber 1108 to the higher pressure. Although illustrated as occurring simultaneously in FIG. 12, such filling can be accomplished sequentially as desired. For example, the hydraulic fluid/lower pressure reservoirs 1128A, 1128B, 1128C and 1128D can be filled with a gas to a lower pressure then the intermediate pressure gas reservoirs 1130A, 1130B, 1130C and 1130D can be filled with gas to the intermediate pressure (this can occur sequentially with first 1130A filled then 1130B filled, etc.) and then the higher pressure chamber 1108 can be filled with the gas to the higher pressure.

Although not illustrated, the valves disclosed herein can be controlled to regulate in manners know in the art such as by a master control valve. Such master control valve can include several valves such as a block dedicated to control of the gas valves and a second block dedicated to control of hydraulic fluid valves.

Figure 13:
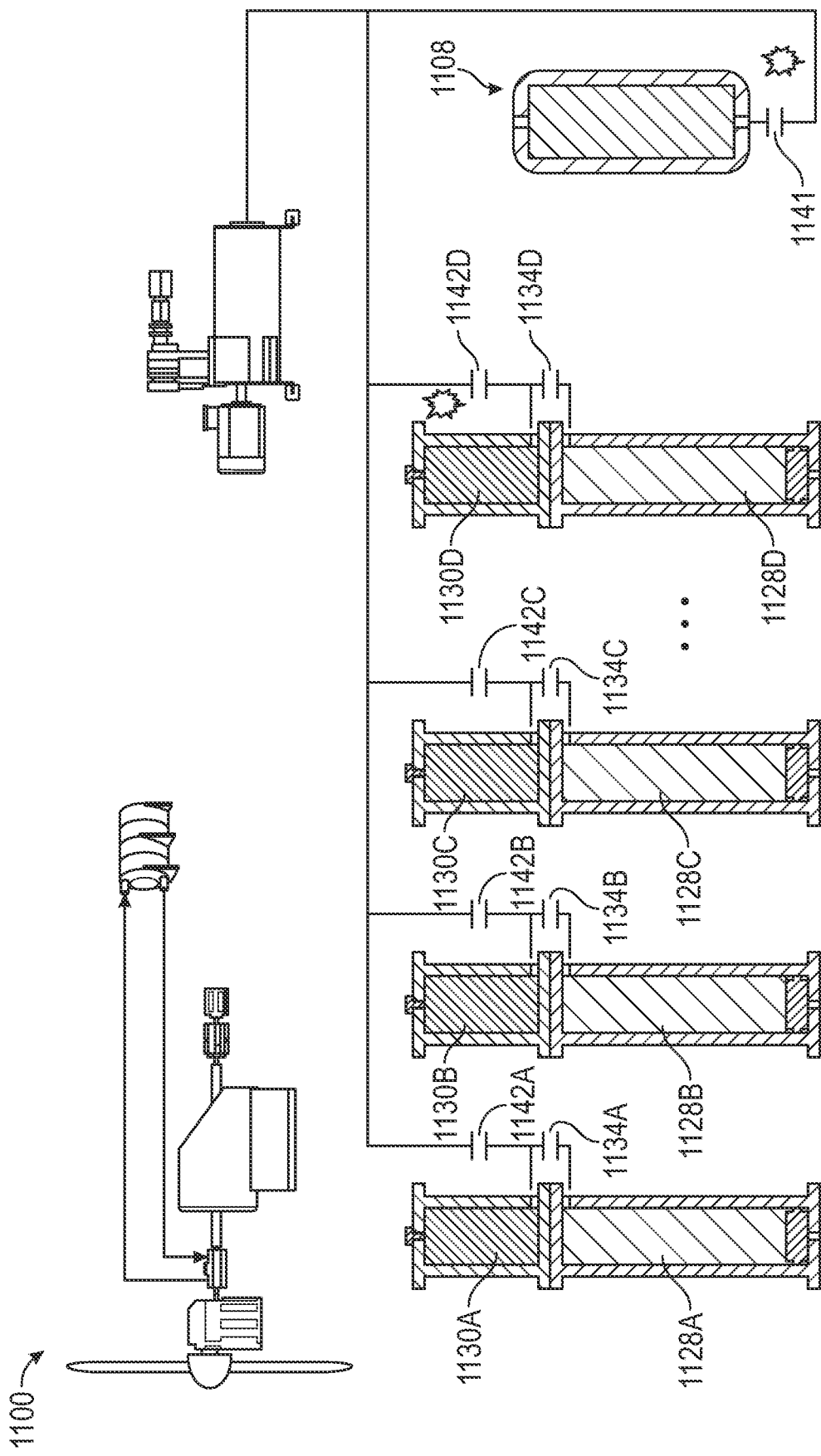
FIG. 13 is a diagram of the system of FIG. 11 fully charged.

FIG. 13 shows a mode of operation of the system 1100 where all of the higher pressure chamber 1108, the intermediate pressure gas reservoirs 1130A, 1130B, 1130C and 1130D, and the hydraulic fluid/lower pressure reservoirs 1128A, 1128B, 1128C and 1128D are fully charged with gas at various pressure levels. Again, this state was accomplished due to the excess power generated for example by excess river flow. All of the valves 1141, 1142A, 1142B, 1142C, 1142D, 1134A, 1134B, 1134C and 1134D can be shut in this condition. When all the chambers/reservoirs have been fully charged, the excess energy can be used to pressure intensify the gas in the higher pressure chamber 1108. In some cases, gas from the lower pressure reservoirs can be intensified from the intermediate pressure reservoirs and gas from the intermediate pressure reservoirs can be intensified from the higher pressure chamber 1108. The gas in the higher pressure chamber 1108 can be further intensified.

Figure 14:
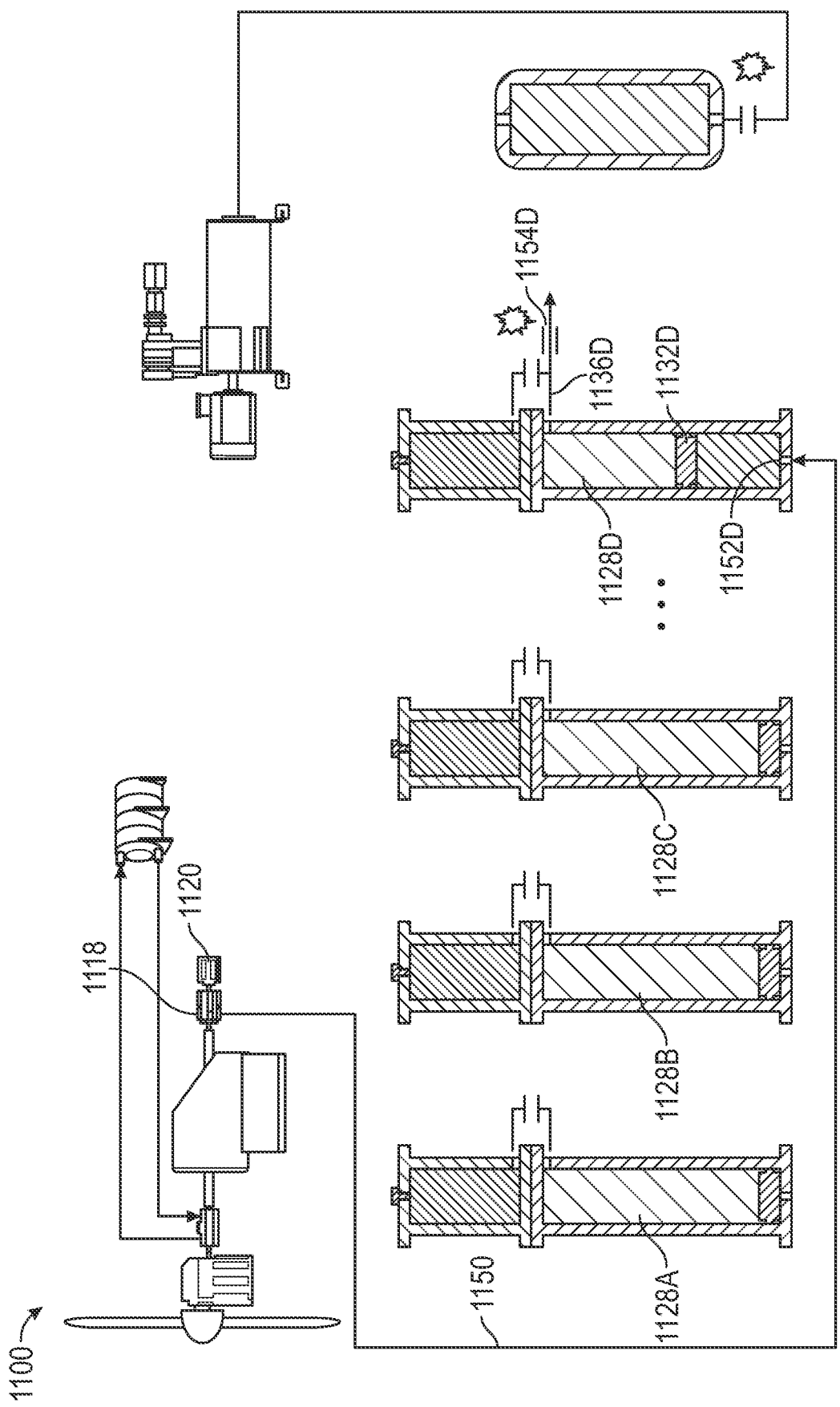
FIG. 14 is a diagram of the system of FIG. 11 using one of the chambers/reservoirs to house hydraulic fluid utilized by components of the turbine.

FIG. 14 shows a mode of operation of the system 1100 where return oil (hydraulic fluid) from the motor 1118 and makeup pump 1120 can be stored in one of the hydraulic fluid/lower pressure reservoirs 1128A, 1128B, 1128C and 1128D (e.g. reservoir 1128D). In such case, the return oil is pumped along communication line 1150 to the reservoir 1128D through a port 1152D to displace the piston 1132D. The displacement of the piston 1132D can cause the lower pressure gas to exit the second end of the reservoir 1128D via the communication line 1136D and through an opened valve 1154D to the atmosphere, another subsystem, apparatus or system (not shown), for example.

Figure 15:
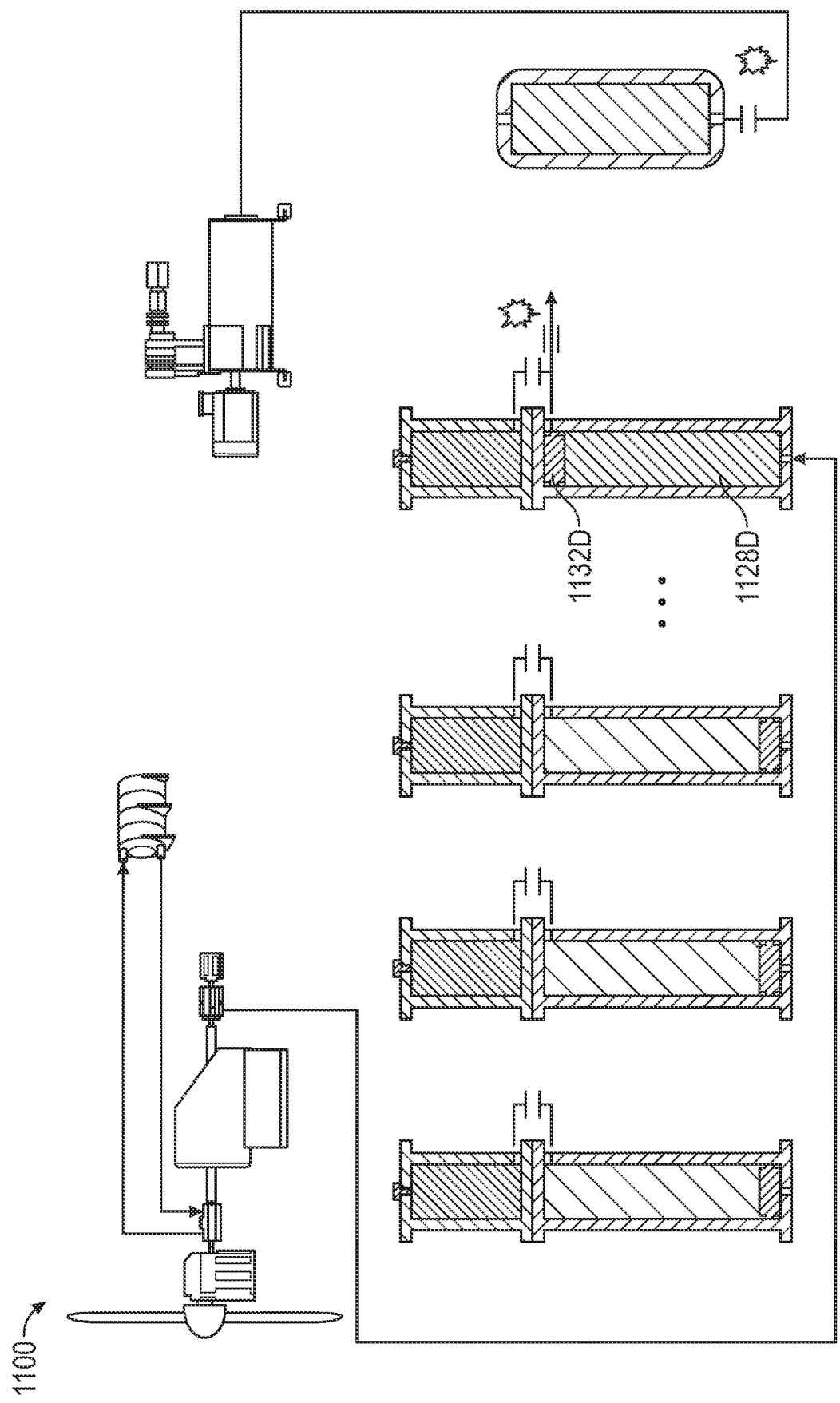
FIG. 15 is a diagram of the system of FIG. 11 housing the hydraulic fluid in one of the chambers/reservoirs with an internal piston fully displace.

FIG. 15 illustrates the system 1100 can accommodate the return oil as needed such as by driving the piston 1132D to the second end of the reservoir 1128D such that the lower pressure gas is substantially exhausted from the reservoir 1128D out into the atmosphere or to another apparatus, system or subsystem (not shown).

Figure 16:
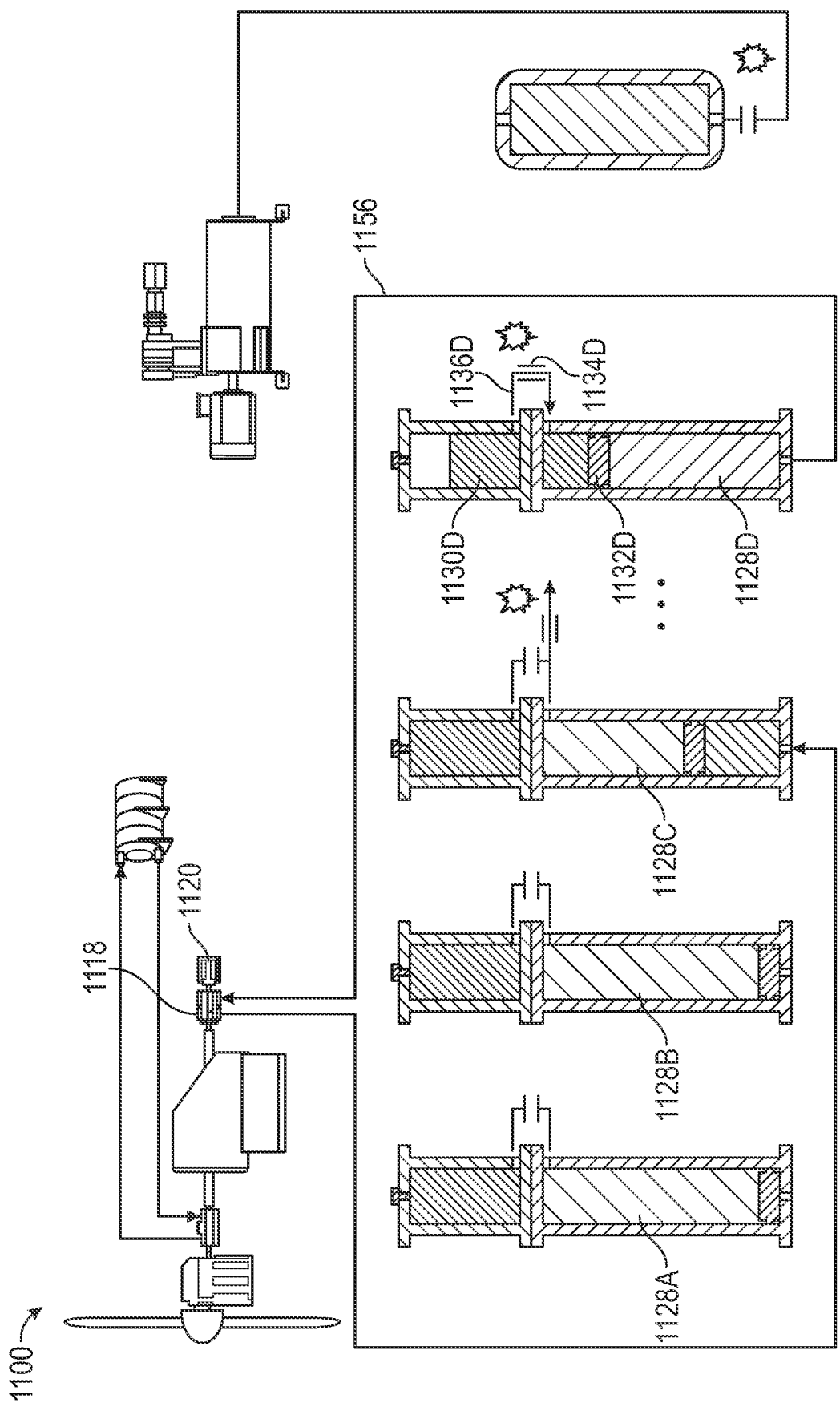
FIG. 16 is a diagram of the system of FIG. 11 using one of the chambers/reservoirs to house hydraulic fluid utilized by components of the turbine while a second of the chambers/reservoirs reciprocates stored hydraulic fluid back to drive components of the turbine.

FIG. 16 provides an example of the system 1100 mode where return oil (hydraulic fluid) from the motor 1118 and makeup pump 1120 can be stored in a second of the hydraulic fluid/lower pressure reservoirs 1128A, 1128B, 1128C and 1128D (e.g. reservoir 1128C) in the manner previously described in reference to FIGS. 14 and 15 but additionally the hydraulic fluid previously stored in the reservoir 1128D (due to operation previously described) can be used to drive the motor 1118 and/or pump 1120.

This can be accomplished by passing the gas at the intermediate pressure previously stored in the intermediate pressure gas reservoir 1130D along communication line 1136D and through the opened valve 1134D to be received in the reservoir 1128D so as to cause displacement of the piston 1132D back toward the first end of the reservoir 1128D. Such displacement can cause the hydraulic fluid to flow to the motor 1118 along the communication line 1156.

Figure 17:
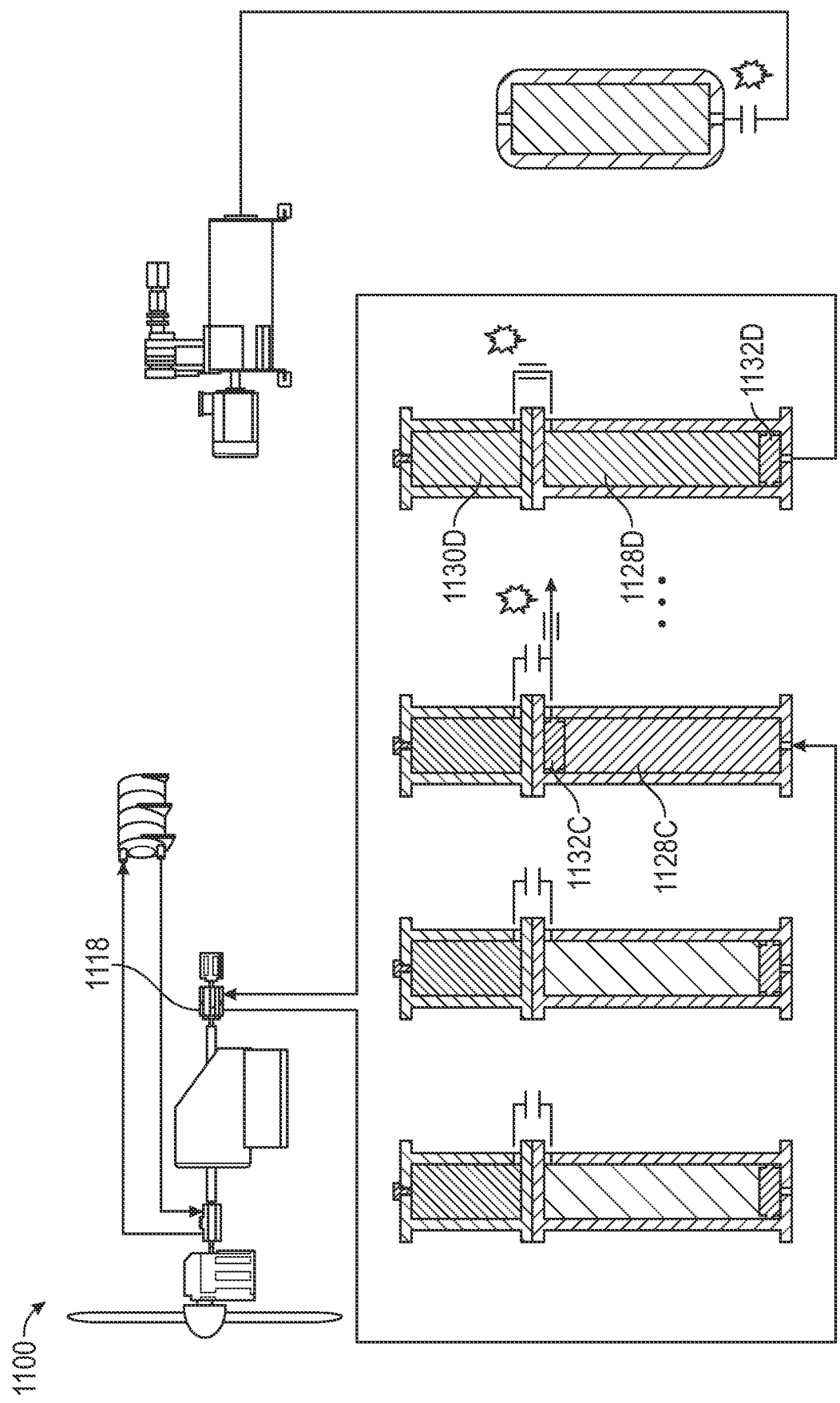
FIG. 17 is a diagram of the system of FIG. 16 where various internal pistons within the chambers/reservoirs have been driven to a maximum position.

FIG. 17 illustrates the system 1100 can accommodate the return oil as needed such as by driving the piston 1132C to the second end of the reservoir 1128C such that the lower pressure gas is substantially exhausted from the reservoir 1128C out into the atmosphere or to another apparatus, system or subassembly (not shown). At the same time, the motor 1118 can be driven by the hydraulic fluid previously stored in the reservoir 1128D which can be substantially exhausted from the reservoir 1128D due to travel of the piston 1132D back to the first end of the reservoir 1128D. At such time, the pressure of the gas within the reservoir 1128D can be equalized to that of the pressure remaining within the intermediate pressure gas reservoir 1130D.

Figure 18:
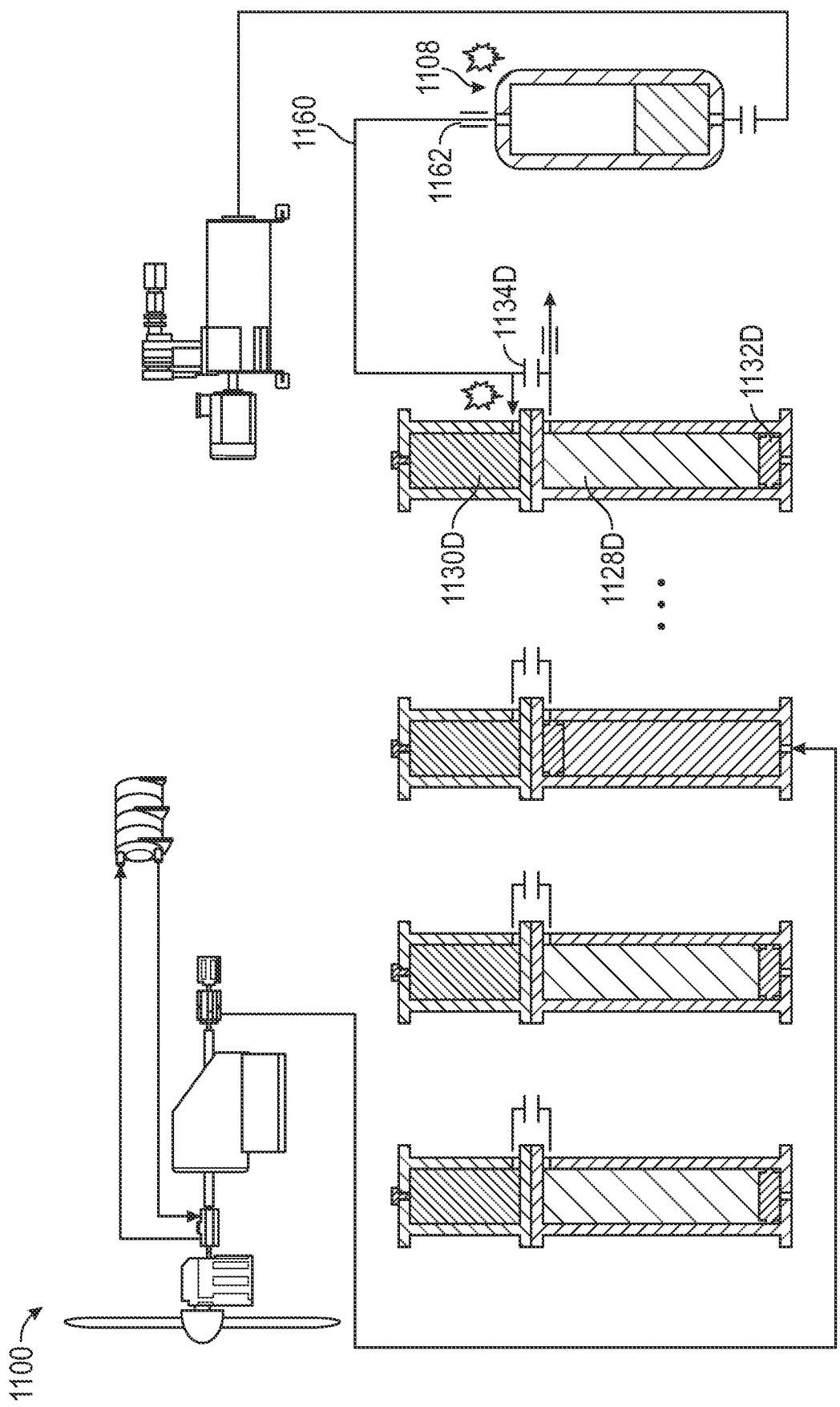
FIG. 18 is a diagram of the system of FIG. 11 where a lower pressure chamber and an intermediate pressure chamber are recharged to desired pressures with gas from a higher pressure chamber.

FIG. 18 illustrates the system 1100 operating in a mode where the intermediate pressure gas reservoir 1130D is recharged with gas to an intermediate pressure. This can be accomplished by allowing gas from the higher pressure chamber 1108 to move to the intermediate pressure gas reservoir 1130D via a communication line 1160 and through a valve 1162 that is opened. During charging, the valve 1134D can be closed once the reservoir 1128D is filled with gas to a desired lower pressure such that once the valve 1134D is closed, the gas from the higher pressure chamber 1108 is directed only to the intermediate pressure gas reservoir 1130D. Thus, the reservoir 1128D is reset and is ready to accommodate the return oil or other operative energy needs such as described in reference to FIGS. 14 and 15. Higher pressure chamber 1108 is illustrated as still storing some remaining gas, however, the higher pressure chamber 1108 may need to be recharged as illustrated and described in reference to FIG. 12 during the next high river energy generating event (with high flow velocity, high flow volume and/or high mass flow).

Thus, stored gas at various pressures can be utilized to drive hydraulic fluid to provide staging and reciprocating hydraulic power regeneration for components of the subassembly 1102. Such hydraulic fluid can be used to power other systems, components and subsystems (e.g. vehicle subsystems or other turbines) not specifically described or illustrated herein. It should be noted that unless items are being used in the specific mode illustrated by a FIG., items such as communication lines, valves and other components may not be specifically illustrated or discussed. for ease of interpretation. However, it should be recognized that the systems can include additional items not specifically illustrated. It should be further realized that FIGS. 12-18 need not occur in the particular sequence described and may be performed independently without reliance on the particulars of any prior or subsequent of FIGS. 12-18.

Figure 19:
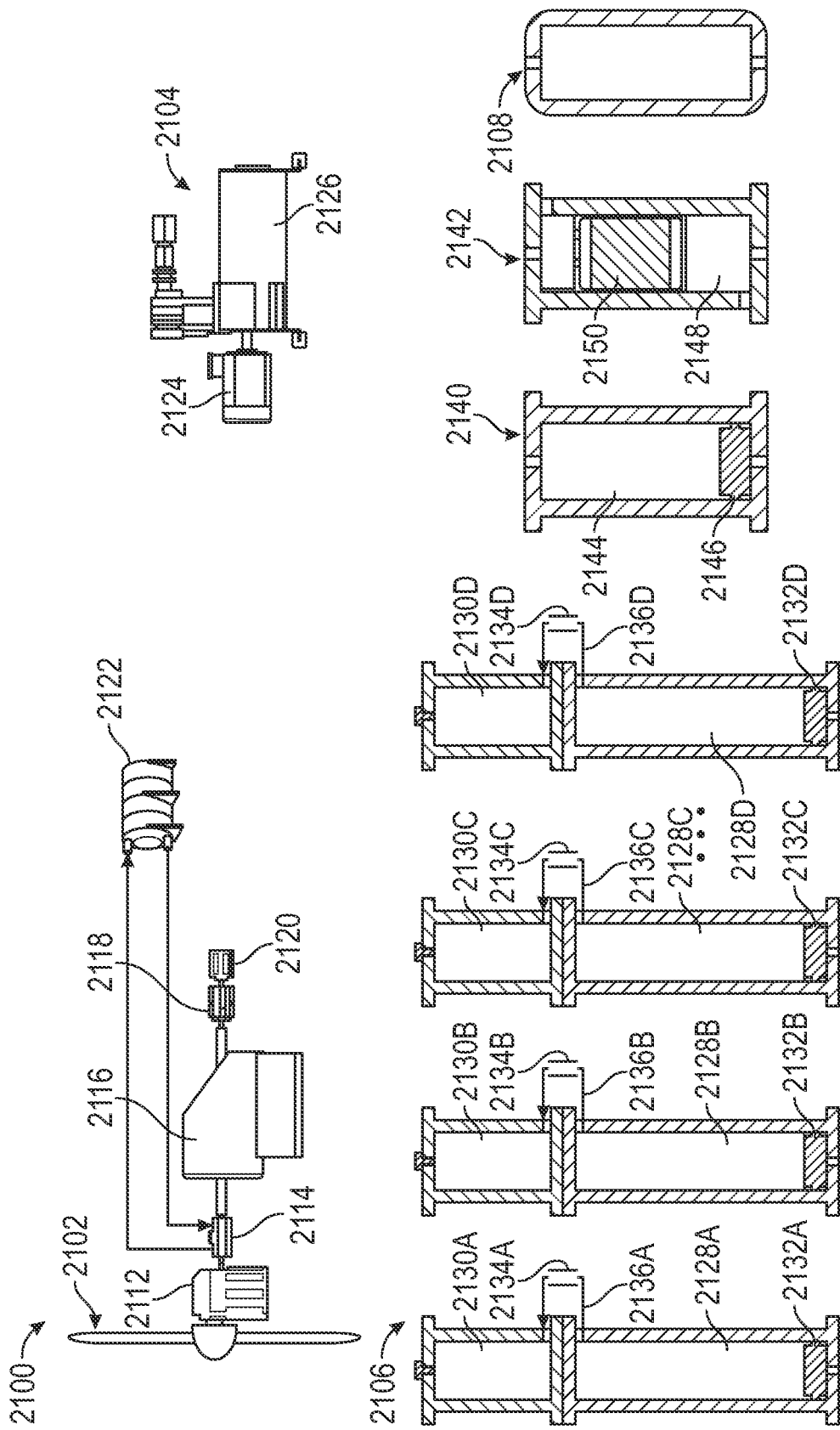
FIG. 19 is a diagram of a second system according to another example embodiment that includes various turbine components and additional subsystems and apparatuses to provide staging and reciprocating hydraulic power regeneration.

FIG. 19 shows a system 2100 according to another example of the present application. The system 2100 can make use of various apparatuses and subsystems previously described with reference to the example of FIGS. 11-18. Thus, the operation and construction of certain apparatuses and subsystems of system 2100 may not be described in great detail recognizing such description has already been provided with reference to the systems of FIGS. 1-18, for example.

The system 2100 can include a first subsystem 2102 such as for a gas turbine as previously described in prior examples. The system 2100 can in some cases further include a second subsystem 2104, a third subsystem 2106, a higher pressure gas chamber 2108, an expansion device 2140 and a cooling device 2142. As previously described in reference to previous FIGS., the first subsystem 2102 can include a turbine 2110, a gearbox 2112, a power split transmission 2114, a generator 2116, a motor 2118, a makeup pump 2120 and a hydraulic reservoir 2122. The second subsystem 2104 can include a motor 2124 and a compressor 2126. The third subsystem 2106 can include a plurality of hydraulic fluid/lower pressure gas reservoirs 2128A, 2128B, 2128C and 2128D and a plurality of intermediate pressure gas reservoirs 2130A, 2130B, 2130C and 2130D. The third system 2106 can additionally include pistons 2132A, 2132B, 2132C and 2132D, valves 2134A, 2134B, 2134C and 2134D, and communication lines 2136A, 2136B, 2136C and 2136D. The operation and construction of components of the first subsystem 2102, the second subsystem 2104, the third subsystem 2106, and the higher pressure gas chamber 2108 has been described with reference to the example of FIGS. 11-18, and thus, will not be described in reference to FIGS. 19-32 in great detail. The communication between and functionality of the various subsystems and apparatuses of the system 2100 will be described in further detail with reference to FIGS. 19-32. It is understood. that the system 2100 can have the capabilities and functions of system 1100, for example.

As shown in the example of FIG. 19, the expansion device 2140 can include a chamber 2144 and a piston 2146. The cooling device 2142 can include cooling chambers 2148A and 2148B and cooling fins 2150.

The piston 2146 can reside within the chamber 2144 and can be moveable therein (e.g. can be driven by hydraulic fluid and can be used to exhaust gas from the chamber 2144). The cooling fins 2150 can be disposed along or adjacent the cooling chambers 2148A and 2148B so as to allow for a heat exchange relationship from the cooling device 2142 (see e.g., FIGS. 31 and 32).

Figure 20:
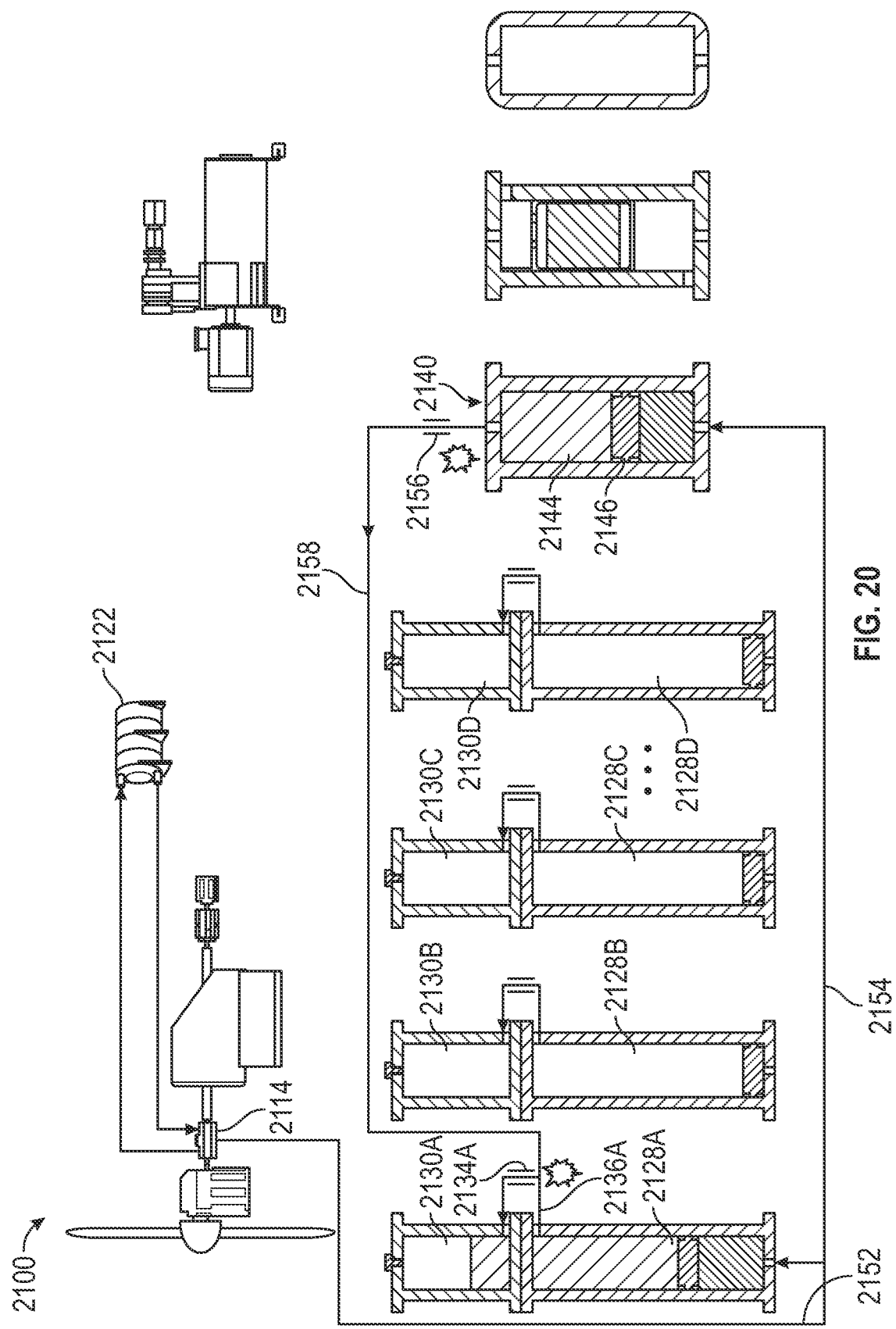
FIG. 20 is a diagram of the system of FIG. 19 operating with one of a plurality of hydraulic fluid/lower pressure gas reservoirs and one of the plurality of intermediate pressure gas reservoirs and an expansion device in a charging mode where hydraulic fluid at a higher pressure from a power split transmission can be used to charge one or more of the intermediate pressure gas reservoirs with pressurized gas to an intermediate pressure.

FIG. 20 shows the system 2100 with one of the plurality of hydraulic fluid/lower pressure gas reservoirs 2128A, 2128B, 2128C and 2128D (e.g., 2128A) and one of the plurality of intermediate pressure gas reservoirs 2130A, 2130B, 2130C and 2130D (e.g., 2130A) and the expansion device 2140 in a charging mode where hydraulic fluid at a higher pressure (relative to lower pressure hydraulic fluid from reservoir 2122) from the power split transmission 2114 can be used to charge one or more of the intermediate pressure gas reservoirs 2130A, 2130B, 2130C and 2130D (e.g., 2130A) with pressurized gas to an intermediate pressure (e.g., 210 Bar). More particularly, higher pressure hydraulic fluid from the power split transmission 2114 can be directed along communication line 2152 to fill one or more of the hydraulic fluid/lower pressure gas reservoirs 2128A, 2128B, 2128C and 2128D (e.g., 2128A) and can additionally or alternatively be directed along communication line 2154 to fill expansion device 2140. Thus, at least a portion of the expansion chamber 2144 can be filled with the hydraulic fluid so as to drive movement of the piston 2146 to force gas from the expansion device 2140 through a port, a valve 2156 and a communication line 2158 to one or more of the plurality of hydraulic fluid/lower pressure gas reservoirs 2128A, 2128B, 2128C and 2128D (e.g., 2128A) and/or one of the plurality of intermediate pressure gas reservoirs 2130A, 2130B, 2130C and 2130D (e.g., 2130A).

Such gas in the intermediate pressure gas reservoir 2130A, the hydraulic fluid/lower pressure gas reservoir 2128A and/or the expansion chamber 2144 can have a pressure of 210 Bar according to one example. However, other pressures are contemplated. FIG. 20 illustrates the hydraulic fluid/lower pressure reservoirs 2128A, 2128B, 2128C and 2128D also as being filled with a gas to the intermediate pressure (e.g., 210 Bar). Again, although 210 Bar is used, such use is exemplary and other pressures are contemplated. Similarly, the example of FIG. 20 shows the expansion chamber 2144 as being filled with gas to the intermediate pressure (e.g., 210 Bar). Again, although 210 Bar is used, such use is exemplary and other pressures are contemplated. Pressures within the intermediate pressure gas reservoir 2130A, the hydraulic fluid/lower pressure gas reservoir 2128A and/or the expansion chamber 2144 can differ.

Although the hydraulic fluid is shown as entering the hydraulic fluid/lower pressure gas reservoir 2128A and the expansion chamber 2144 simultaneously, according to some examples such process can occur sequentially. Similarly, although the gas is shown as entering the hydraulic fluid/lower pressure gas reservoir 2128A prior to entering the intermediate pressure gas reservoir 2130A along communication line 2136A and through the valve 2134A, in some examples the gas can bypass the hydraulic fluid/lower pressure gas reservoir 2128A entirely and be directed to the intermediate pressure gas reservoir 2130A directly.

Figure 21:
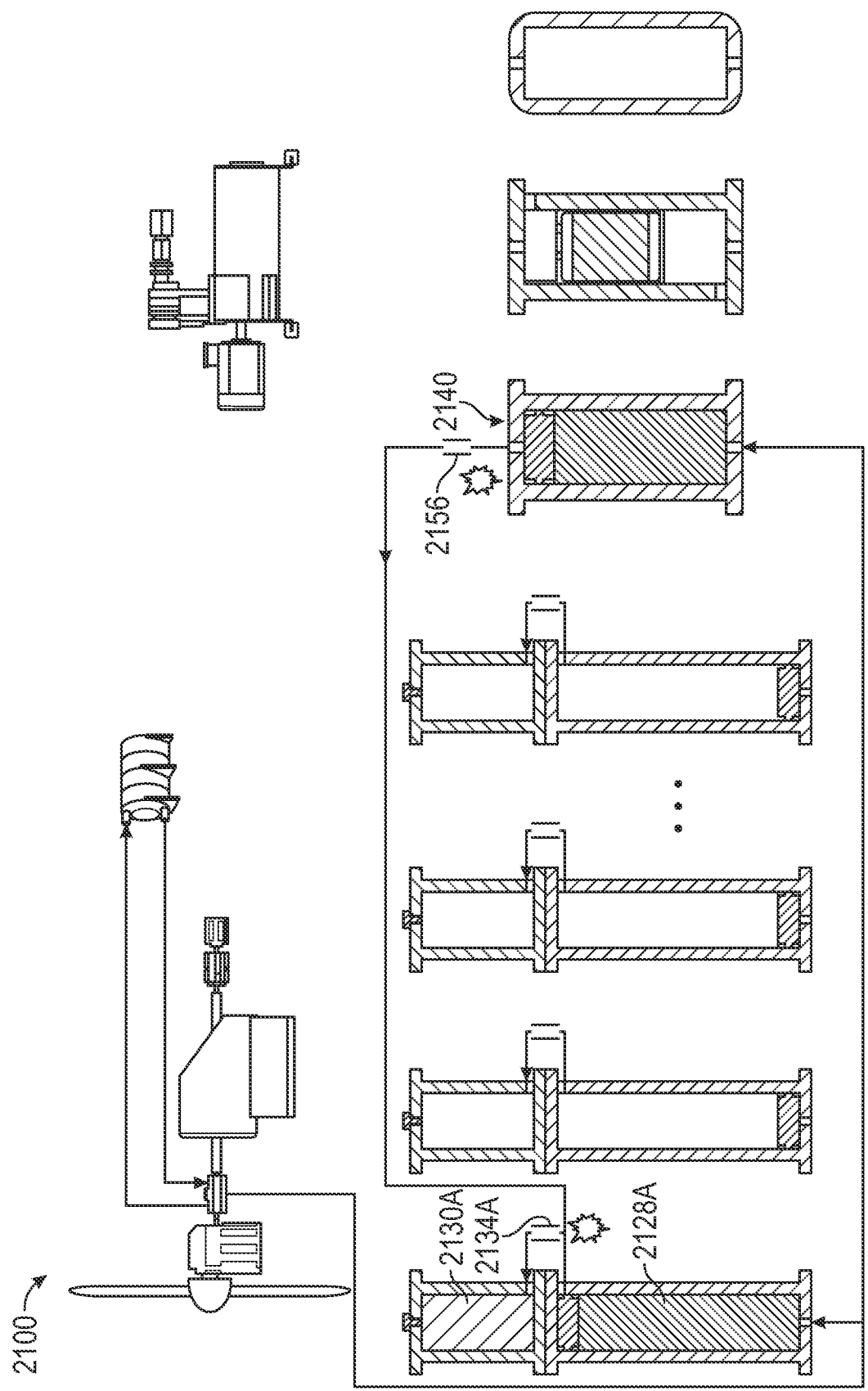
FIG. 21 is a diagram of the system of FIG. 19 where one of the intermediate pressure gas reservoirs is fully charged with gas at an intermediate pressure, and one of the hydraulic fluid/lower pressure reservoirs and the expansion chamber are fully charged with the hydraulic fluid.

FIG. 21 shows a mode of operation of the system 2100 where the intermediate pressure gas reservoir 2130A is fully charged with gas at an intermediate pressure, and the hydraulic fluid/lower pressure reservoir 2128A and the expansion chamber 2144 are fully charged with the hydraulic fluid. This state can accomplished due to the excess power generated for example by excess river energy. All of the valves (e.g., valves 2134A and 2156) can be shut in this condition.

Figure 22:
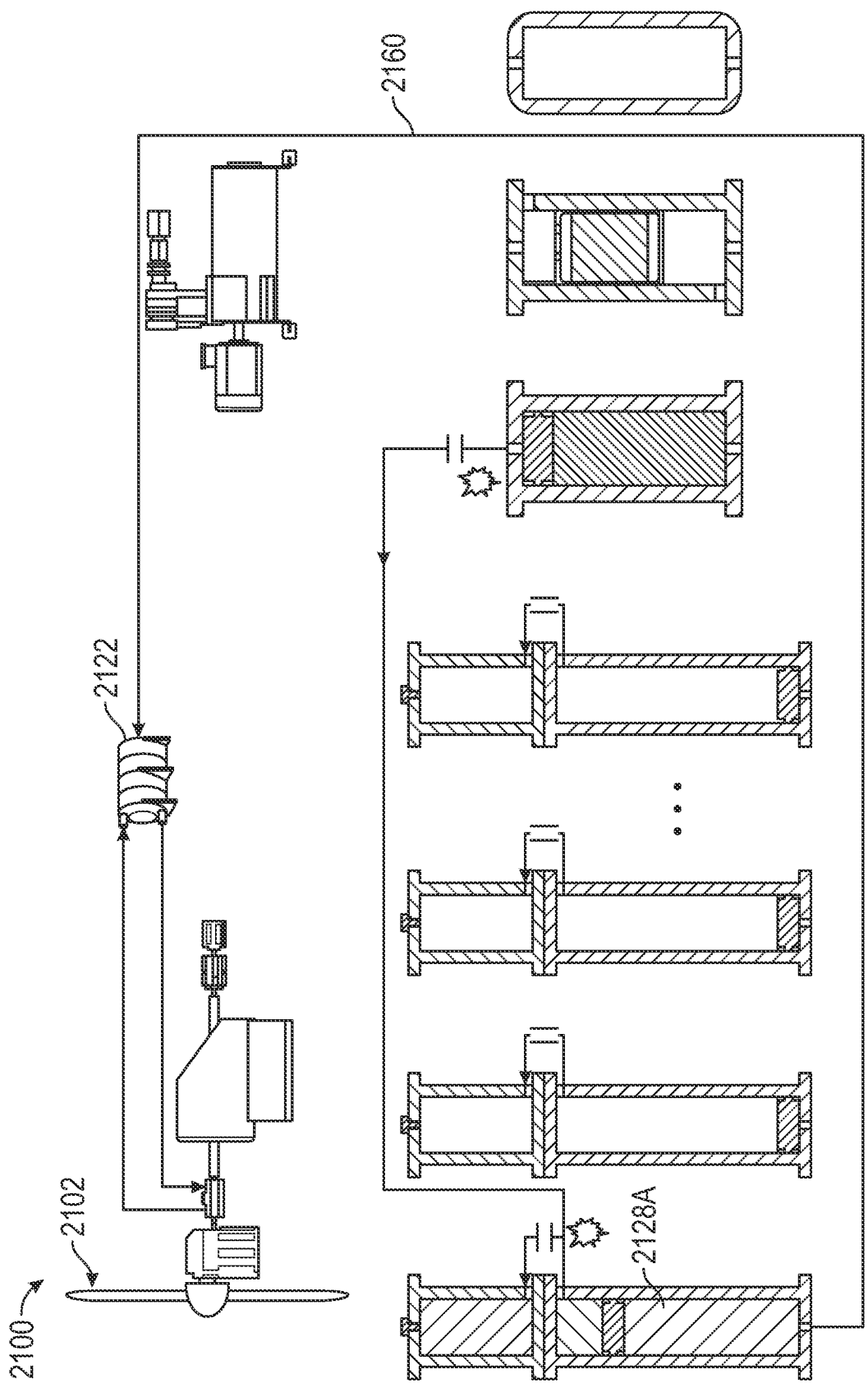
FIG. 22 is a diagram of the system of FIG. 19 where the hydraulic fluid from the one hydraulic fluid/lower pressure reservoir is exhausted back to a hydraulic reservoir along a communication line.
Figure 23:
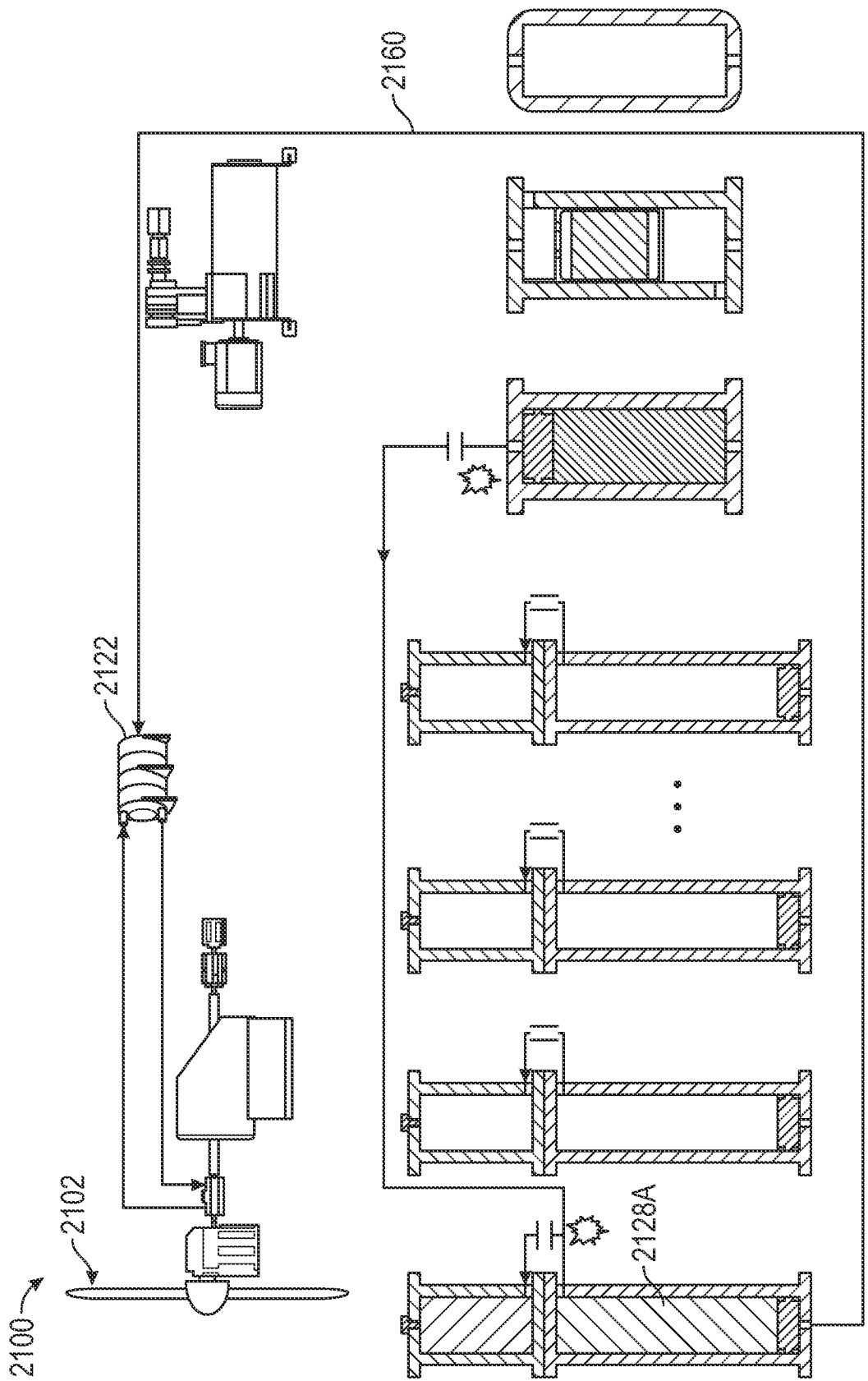
FIG. 23 is a diagram of the system of FIG. 19 further illustrating a mode where the hydraulic fluid from the one hydraulic fluid/lower pressure reservoir is exhausted back to a hydraulic reservoir along a communication line.

FIGS. 22 and 23 show a mode of the system 2100 where the hydraulic fluid from the hydraulic fluid/lower pressure reservoir 2128A is exhausted back to the reservoir 2122 along communication line 2160. According to other examples, the hydraulic fluid can be directed back to the power split transmission 2114 directly or to another component of the first subsystem 2102. FIG. 23 shows the hydraulic fluid having been fully exhausted back to the reservoir 2122.

Figure 24:
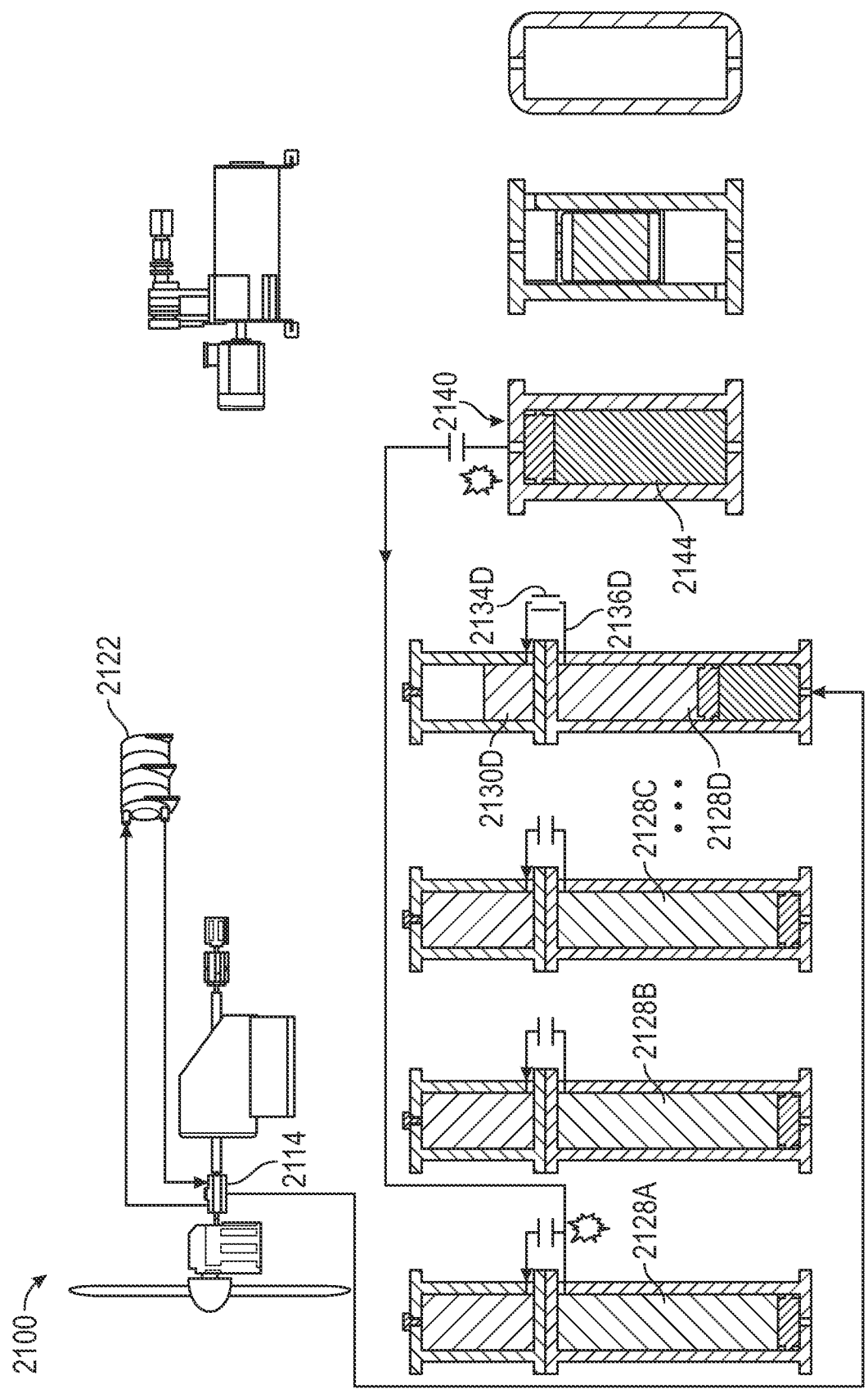
FIG. 24 is a diagram of the system of FIG. 19 where several of the plurality of hydraulic fluid/lower pressure gas reservoirs are fully charged with gas to a desired pressure and one of the hydraulic fluid/lower pressure gas reservoirs is partially charged with gas.

FIG. 24 shows a mode of the system 2100 where several of the plurality of hydraulic fluid/lower pressure gas reservoirs 2128A, 2128B, 2128C are fully charged with gas to a desired pressure (e.g., to 10 Bar) and one of the hydraulic fluid/lower pressure gas reservoirs 2128D is partially charged with gas. Similarly, several of the plurality of intermediate pressure gas reservoirs 2130A, 2130B, 2130C are fully charged to a desired pressure (e.g., to 210 Bar) and one of the intermediate pressure gas reservoirs 2130D is partially charged. The expansion device 2140 is fully charged holding hydraulic fluid at a higher pressure (relative to lower pressure hydraulic fluid, from reservoir 2122) from the power split transmission 2114. The hydraulic fluid from the power split transmission 2114 can be directed to the hydraulic fluid/lower pressure gas reservoir 2128D and is in the process of filling the hydraulic fluid/lower pressure gas reservoir 2128D by displacing the piston 2132D so as to displace the gas from the hydraulic fluid/lower pressure gas reservoir 2128D through communication line 2136D and valve 2134D to the intermediate pressure gas reservoirs 2130D.

Such gas in the intermediate pressure gas reservoir 2130D can have a pressure of 210 Bar according to one example. However, other pressures are contemplated. FIG. 24 illustrates the hydraulic fluid/lower pressure reservoirs 2128A, 2128B and 2128C also as being filled with gas to a lower pressure (e.g., 10 Bar). Again, although 10 Bar is used, such use is exemplary and other pressures are contemplated.

Figure 25:
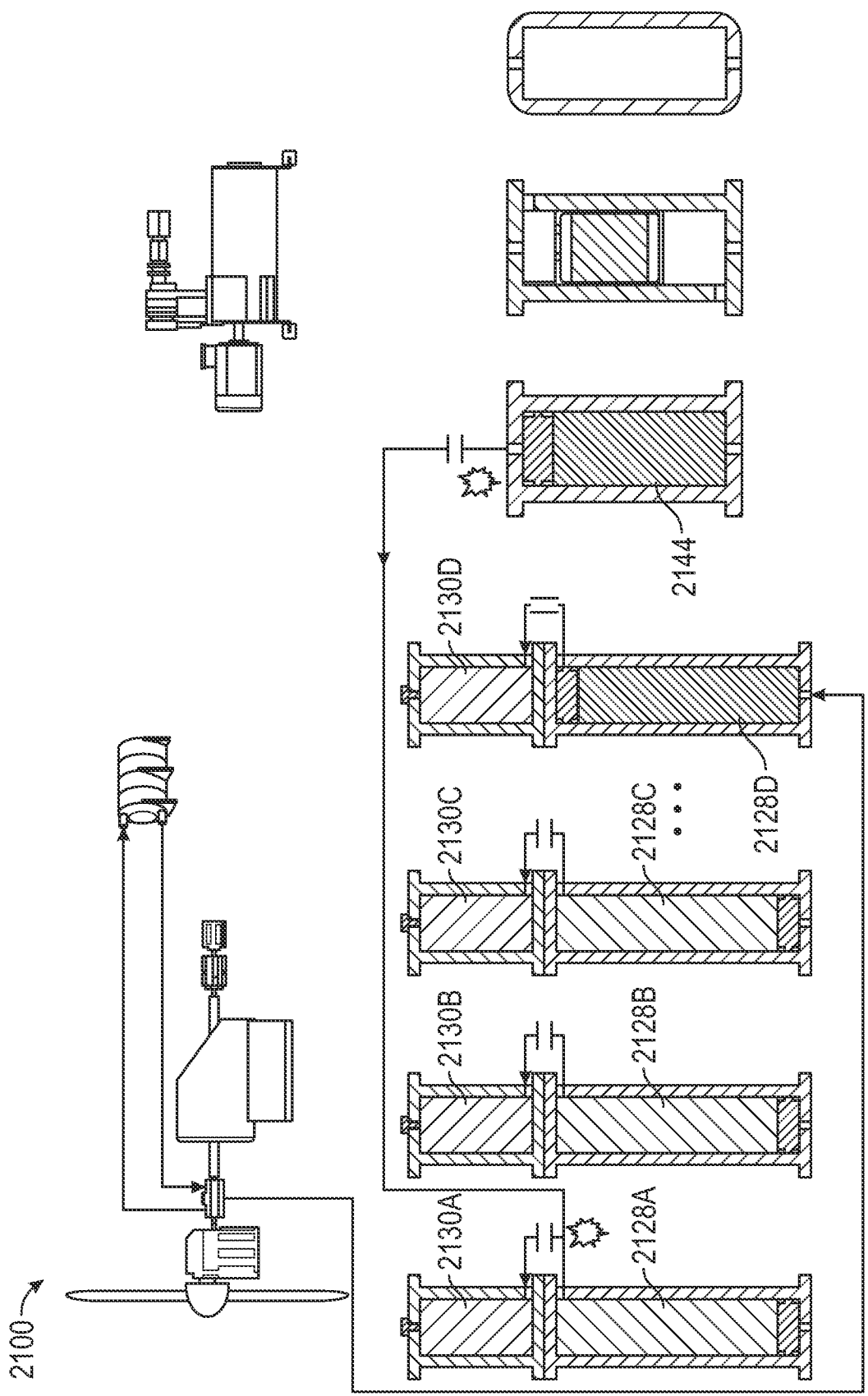
FIG. 25 is a diagram of the system of FIG. 19 where the intermediate pressure gas reservoirs can each be fully charged with gas at the intermediate pressure, the hydraulic fluid/lower pressure reservoirs can each be fully charged with gas at the relatively lower pressure, and one of the hydraulic fluid/lower pressure reservoirs and the expansion chamber can each be fully charged with the hydraulic fluid.

FIG. 25 shows a mode of operation of the system 2100 where the intermediate pressure gas reservoirs 2130A, 2130B, 2130C and 2130D can each be fully charged with gas at the intermediate pressure, the hydraulic fluid/lower pressure reservoirs 2128A, 2128B and 2128C can each be fully charged with gas at the relatively lower pressure, and the hydraulic fluid/lower pressure reservoir 2128D and the expansion chamber 2144 can each be fully charged with the hydraulic fluid. All of the valves can be shut in this condition.

Figure 26:
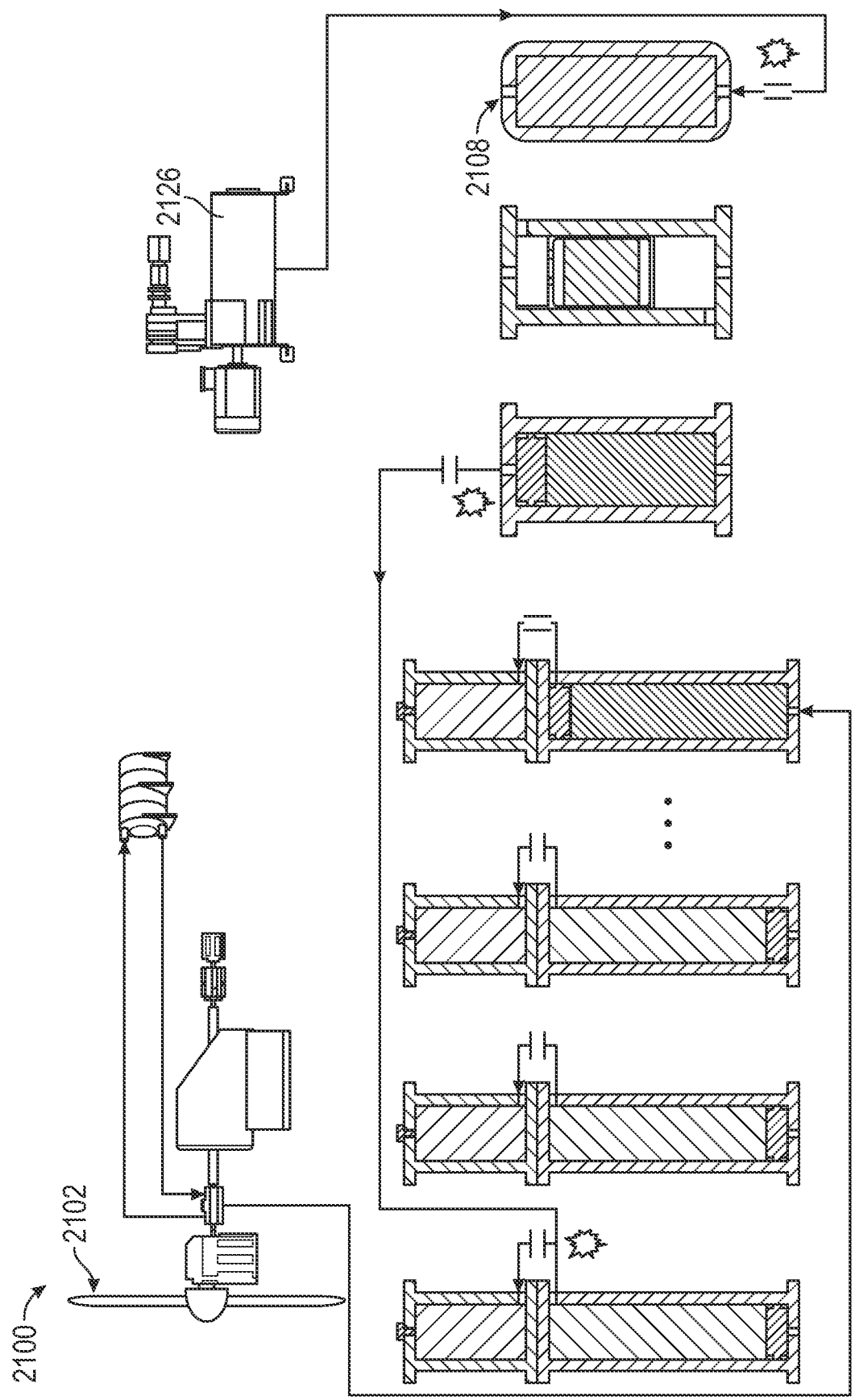
FIG. 26 is a diagram of the system of FIG. 19 showing a mode of operation similar to that of FIG. 25 but additionally illustrating the higher pressure gas chamber can be charged with gas compressed by the compressor.

FIG. 26 shows a mode of operation of the system 2100 similar to that of FIG. 25 but additionally illustrating the higher pressure gas chamber 2108 can be charged with gas compressed by the compressor 2126 in the manner previously described in reference to FIG. 12. The higher pressure gas chamber 2108 can be charged to 350 Bar, for example. However, other desired pressures for the gas are contemplated. The compressor 2126 can be powered by excess energy from subsystem 2102 generated by excess river energy, or the like.

Figure 27:
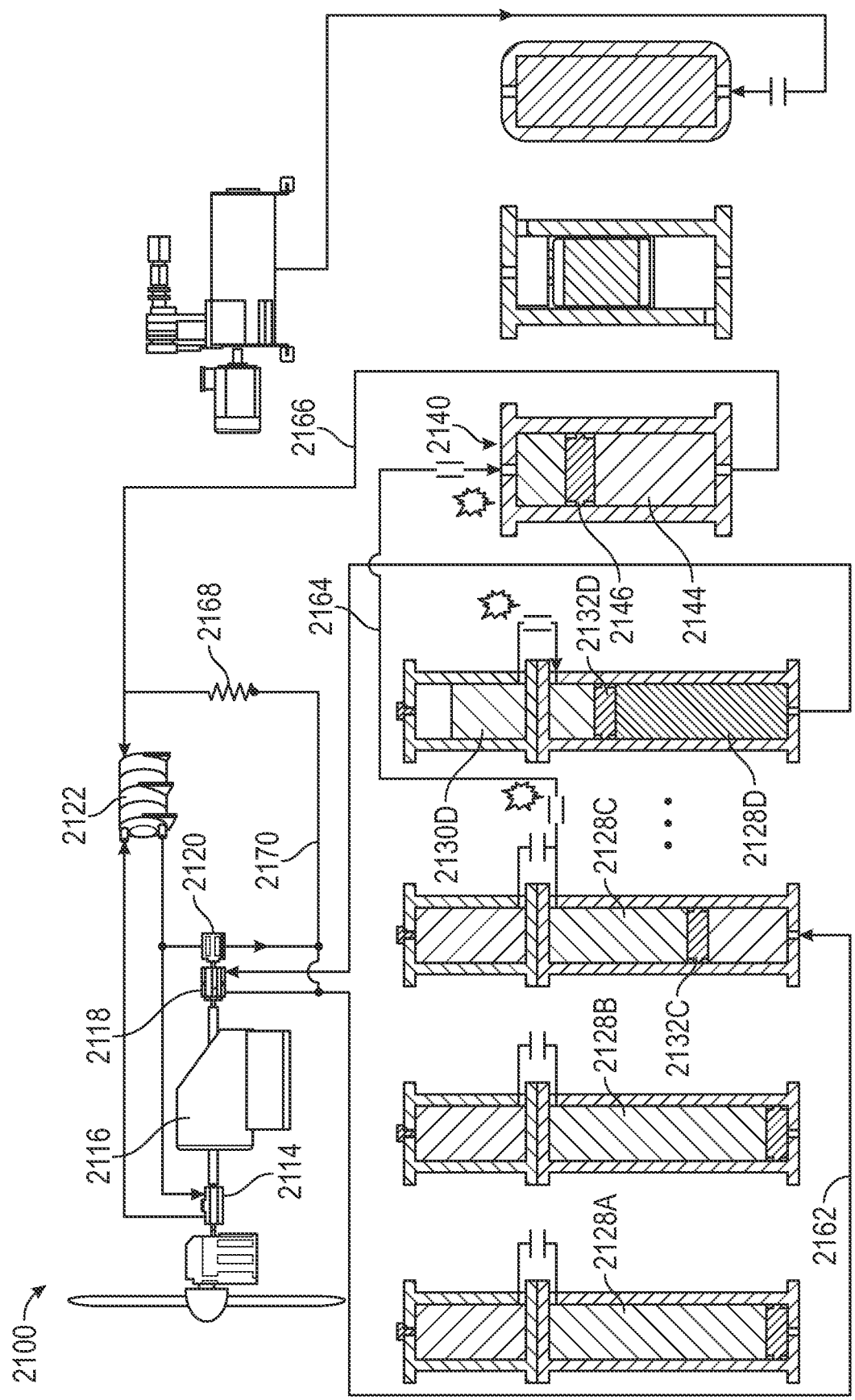
FIG. 27 is a diagram of the system of FIG. 19 where the hydraulic fluid at a relatively higher pressure is used to drive a motor coupled to the generator.

FIG. 27 shows an operation mode for the system 2100 where the hydraulic fluid at a relatively higher pressure as compared to the pressure of the hydraulic fluid within the reservoir 2122) can be used to drive the motor 2118 coupled to the generator 2116. The hydraulic fluid at relatively higher pressure can be exhausted from the hydraulic fluid/lower pressure reservoir 2128D to the motor 2118 by piston 2132D, which can be driven by gas entering the hydraulic fluid/lower pressure reservoir 2128D from the intermediate pressure gas reservoir 2130D. Furthermore according to the operation mode, hydraulic fluid comprising return oil from the motor 2118 and/or makeup pump 2120 (at a relatively lower pressure as compared to the higher pressure hydraulic fluid) can be directed along a communication line 2162 to one or more of the hydraulic fluid/lower pressure reservoirs 2128A, 2128B and 2128C (e.g. reservoir 2128C). The addition of the return oil to the hydraulic fluid/lower pressure reservoir 2128C can drive the piston 2132C toward the second end of the reservoir 2128C displacing gas at a lower pressure (e.g., 10 Bar) to the expansion device 2140 along a communication line 2164. The gas can be retained within the expansion chamber 2144 and can cause displacement of the piston 2146. The movement of the piston 2146 can drive hydraulic fluid at relatively lower pressure back to the reservoir 2122. According to some examples, all or a portion of the hydraulic fluid traveling toward the reservoir 2122 from the expansion chamber 2144 along a communication line 2166 can be diverted through a valve 2168 and along communication line 2170 back to the communication line 2162. As such the hydraulic fluid can join or supplant the return oil and can be directed to the one or more of the hydraulic fluid/lower pressure reservoirs 2128A, 2128B and 2128C (e.g. reservoir 2128C).

It should be noted that according to the operation mode of FIG. 27, it can be possible to cycle gas and/or hydraulic fluid at high speed using a very small amount of fluid in an automobile, for example.

Figure 28:
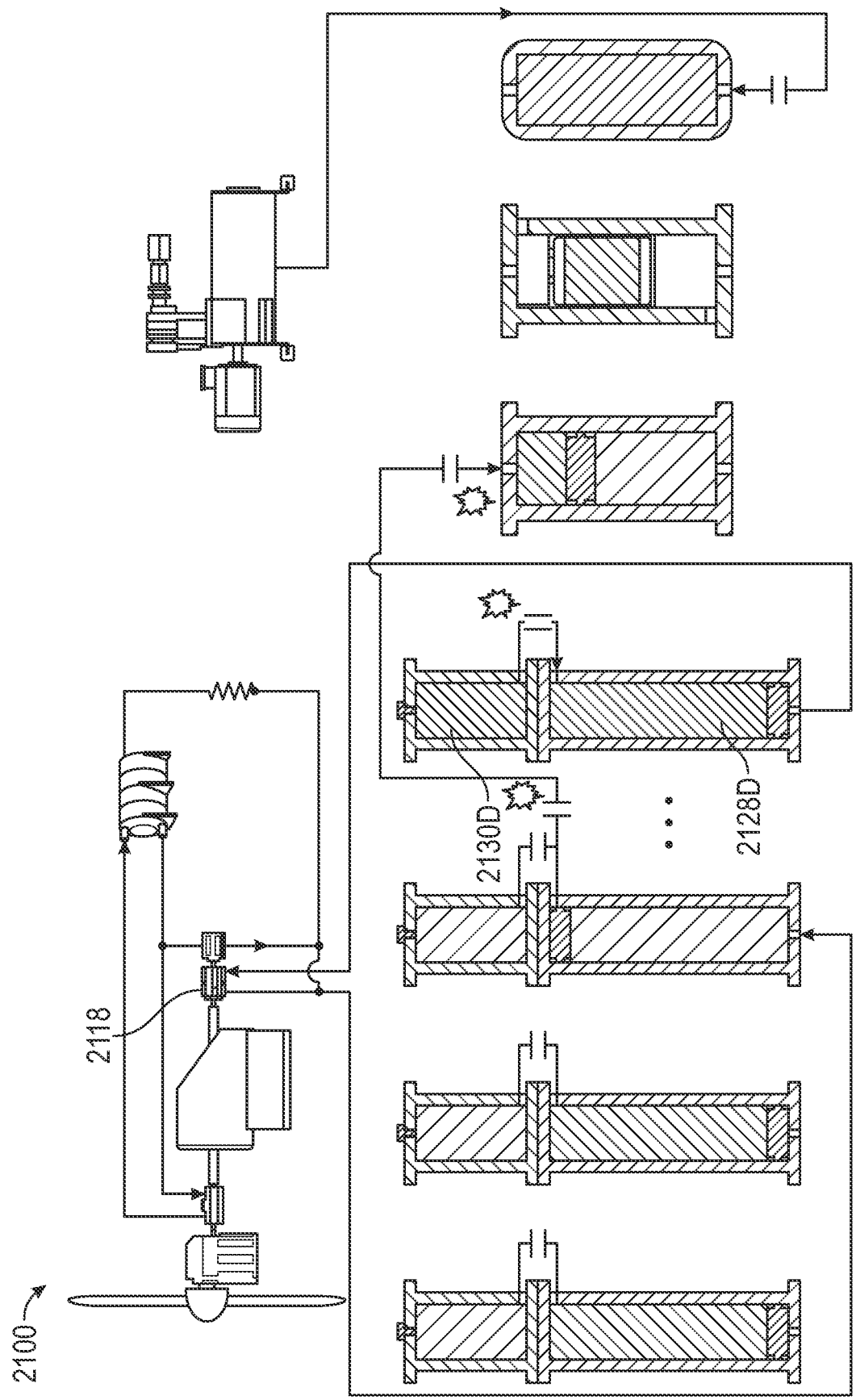
FIG. 28 is a diagram of the system of FIG. 19 where the hydraulic fluid from the hydraulic fluid/lower pressure reservoir to the motor has been completely exhausted.

FIG. 28 shows an operation mode for the system 2100 where the hydraulic fluid from the hydraulic fluid/lower pressure reservoir 2128D to the motor 2118 has been completely exhausted. Gas from the intermediate pressure gas reservoir 2130D can be allowed to equalize to substantially a same pressure (e.g. to 140 Bar) with gas in the hydraulic fluid/lower pressure reservoir 2128D.

Figure 29:
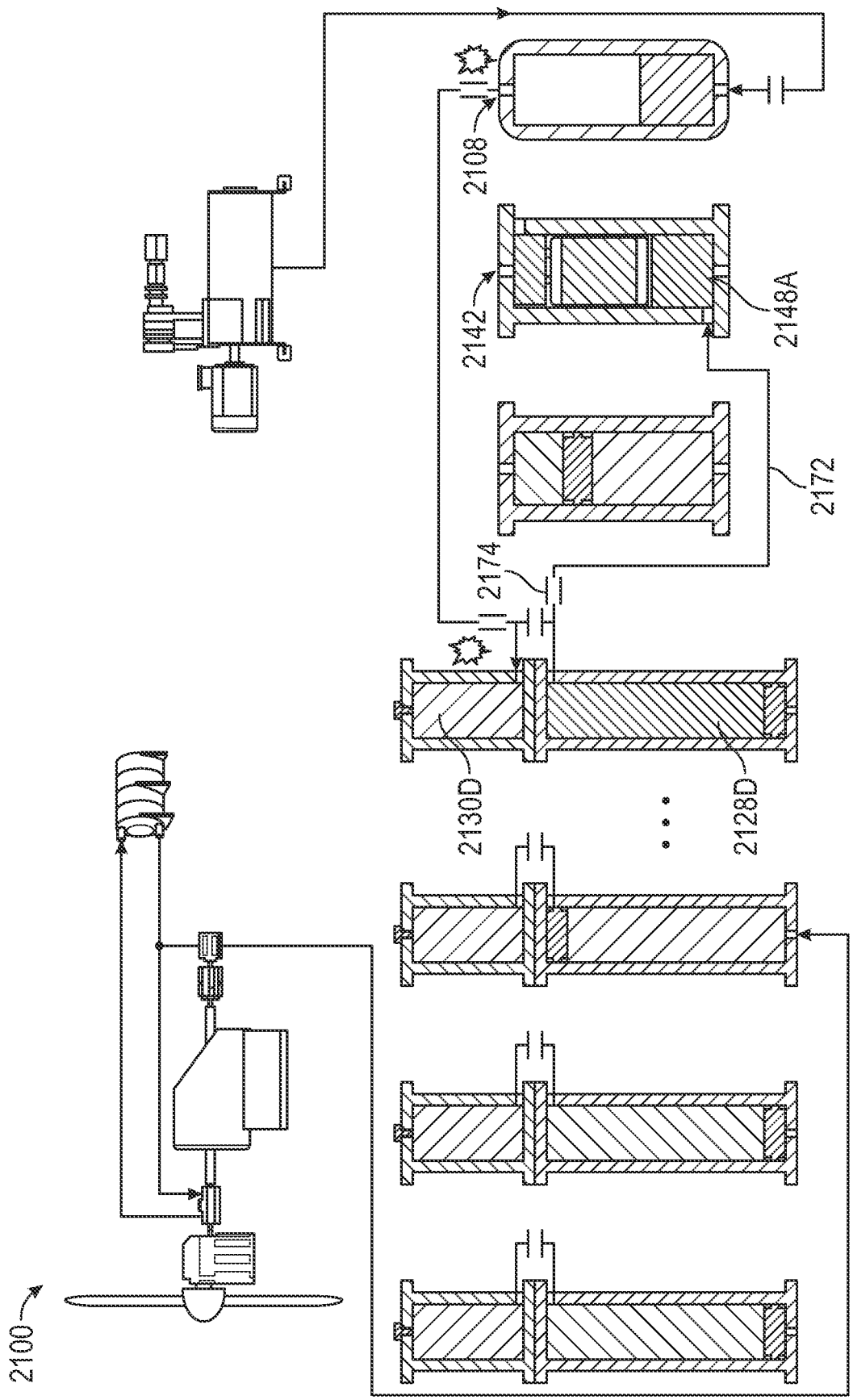
FIG. 29 is a diagram of the system of FIG. 19 where gas within the intermediate pressure gas reservoir can be restored to a desired pressure using gas from the higher pressure chamber.

FIG. 29 shows an operation mode for the system 2100 where gas within the intermediate pressure gas reservoir 2130D can be restored to a desired pressure using gas from the higher pressure chamber 2108. Such process is described in further detail with reference to FIG. 18, for example. Furthermore, gas held by the hydraulic fluid/lower pressure reservoir 2128D can be directed along line 2172 through a valve 2174 to the cooling device 2142 so as to fill the cooling chamber 2148A.

Figure 30:
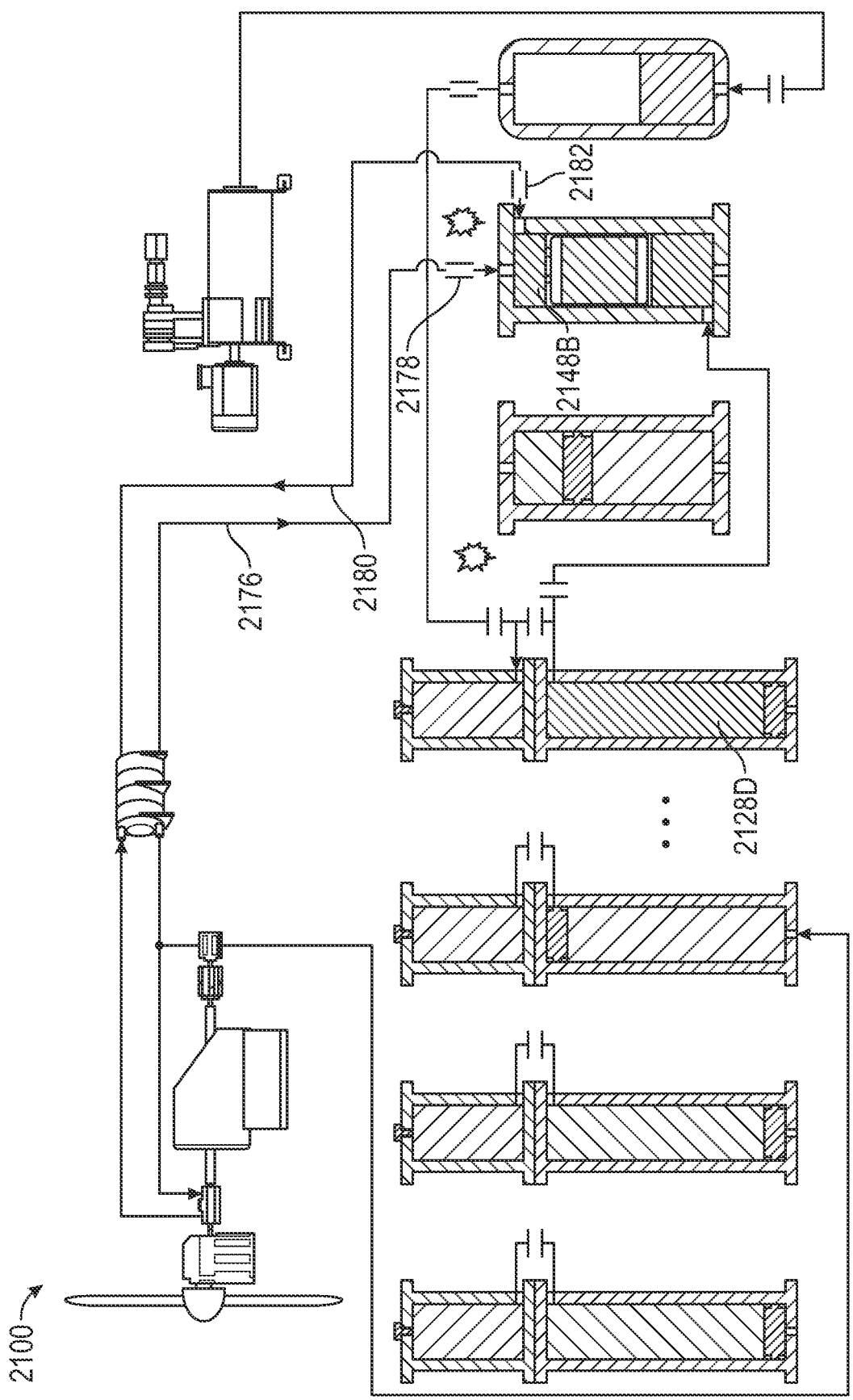
FIG. 30 is a diagram of the system of FIG. 19 where hydraulic fluid from the reservoir can travel along a first communication line to a cooling chamber and from the cooling chamber can further travel back to the reservoir along a second communication line.

FIG. 30 shows that in a further operation mode for the system 2100, hydraulic fluid from the reservoir 2128D can travel along communication line 2176 through valve 2178 to the cooling chamber 2148B and from the cooling chamber 2148B can travel back to the reservoir along communication line 2180 and through valve 2182. The relationship shown and describe can be used to cool the hydraulic fluid.

Figure 31:
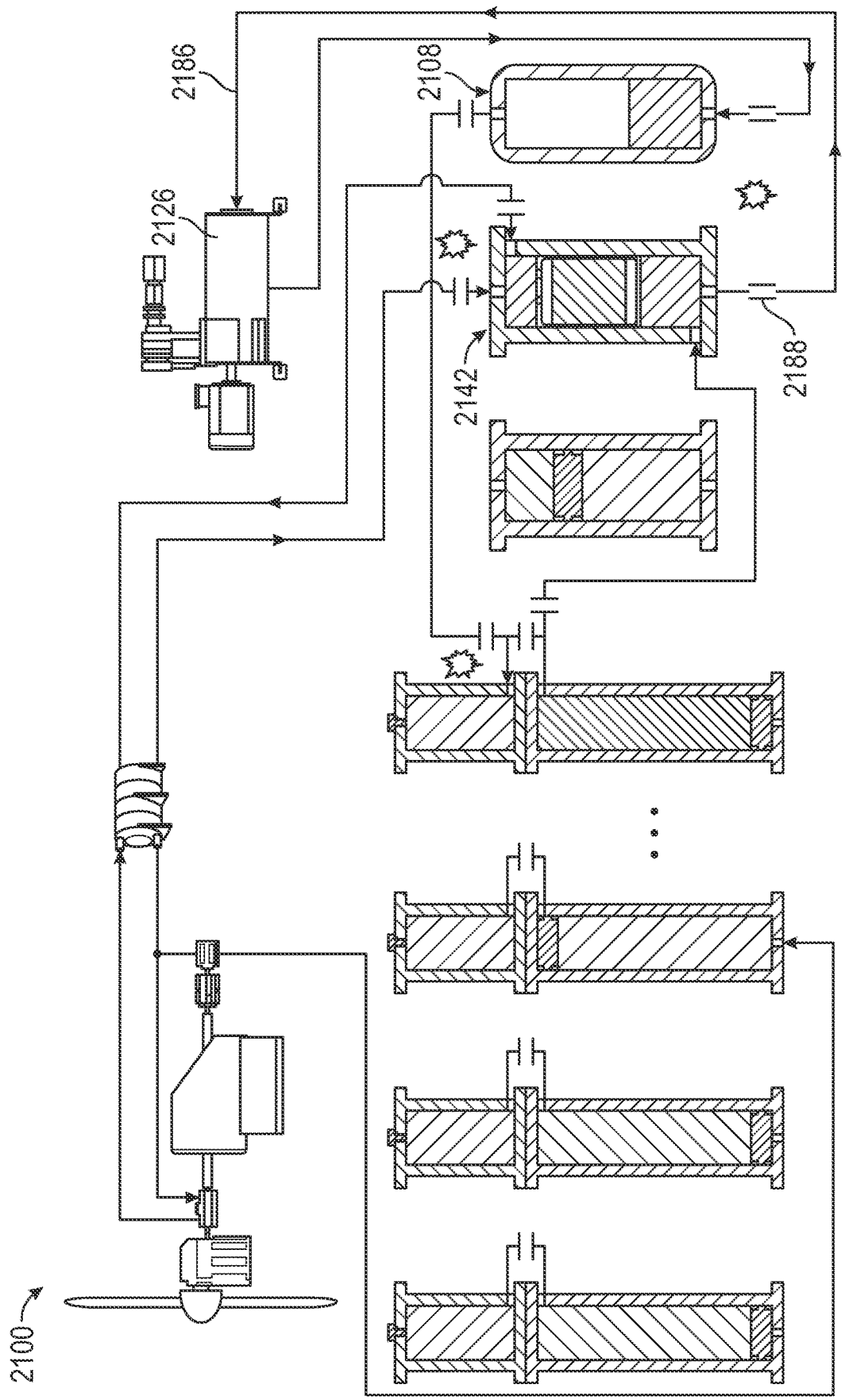
FIG. 31 is a diagram of the system of FIG. 19 where gas from the cooling device once held therein can move along a communication line to a compressor.

FIG. 31 shows an operation mode for the system 2100 where gas from the cooling device 2142 once held therein can move along communication line 2186 through valve 2188 to the compressor 2126. The compressor 2126 can compress the air according to the process previously described in reference to FIG. 18 and can communicate the compressed air (now at a relatively higher pressure) to the higher pressure chamber 2108. In this manner the efficiency of the system 2100 can be increased.

Figure 32:
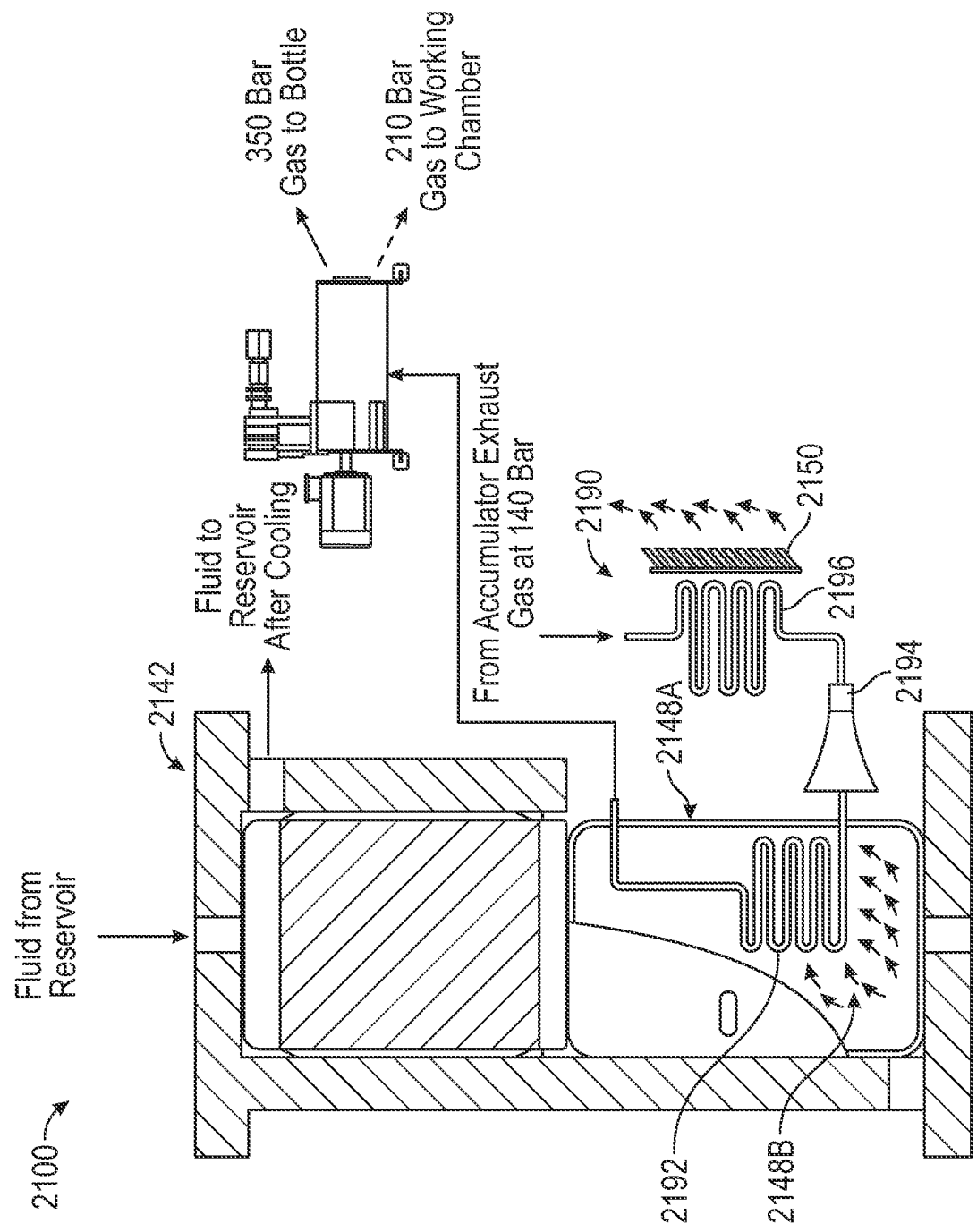
FIG. 32 is a diagram of the system of FIG. 19 undergoing a mode of operation similar to that of FIG. 31 and further illustrating a subsystem that can be used with the system.

FIG. 32 shows the mode of operation for the system 2100 of FIG. 31 in further detail and with the use of a further subsystem 2190. In particular, FIG. 32 shows the cooling device 2142 in further detail as part of the subsystem 2190. The subsystem 2190 can include the cooling chamber 2148A (e.g., a liquid-to-air evaporator 2192), an expansion device 2194, and a condenser 2196. The condenser 2196, the expansion device 2194 and the condenser 2196 can communicate with one another to allow for passage of the gas/condensed gas (e.g., liquid) in a circuit.

Hydraulic fluid within the cooling chamber 2148B can be circulated (e.g., by a dedicated pump or by the action of one or more components of subsystem 2102) within the cooling chamber 2148B so as to come into contact with the liquid-to-air evaporator 2192 in a heat exchange relationship where heat is drawn from the hydraulic fluid to the gas. The expansion device 2194 can arranged upstream as defined by the direction of flow of the gas) of the liquid-to-air evaporator 2192 and can be configured to control the amount of condensed gas flow into the evaporator thereby controlling the superheating at the outlet of the liquid-to-air evaporator 2192. The condenser 2196 can be arranged adjacent the fins 2150 to allow for heat exchange away from the cooling device 2142. The use of subsystem 2190 can further improve the efficiency of the system 2100.

Further details shown in FIG. 32 are shown and described in further detail in reference to FIGS. 18 and 31 of the present application.

Thus, stored gas at various pressures can be utilized to drive hydraulic fluid to provide staging and reciprocating hydraulic power regeneration for components of the subassembly 2102. Such hydraulic fluid can be used to power other systems, components and subsystems (e.g. vehicle subsystems or other turbines) not specifically described or illustrated herein. It should be noted that unless items are being used in the specific mode illustrated by a FIG., items such as communication lines, valves and other components may not be specifically illustrated or discussed for ease of interpretation. However, it should be recognized that the systems can include additional items not specifically illustrated. It should be further realized that FIGS. 19-32 need not occur in the particular sequence described and may be performed independently without reliance on the particulars of any prior or subsequent of FIGS. 19-32. As used herein "hydraulic fluid" is not limited to oil but can include glycol and other suitable fluids. The term "river" is not limited to a natural flowing body of water but includes, for example, man made flows (e.g., dam diversions or off-flows, canals, inlets, hydraulically induced flows, or the like). The term river also includes any flowing body of water such as ocean tidal regions.

Figure 33:
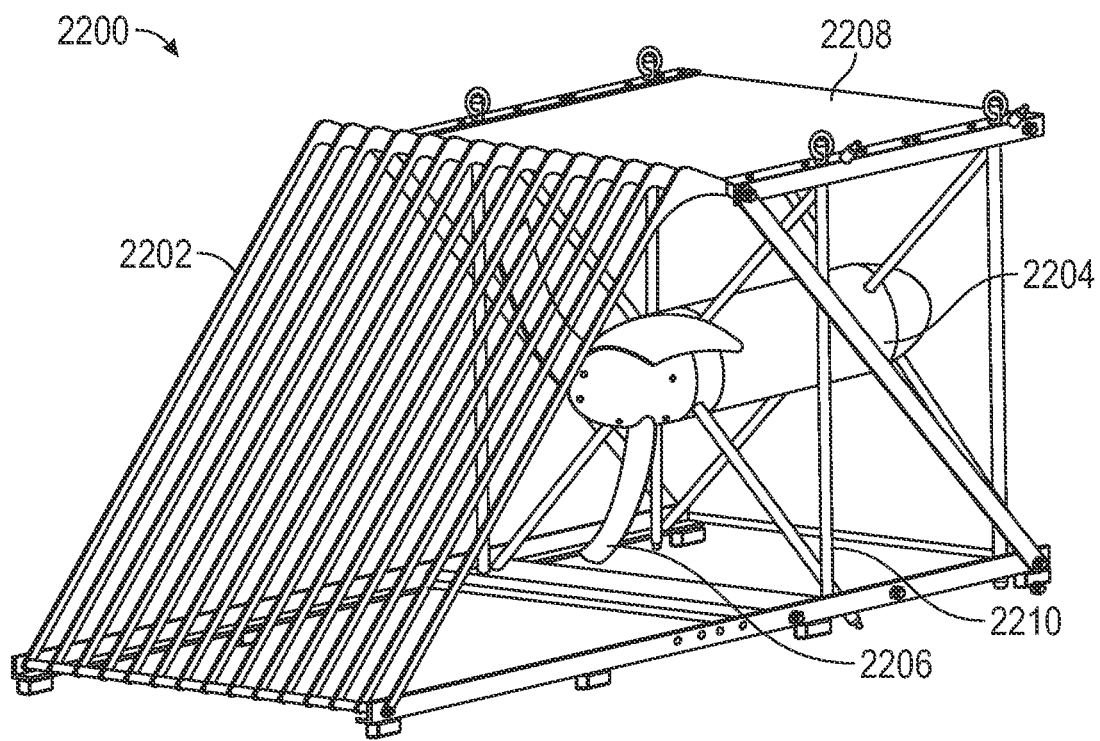
FIG. 33 is a perspective view of a hydrokinetic turbine that can be utilized with the systems and methods according to one example.

FIG. 33 shows an example of a hydrokinetic turbine 2200 that can be used with any of the systems or methods discussed herein. The turbine 2200 can be installed on the bed of a river or behind a traditional hydrokinetic power plant, for example. The turbine 2200 can be compact (e.g., with a blade diameter of up to 1000 mm) and can have a debris protection shield 2202 facing upstream. A turbine rotor 2204 with blades 2206 can be placed in proximity but spaced from the debris protection shield 2202 and a housing 2208. The housing 2208 via struts 2210 can support the turbine rotor 2204 and additional components (e.g., the generator, the power split transmission coupling, etc.). The turbine rotor 2204 can include the additional components.

Figure 34:
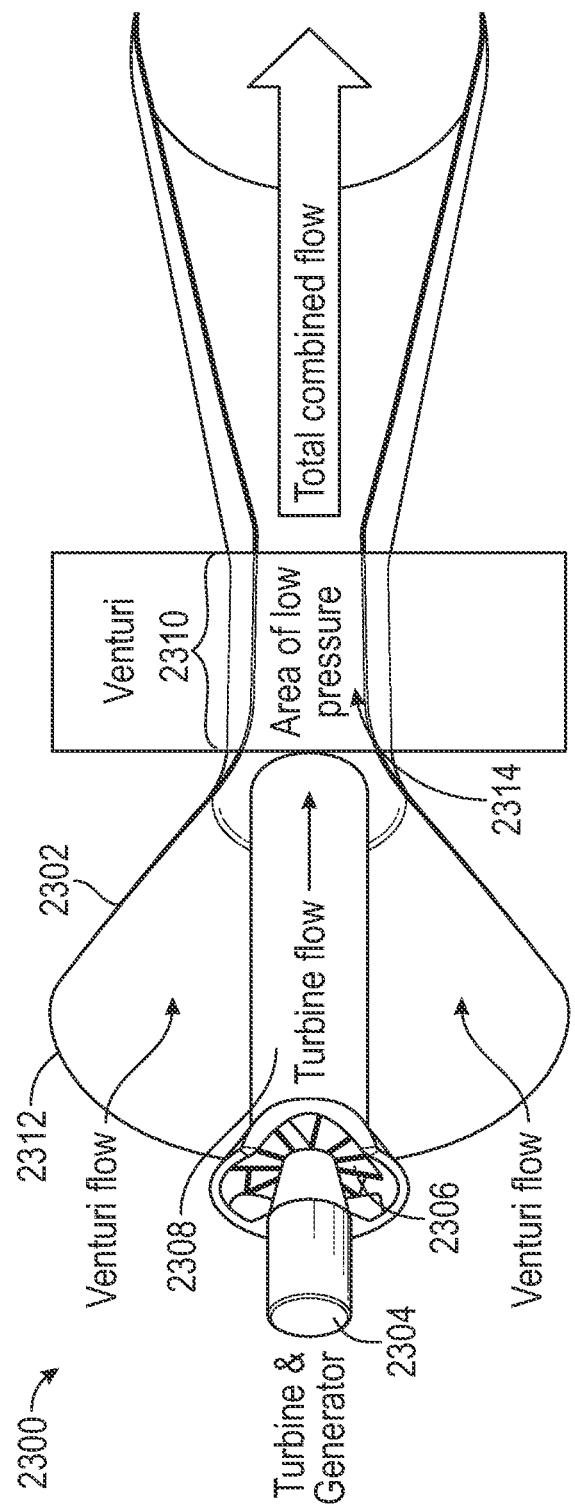
FIG. 34 is a cross-sectional view of another hydrokinetic turbine that can be utilized with the systems and methods according to one example.

FIG. 34 shows an example of a venturi-enhanced turbine ("VET" or "VETT") that can be used as a hydrokinetic turbine 2300 with the any of the systems or methods discussed herein. The turbine 2300 uses venturi principles to achieve a pressure amplification for a conventional axial flow turbine. This allows compact, high speed, no gearbox turbines to be used in ultra low head hydro settings of 4 meters or less. According to one example, the hydrokinetic turbine 2300 can designed and/or fabricated by Verderg™ Renewable Energy (https://www.verderg.com/) of Kingston, United Kingdom.

As shown in FIG. 34, the turbine 2300 can include an outer nacelle 2302, a turbine rotor 2304, blades 2306, inner nacelle 2308 and a venturi section 2310.

The outer nacelle 2302 can be shaped as a funnel in a forward section 2312 (as defined by flow of water) that connects to the venturi section 2310. The venturi section 2310 has a reduced diameter relative to the remainder of the outer nacelle 2302 including the forward section 2312.

The turbine rotor 2304 can extend forward (relative to the flow direction of the water) of the inner nacelle 2308 and the blades 2306. The blades 2306 can be positioned within the inner nacelle 2308. The inner nacelle 2308 can have a hollow structure having an inner passage(s) allowing for movement of a portion of the water flow entering the turbine 2300 to pass therethrough (and over the blades 2306). The blades 2306 can be spaced within the inner nacelle 2308 in a moveable and spaced relationship therewith coupled to the turbine rotor 2304. The turbine rotor 2304 can be coupled to additional components (e.g., the generator, the power split transmission coupling, etc.), which are not specifically shown in FIG. 34.

The shape of the venturi section 2310 can form an area of lower pressure 2314 adjacent and/or behind inner nacelle 2308. Thus, the inner nacelle 2308 can be positioned upstream of the venturi section 2310 and the area of lower pressure 2314 such that flow through the inner nacelle 2308 can rejoin flow of water that passed around the inner nacelle 2308 prior to entering the venturi section 2310. However, the inner nacelle 2308 in some cases can extend into the venturi section 2310 (e.g., into the area of lower pressure 2314).

The turbine 2300 (via the inner nacelle 2308) discharges into the lower pressure region 2314 created by the venturi flow. The pressure differential across the turbine therefore increases as the turbine rotor 2304 not only experiences the site head pressure but also the lower venturi induced pressure downstream of the blades 2306 at the lower pressure region 2314. Instead of providing the turbine with a large volume of water at little pressure, the turbine 2300 (and indeed the systems discussed herein) use part of the water in a venturi to achieve a pressure amplification, therefore providing the turbine 2300 with less water volume but at a higher pressure.

Figure 35:
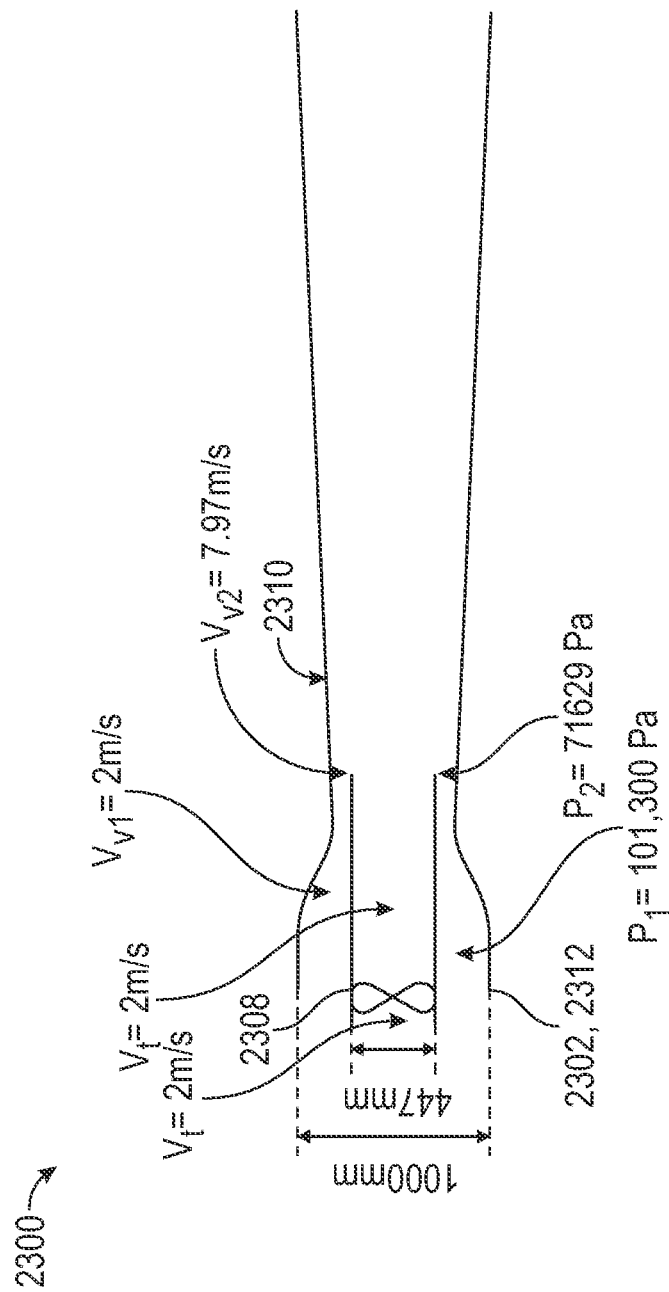
FIG. 35 shows an example calculation of pressures and flow velocities using the turbine of FIG. 34 according to one example of the present application.

FIG. 35 shows an example calculation of pressures and flow velocities using the turbine 2300. For the example of FIG. 35, the outer nacelle 2302, specifically at the forward section 2312, the diameter can be 1000 mm with a flow velocity of the water entering the forward section 2312 being 2 m/s. The inner nacelle 2308 can have a diameter of 447 mm. Thus, according the equations (1)-(4):

$$P_1 - P_2 = \rho/2 * (v12 - v02) \quad (1)$$

$$P_2 = P_1 - \rho/2 * (v12 - v02) \quad (2)$$

$$P_2 = 101,300 - 997/2 * (7.972 - 22) \quad (3)$$

$$P_2 = 71,629 \text{ Pa} \quad (4)$$

Thus, the pressure at the venturi section 2310 can drop to 71,629 Pa (from 101,300 Pa entering the forward section 2312 and velocity of the flow can increase at the venturi section 2310 and can be 7.97 m/s (from 2 m/s entering the forward section 2312).

Figure 36:
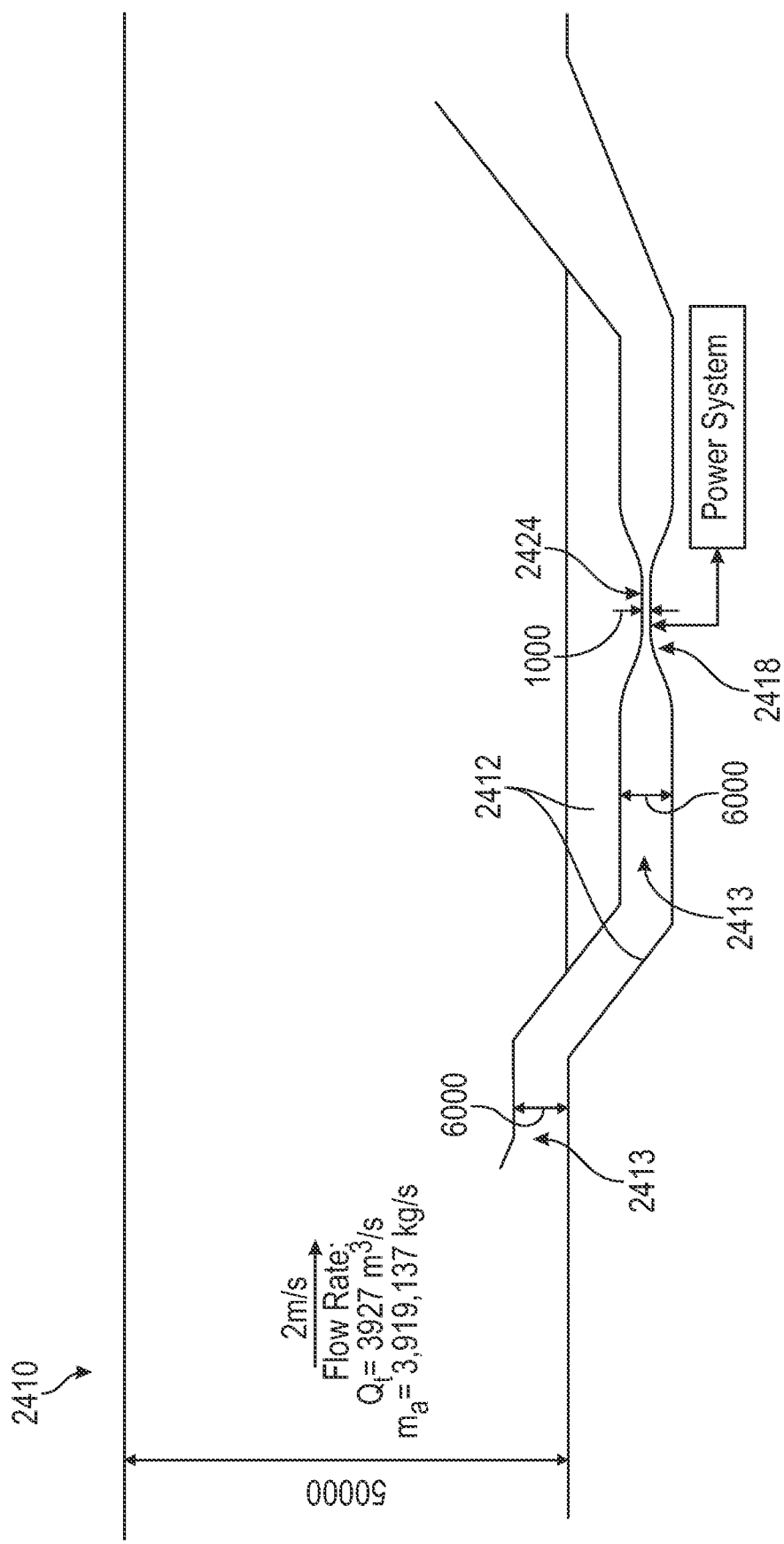
FIG. 36 is a highly schematic view of another modified river and one or more flow channels configured as venturi to concentrate river flow adjacent/through/along a modified river bank (or other structure) along with a power system including one or more hydrokinetic turbines.

FIG. 36 shows a highly schematic view of a modified river 2410 and one or more flow channels 2413 configured as venturi to concentrate river flow adjacent/through/along a modified river bank 2412 (or other structure) along with a power system 2414 including one or more turbines 2418 (e.g. any of the of the exemplary turbines discussed herein including the turbine 2200 or turbine 2300). The modified river 2410 of FIG. 36 is very similar to the modified river 10 of FIG. 1. Thus, a detailed description of the modified river 2410 will not be repeated.

The one or more flow channels 2413 can be formed at least in part by a modified bank 2412 with an exemplary shape that funnels and magnifies river flow along the flow channel 2413. The shape of the flow channel 2413 and bank 2412 shown is exemplary and is contemplated to be more exaggerated. The shape can differ from the shape illustrated. Portions of the bank 2412 may or may not be modified by human activity according to some examples. In some cases the bank 2412 may not be modified by human activity and other structures (e.g. concrete barriers, steel barriers, wood, etc.) can be utilized to form the flow channel 2413. The flow channel 2413 can be formed of natural materials (e.g., sand, rock, etc.) that formed the river bank or adjacent area or can be constructed of another material that is man-made or man-modified for example.

In FIG. 36, the river bank 2412 has been modified to the serpentine shape having a reduced cross-sectional region or regions in order to better magnify river flow such as at a venturi section 2424. The modified river 2410 includes the power system 2414 that communicates with power systems such as a power grid, battery station, etc. The power system 2414 can include the one or more turbines 2418 and optionally can further include other components (e.g., generator, one or more wind turbines, one or more power split couplings, etc.).

FIG. 36 shows exemplary dimensions for the river (500,000 mm width across and having a flow velocity of 2 m/s. The flow channel 2413 can have a width dimension of 6,000 mm. However, the flow channel 2413 can have different dimensions. As discussed previously, the bank 2412 (or other structure that forms the flow channel 2413) can be moveable to increase or decrease the width of the flow channel 2413 as desired (see prior discussion in FIG. 1 regarding the initial inlet section 26). The width dimension of the flow channel 2413 should be appropriately sized based upon the river width and water flow velocity to minimize parasitic flow losses that can occur along the edge of the flow channel 2413 (e.g., at the bank 2412). FIG. 36 shows the venturi section 2424 has a width of 1000 mm. Again, this width is exemplary and can be modified relative to the width of the flow channel 2413 and/or the width of the river 2410.

According to FIG. 36, based upon the river 2410 in the main channel can have a volume flow rate of 3927 m$^3$/s based upon the 500,000 mm width across and having a flow velocity of 2 m/s. The mass flow rate of the river 2410 can be 3,919,137 kg/s. Within the flow channel 2413 the volume flow rate can be 1.5706 m$^3$/s and the mass flow rate can be 1567.7 kg/s with a flow velocity of 2 m/s. Flow velocity can increase at the venturi section 2424.

With a single VET or VETT turbine such as the turbine 2300 (see discussion of FIGS. 34 and 35) recall entering the turbine 2300 the flow velocity can be 2 m/s with the 1000 mm diameter of the outer nacelle and 447 mm diameter of the inner nacelle, the volume flow rate through the turbine 2300 would be 0.314 m$^3$/s and the mass flow rate will be 313.53 kg/s. Recall from equations (1)-(4), velocity within the venturi section will increase to 7.97 m/s (accompanied by the pressure drop). The power generated by the turbine can thus be explained by the equation (5). (5) Pw Turb≈ [(pv1*Q̇ t)+(ṁt*1/2vt2)]−[(pv2*Q̇ t)+(ṁt*1/2vt2)], where (pv1*Q̇ t) is the potential power (gravity), (ṁt*1/2vt2) and is kinetic power (which stays constant, [(pv2*Q̇ (t) is difference in potential power (p1−p2 of the 80% flow of the VET or VETT turbine). Recall, p1 was 101,300 Pa and p2 as 71,629 Pa from equations (1)-(4).

Thus, applying equation (5):

$$\text{Pw Turb} \approx [(101300*0.314)+(313.53*1/2*22)]- [(71629*0.314)+(313.53*1/2*22)]$$

$$\text{Pw Turb} \approx 9.3 \text{ kW}$$

Thus, the turbine would have a power generation potential of about 9.3 kW. Other turbines discussed herein placed in a venturi section (e.g., section 24, section 2424) would experience similar increase in water flow velocity as result of the venturi (e.g., from 2 m/s to 7.97 m/s if similar geometry to the VET turbine is utilized for the venturi). Thus, the turbines disclosed herein should also be capable of power production in the range of 9.3 kW.

Figure 37:
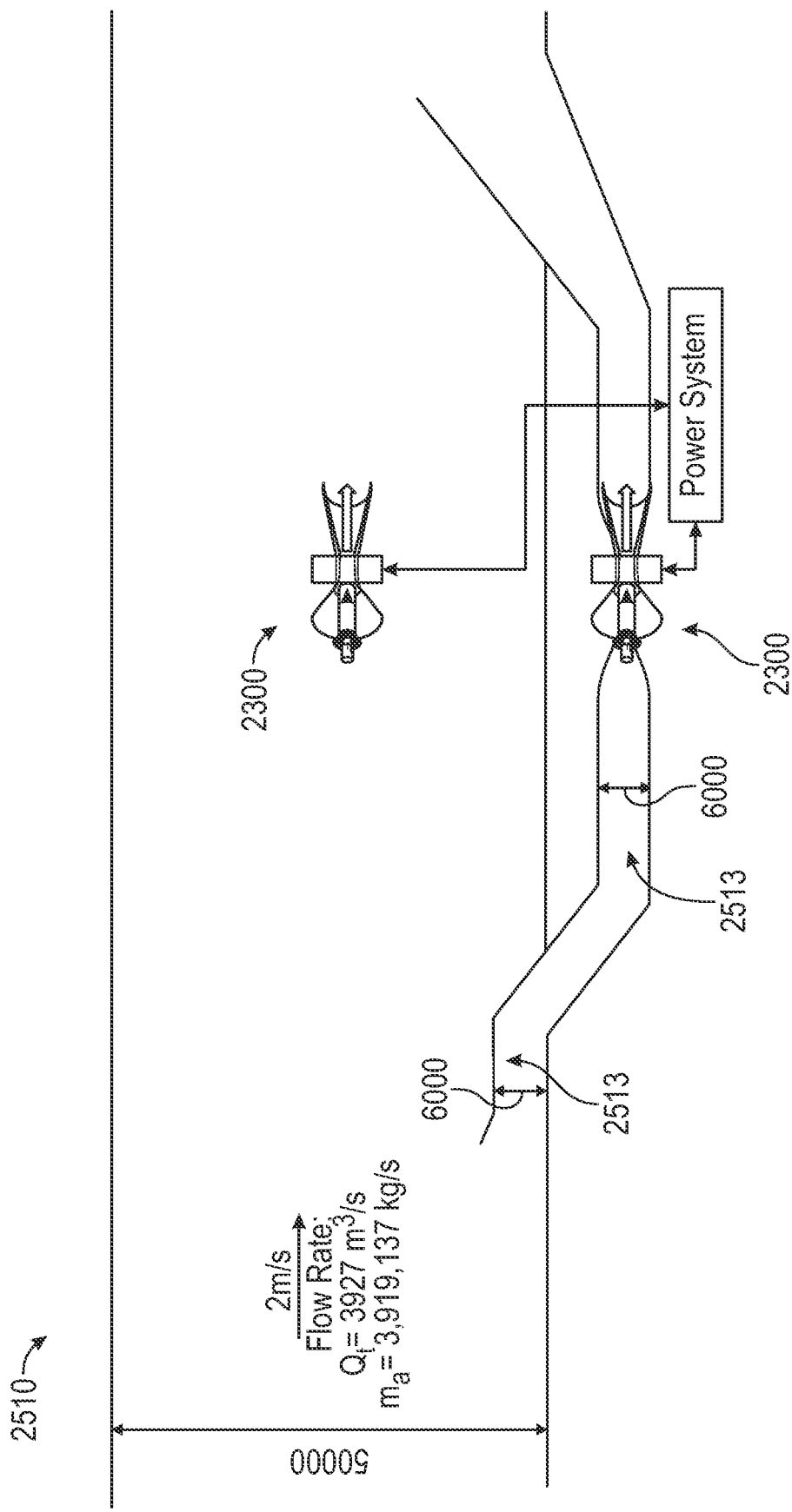
FIG. 37 is a highly schematic view of another modified river and may (or may not) include the one or more flow channels along with a power system including one or more hydrokinetic turbines.

FIG. 37 shows a highly schematic view of another modified river 2510. The river 2510 may (or may not) include the one or more flow channels 2513. Flow channels (if used) can occur mid-stream (i.e. mid-river or in an area of fastest current) rather than being along the bank. The river 2510 can be similar to those of FIGS. 1 and 36 but can differ in that the flow channel 2513 may or may not be utilized. Flow channel 2513 does not include a venturi section. This venturi section is rather provided by the turbine 2300 (the VET or VETT). As shown in FIG. 37, the turbine 2300 could be located in the flow channel 2513 and/or could be located in the main river channel within the main river flow. Thus, modification of the river 2510 may be minor and include simply installing of the turbine 2300 in the main channel rather than any modification of the bank and/or forming of the flow channel 2513.

Figure 38A:
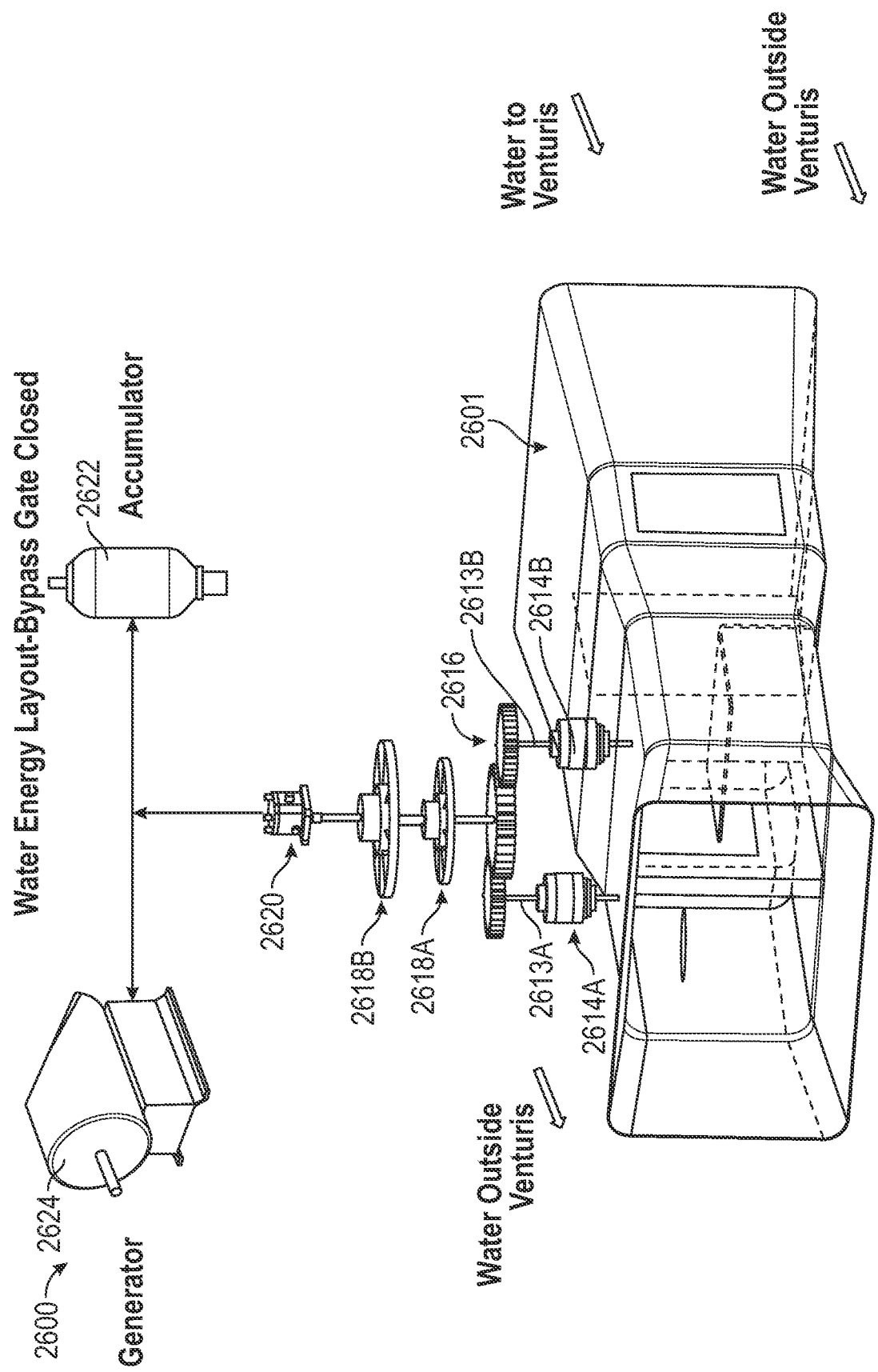
FIG. 38A shows a river power generation, storage and regeneration system according to an example of the present application.
Figure 38B:
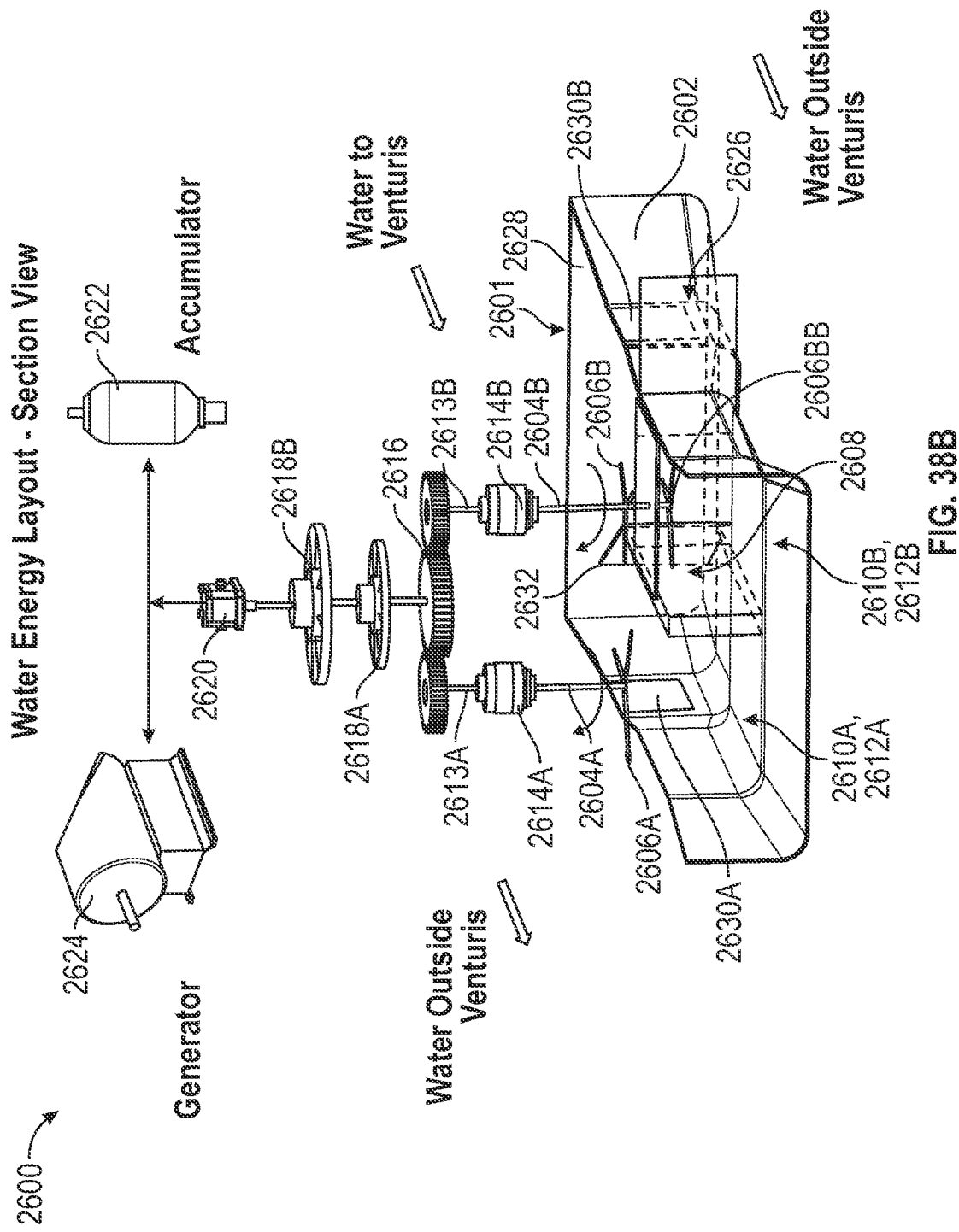
FIG. 38B shows the system of FIG. 38A with a water flow capturing apparatus shown in cross-section.
Figure 38D:
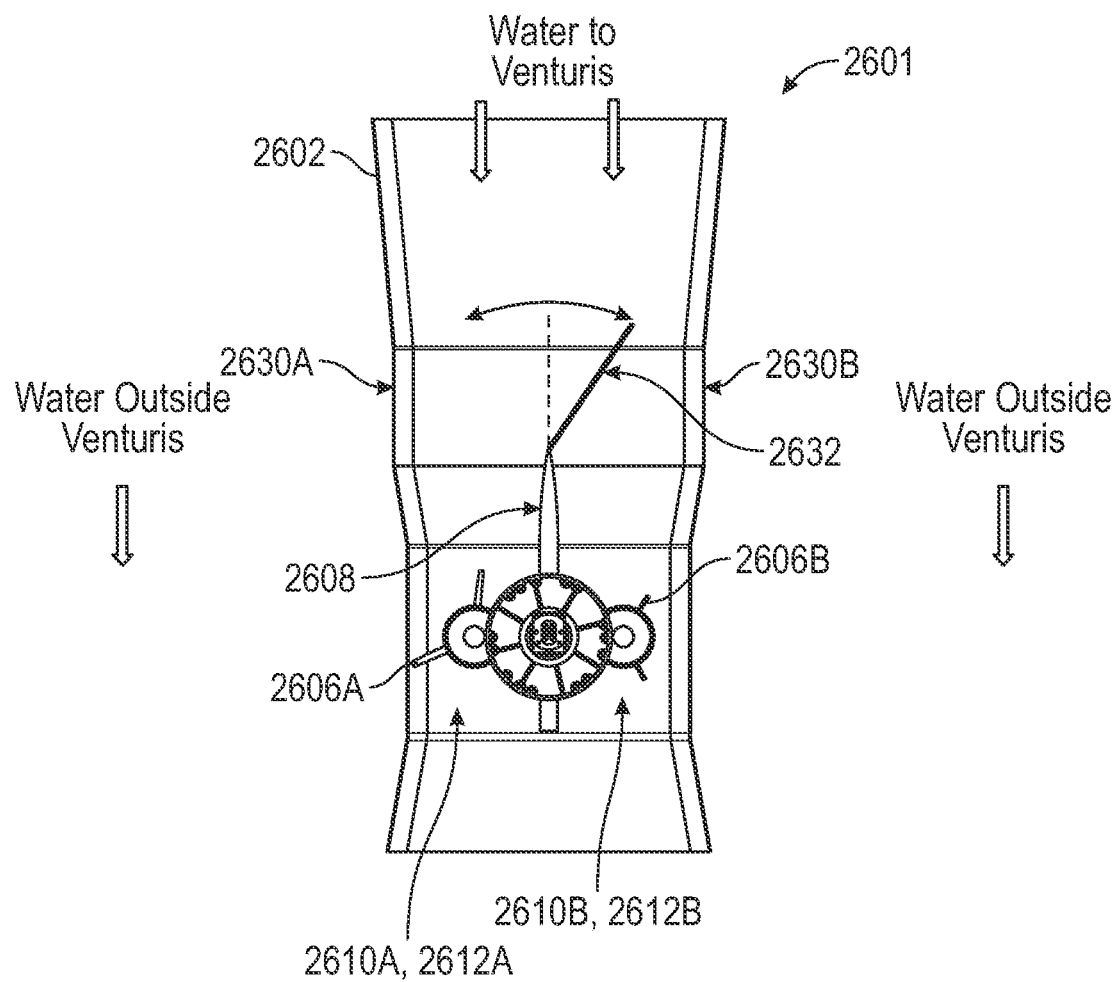
FIG. 38D is a top down view showing the water flow capturing apparatus with a diversion gate articulated to a first position and also showing some of the components of the system of FIG. 38A.

FIGS. 38A, 38B and 38C show a power generation, storage and regeneration system 2600 according to another example. The system 2600 can include a water flow capturing apparatus 2601, one or more drive shafts 2613A and 2613B, one or more power split transmission couplings 2614A and 2614B, a gearbox 2616, a first flywheel 2618A, a second flywheel 2618B, one or more pump/motors 2620, one or more accumulators 2622 and one or more generators 2624. Although not specifically shown in FIGS. 38A-38C, the system 2600 can also include one or more controllers and one or more sensors such as (electrical control unit and tachometers as shown in FIGS. 42, 43A, 43B, 44A and 44B. The controller can be used to operate the system 2600 in the various operation modes discussed herein.

Referring now to FIGS. 38A, 38B, 38C, 38D, 38E and 38F in combination, the water flow capturing apparatus 2601 can include an outer nacelle 2602, one or more turbine rotors 2604A and 2604B, a plurality of blades 2606A, 2606B and 2606BB, an inner wall 2608, venturi sections 2610A and 2610B, a first flow passage 2612A, a second flow passage 2612B, a slide door 2626, a screen 2628, one or more bypass gates 2630A and 2630B and a diversion gate 2632. In addition to the venturi section 2610A and 2610B, the outer nacelle 2602 can include an inlet section 2634 and an outlet section 2636.

At a system level, the system 2600 the flow capturing apparatus 2601 can be configured to capture an amount of water (e.g., from a river, stream, tide or other source of moving water) and funnel this water to one or more of the plurality of blades 2606A, 2606B and 2606BB. The load of the water passing over the one or more of the plurality of blades 2606A, 2606B and 2606BB can cause the one or more of the plurality of blades 2606A, 2606B and 2606BB to turn the one or more turbine rotors 2604A and 2604B. The turbine rotors 2604A and 2604B can couple with or be the one or more drive shafts 2613A and 2613B. The one or more power split transmission couplings 2614A and 2614B can selectively couple with the one or more drive shafts 2613A and 2613B and can be utilized in the manner discussed previously. The drive shafts 2613A and 2613B can extend from the one or more power split transmission couplings 2614A and 2614B and can couple with the gearbox 2616. Another drive shaft 2614C (or shafts) can extend from the gearbox 2616 and can couple in series or parallel arrangement with the first flywheel 2618A, the second flywheel 2618B, the one or more generators 2624 and the one or more pump/motors 2620. Hydraulically, the one or more power split transmission couplings 2614A and 2614B can be in selective fluid communication with the gearbox 2616, the one or more pump/motors 2620 and the one or more accumulators 2622 (see schematic diagrams of FIGS. 39A and 39C).

The system 2600 can be constructed and operate in a similar to that of the systems of FIGS. 1E-32 previously discussed. However, the first flywheel 2618A and/or the second flywheel 2618B can be an important addition. The first flywheel 2618A and second flywheel 2618B can differ in size and inertia. The first flywheel 2618A and second flywheel 2618B can smooth out delivery of power from the turbine rotors 2604A and 2604B to the one or more generators 2624. The inertia of each of the first flywheel 2618A and second flywheel 2618B opposes and moderates fluctuations in the speed of the turbine rotors 2604A and 2604B (as a result of changes in water flow velocity) and stores the excess rotational energy (conserves angular momentum) for intermittent use.

Turning to the water flow capturing apparatus 2601 as shown in FIGS. 38A, 38B, 38C, 38D, 38E and 38F, the outer nacelle 2602 can funnel water into the water flow capturing apparatus 2601 via the inlet section 2634. Thus, the inlet section 2634 can have a reduced cross-sectional area traveling from an upstream edge thereof toward the downstream direction. The outer nacelle 2602 can be constructed of suitable materials such as plastic, sheet metal, reinforced concrete, or the like. The inlet section 2634 can fluidly communicate with the venturi sections 2610A and 2610B, which have a reduced cross-sectional area relative to the inlet section 2634 and the outlet section 2636. The venturi sections 2610A and 2610B can be separated from one another by the inner wall 2608. The inner wall 2608 can extend into or adjacent the inlet section 2634 and/or the outlet section 2636. A leading upstream edge of the inner wall 2608 can have an airfoil, tapered or aerodynamic shape. The inner wall 2608 in combination with the outer nacelle 2602 can form the first flow passage 2612A and the second flow passage 2612B within the venturi sections 2610A and 2610B, respectively.

The plurality of blades 2606A, 2606B and 2606BB can be positioned in or adjacent the venturi sections 2610A and 2610B. In particular, the blades 2606A can be positioned in or adjacent the first flow passage 2612A and the blades 2606B and 2606BB can be positioned in or adjacent the second flow passage 2612B. The blades 2606B and 2606BB can be spaced apart from one another such as in a vertical arrangement and coupled together via the turbine rotor 2604B. The blades 2606B and 2606BB can differ in a size and/or shape from the blades 2606A. In the example shown, the blades 2606A can be larger (at least longer in length) than the blades 2606B and 2606BB. However, it is contemplated that the blades 2606A could also be larger in other dimensions, and/or can have different airfoil geometry or the like from the blades 2606B and 2606BB.

It should also be noted that the first flow passage 2612A (formed by the venturi section 2610A and the inner wall 2608) can differ in volume (e.g., cross-sectional area, shape etc.) from the second flow passage 2612B (formed by the venturi section 2610B and the inner wall 2608). Such difference in volume can be between 0.1% to 80%, for example. However, such difference in volume is not contemplated in some embodiments.

The slide door 2626 (shown in FIGS. 38B and 38C) can be selectively moveable into or out of the outer nacelle 2602. Multiple positions for the slide door 2626 (e.g., partial insertion) area possible. When selectively moved fully into the outer nacelle 2602, the slide door 2626 can block water flow through a portion of the second flow passage 2612B such that water does not engage and/or load the blades 2606B (see FIG. 38C).

The one or more bypass gates 2630A and 2630B can comprise doors or other selectably openable openings on the outer nacelle 2602 such as in a downstream location of the inlet section 2634 upstream of the venturi sections 2610A and 2610B, respectively.

Figure 38E:
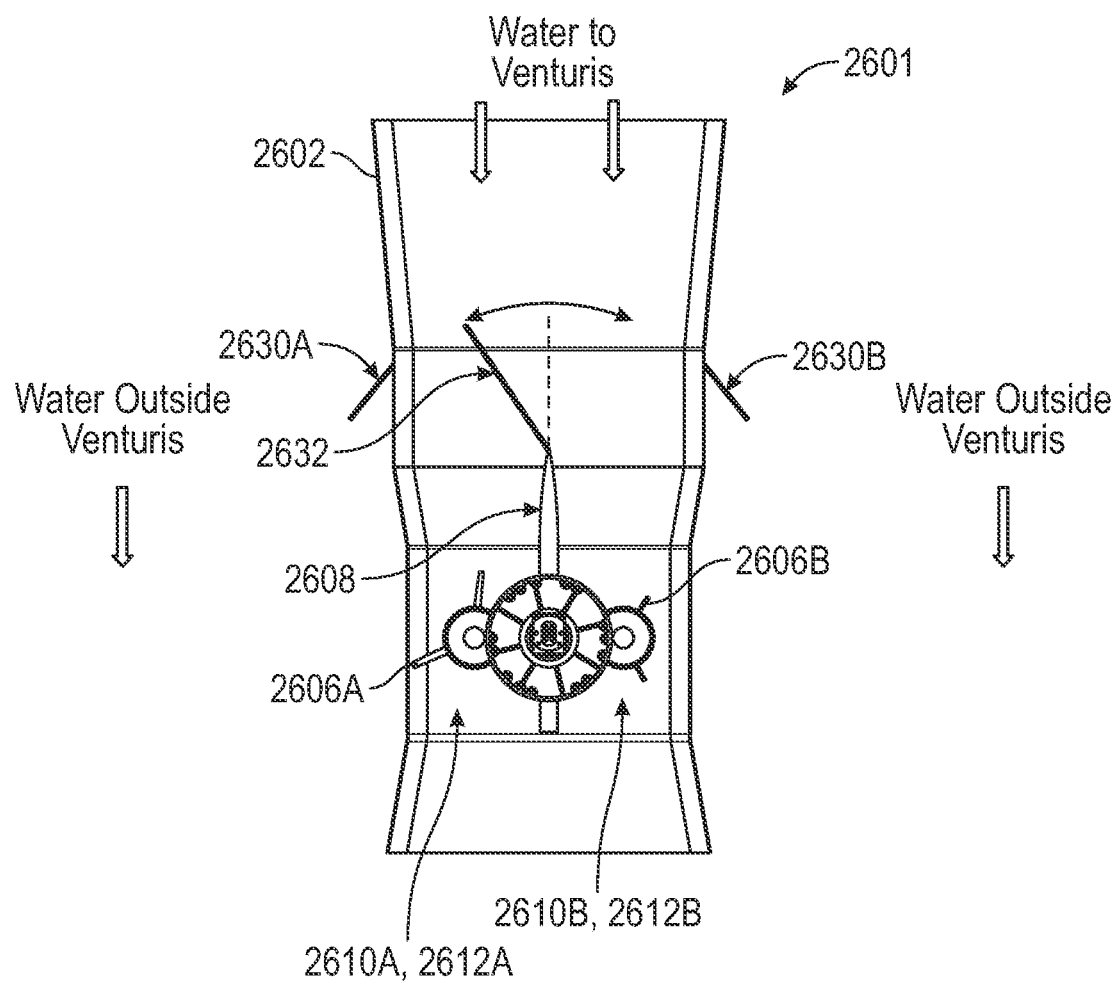
FIG. 38E is a top down view showing the water flow capturing apparatus with the diversion gate articulated to a second position and also showing some of the components of the system of FIG. 38A.
Figure 38F:
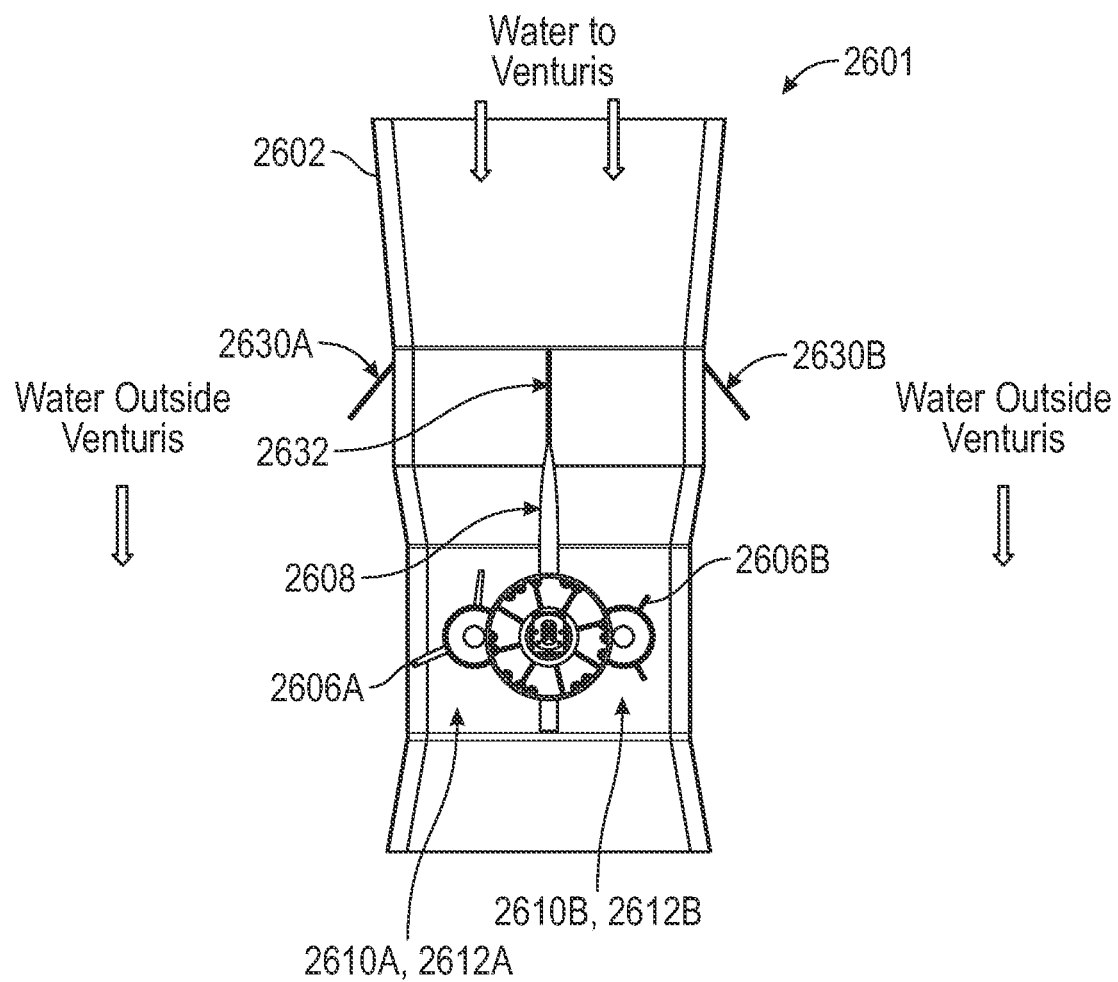
FIG. 38F is top down view showing the water flow capturing apparatus with the diversion gate articulated to a third position and also showing some of the components of the system of FIG. 38A.

The diversion gate 2632 can be articulated to rotate to selectively reduce and/or block flow to one of the first flow passage 2612A or the second flow passage 2612B. The water flow can be directed by the diversion gate 2632 (i.e. diverted away) from one of the flow passage 2612A or the second flow passage 2612B to the other of the flow passage 2612A or the second flow passage 2612B (or out one of the bypass gates 2630A or 2630B). For example, FIG. 38D, the diversion gate 2632 can be positioned by articulation to reduce flow to the second flow passage 2612B and at least some of this flow (excess flow) can be directed by the diversion gate 2632 to the first flow passage 2612A. Alternatively, as shown in FIG. 38E, the diversion gate 2632 can be articulated reduce flow to the first flow passage 2612A and at least some of this flow (excess flow) can be directed by the diversion gate 2632 to the second flow passage 2612B. FIG. 38F shows the diversion gate 2632 can be locked or otherwise held in a neutral position where it does not divert flow between the first flow passage 2612A and the second flow passage 2612B.

The screen 2628 can be placed in or adjacent (in front of) the inlet section 2634 to discourage aquatic animals or debris from entering the flow capturing apparatus 2601.

The diversion gate 2632, the slide door 2626 and/or the one or more bypass gates 2630A and 2630B can be used in combination to direct flow to load the plurality of blades 2606A, 2606B and/or 2606BB in a manner that maximized power generation given water flow speed through the water flow capturing apparatus 2601. For example, in a low water velocity situation (lowest flow with generation possible situation 1) the one or more bypass gates 2630A and 2630B would be closed. The diversion gate 2632 can be articulated to direct substantially all or most of the water flow into the second flow passage 2612B. The slide door 2626 can also be moved into the outer nacelle 2602 so as to block water flow through a portion of the second flow passage 2612B such that water does not engage and/or load the blades 2606B (see FIG. 38C). Power then in the lowest flow situation would only be from the water flow loading the blades 2606BB.

In a slightly higher water flow velocity situation (situation 2), the slide door 2626 could be removed from within the outer nacelle 2602 (or at least partially removed). This would allow some amount of the flow within the venturi section 2610B to load the blades 2606B in addition to the blades 2606BB.

If water flow velocity were to be further increased (situation 3), the diversion gate 2632 could be articulated to direct some, most or substantially all of the water flow into the first flow passage 2612A to engage the larger blades 2606A. Flow would thus be diverted from the second flow passage 2612B such that blades 2606E and 2606BB would have a reduced loading.

In a further increased water flow velocity situation (situation 4) one or both of the bypass gates 2630A and 2630B could be opened. In yet a further increased water flow velocity situation (situation 5) the bypass gates 2630A and 2630B can be closed and the diversion gate 2632 can be locked or otherwise held in the neutral position to allow water flow to both the first flow passage 2612A and the second flow passage 2612B to the plurality of blades 2606A, 2606B and 2606BB. In a highest flow velocity situation (situation 6), the diversion gate 2632 can remain in the neutral position but one or both of the bypass gates 2630A and 2630B can be opened. In the highest flow velocity situation (situation 6), the water flow can be to both the first flow passage 2612A and the second flow passage 2612B to the plurality of blades 2606A, 2606B and 2606BB.

The above situations 1-6 are exemplary operation modes and it is recognized that other modes of operation are possible. These further modes of operation include diverting flow away from the second flow passage 2612B initially so that flow passes through the first flow passage 2612A to load the blades 2606A should flow velocity or flow conditions dictate. Furthermore, situates where only partial diversion of flow using the diversion gate 2632 such that the first flow passage 2612A and the second flow passage 2612B each receive some flow of water to load the blades are recognized as possible further modes of operation.

Figure 39A:
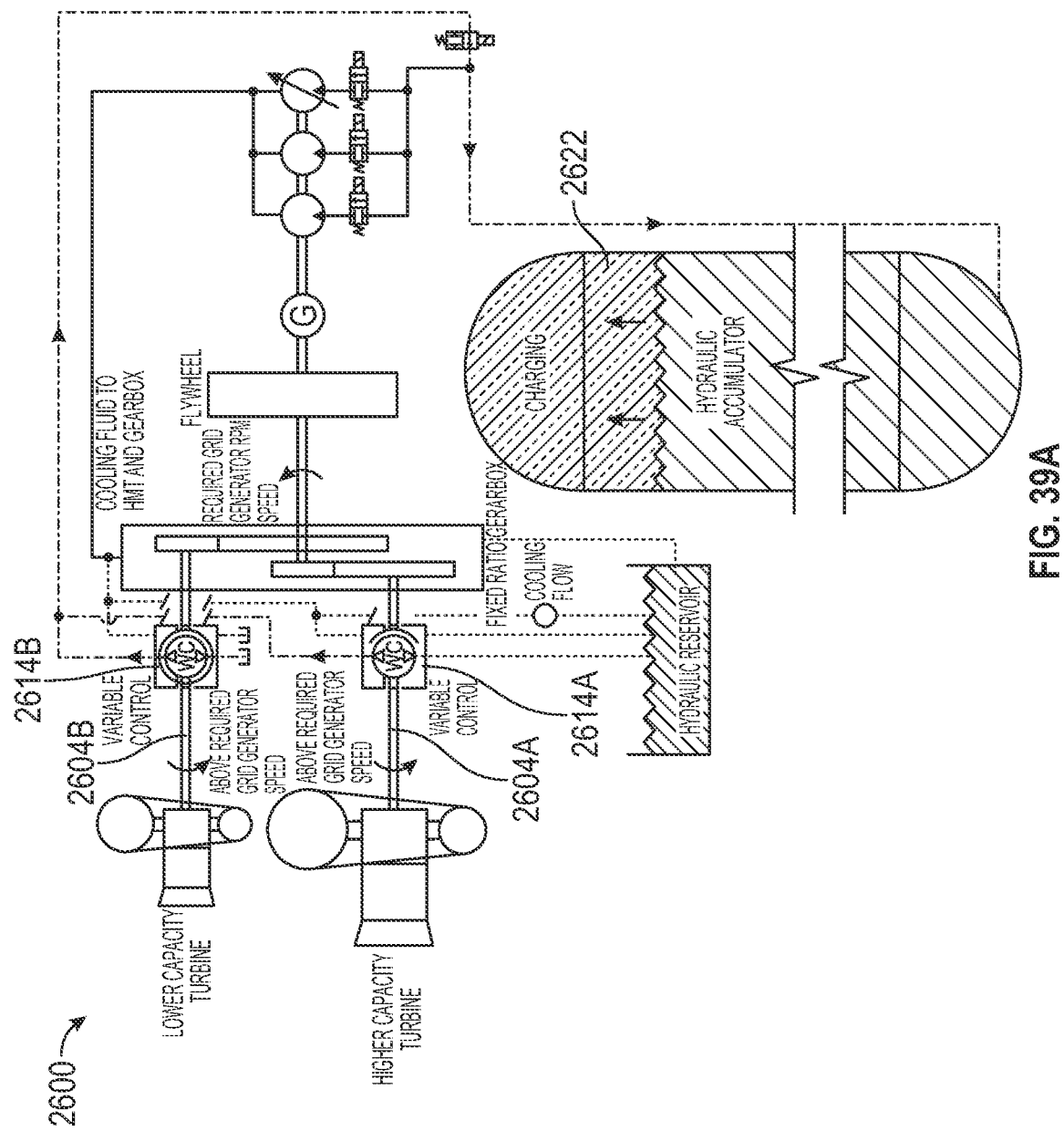
FIG. 39A is a schematic diagram of a river power generation, storage and regeneration system similar to FIG. 38A during a power storage (charging) mode of operation.
Figure 39B:
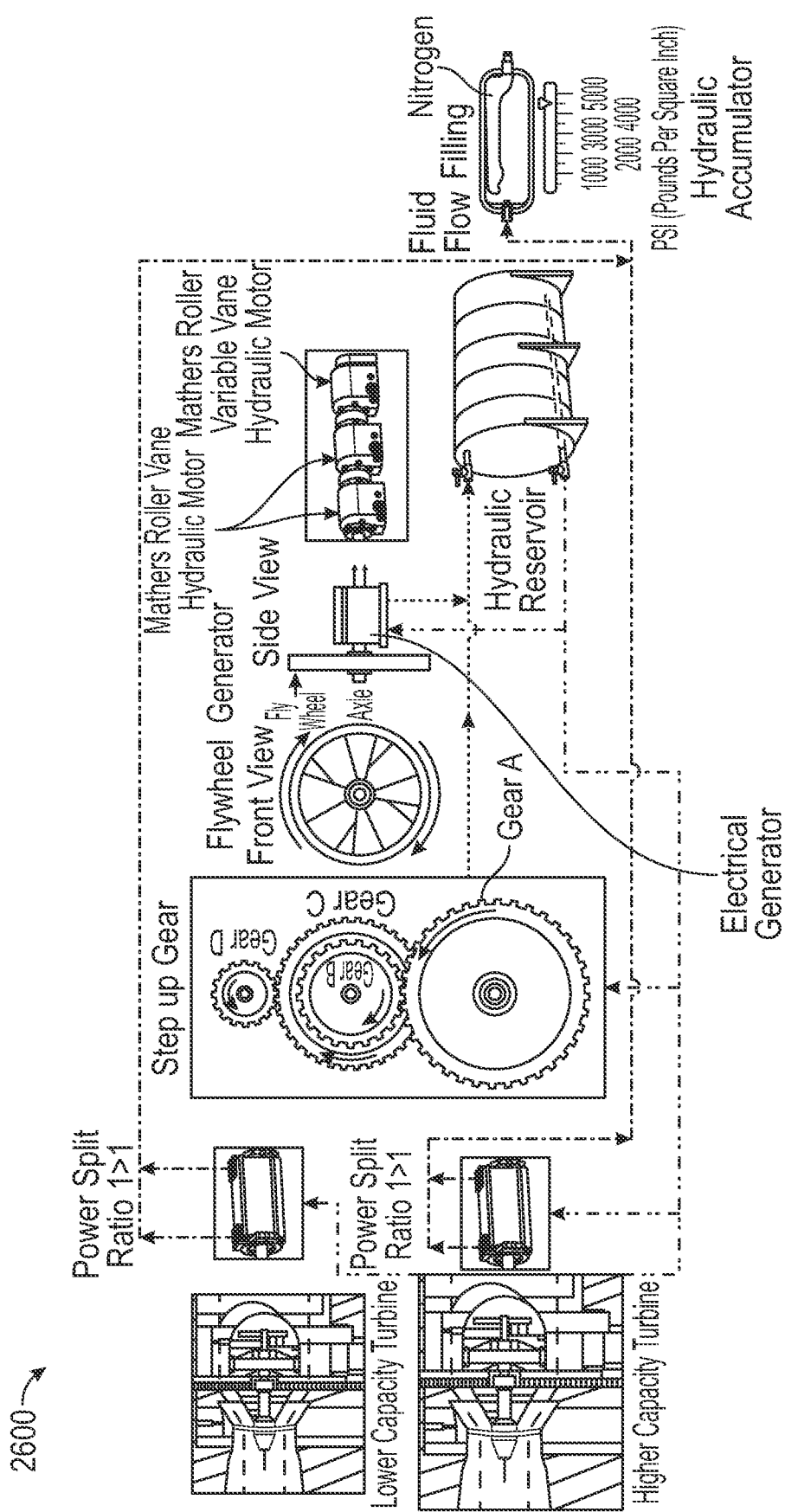
FIG. 39B is a highly schematic illustration of the system of FIG. 39A during the power storage (charging) mode of operation.

FIGS. 39A and 39B show a power storage mode of operation for the system 2600, that can occur in a higher water flow velocity situation (e.g., such as situations 4-6 described above). In this power storage mode, the turbine rotors 2604A and 2604B are rotating at a speed that is above required grid generator speed. The one or more power split transmission couplings 2614A and 2614B can reduce the respective shafts speeds to acceptable rotational speeds for the generator and can act as pumps to divert hydraulic fluid with the excess energy to the one or more accumulators 2622.

Figure 39D:
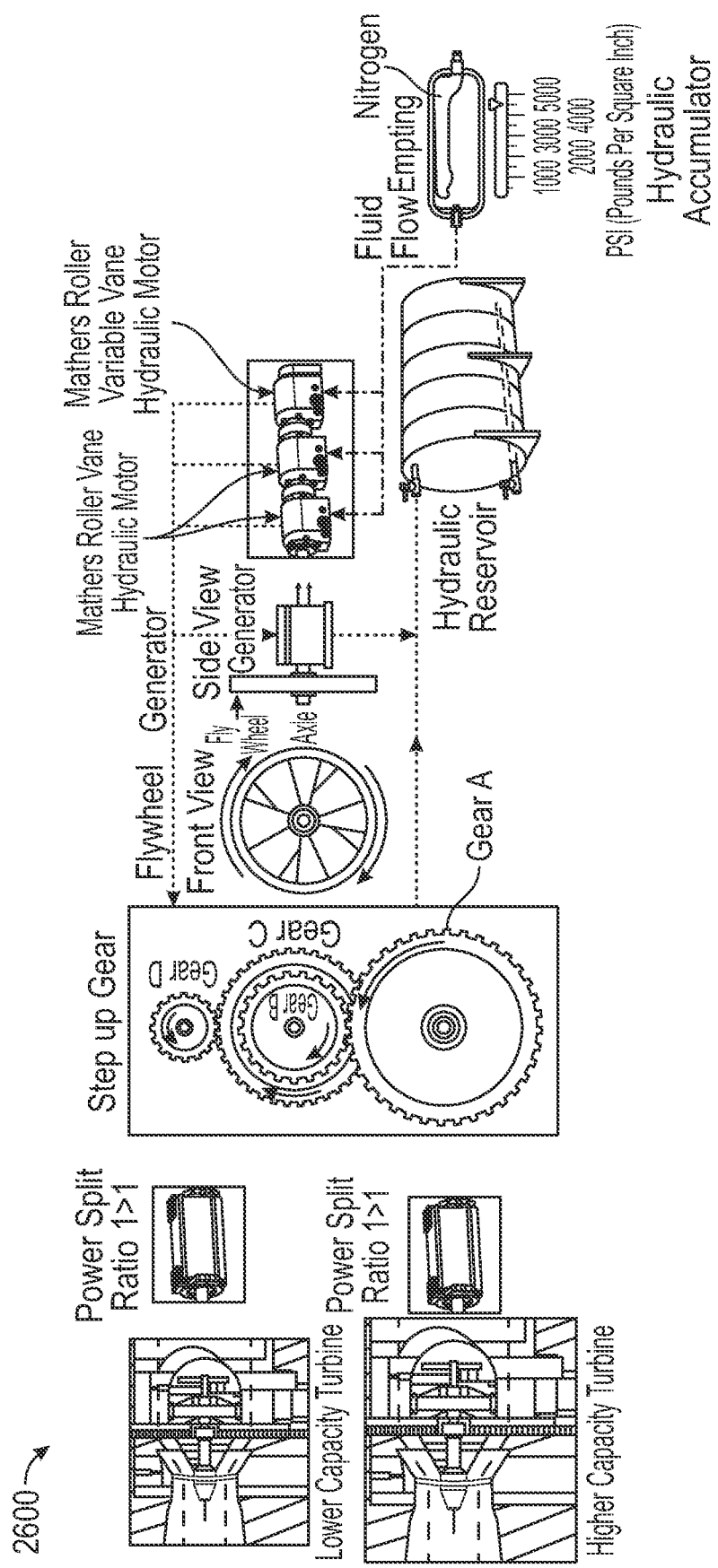
FIG. 39D is a highly schematic illustration of the system of FIG. 39C during the regeneration (discharging) mode of operation.

FIGS. 39C and 39D show a power regeneration mode of operation for the system 2600. This can occur at lowest or lower water flow velocity situation (e.g., situation 1 or situation 0 (insufficient flow velocity—rotors 2604A and 2604B not turning) In the power regeneration mode of operation the one or more accumulators 2622 can be depleted or emptied to power the one or more pump/motors 2620 to turn the one or more generators 2624 at a desired speed.

Figure 40:
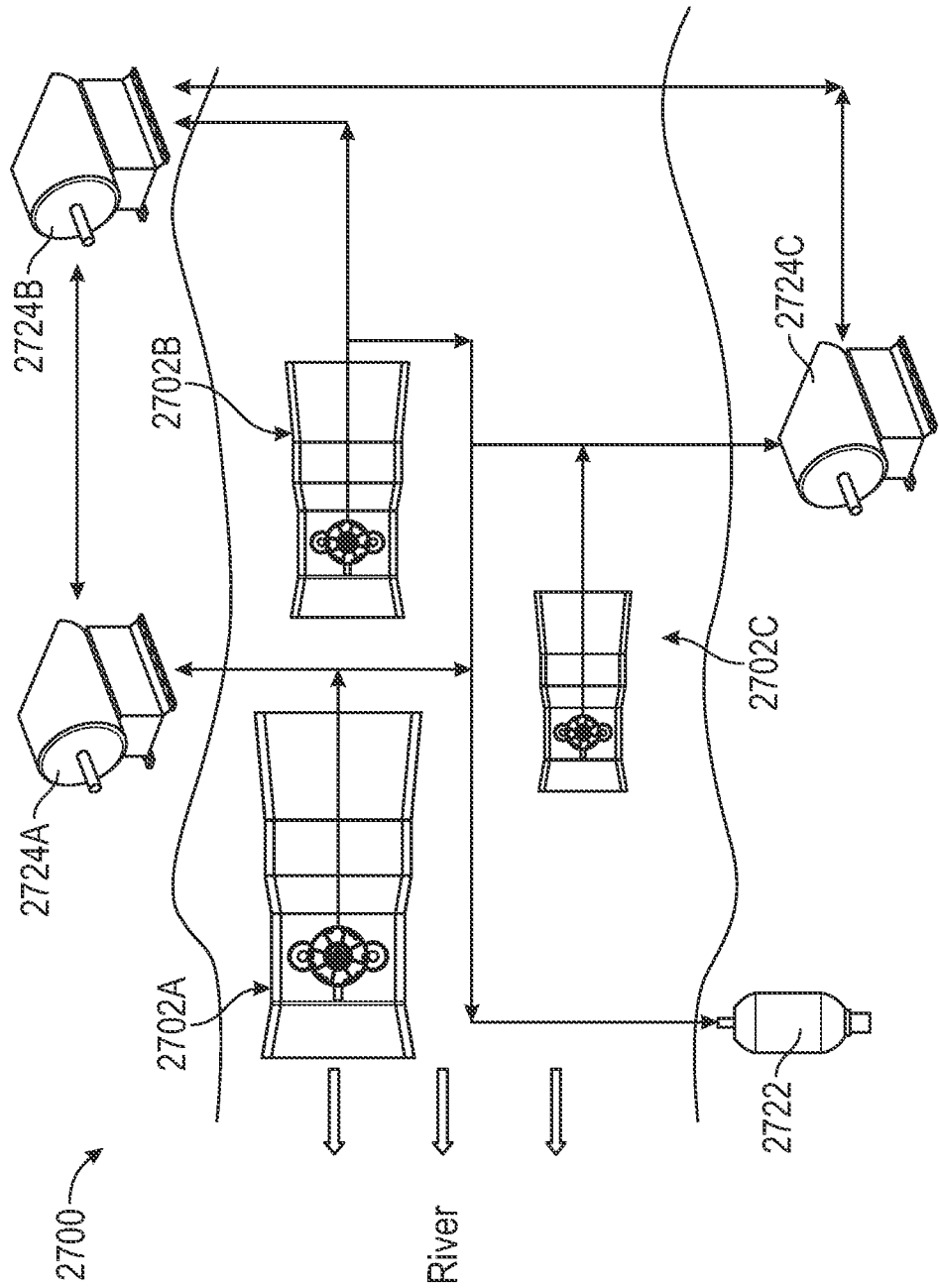
FIG. 40 is a highly schematic view of a river with a power system including one or more hydrokinetic turbines.

FIG. 40 shows a hydrokinetic power system 2700 with various components previously described not explicitly shown. The system 2700 can utilize a plurality of turbines 2702A, 2702B and 2702C (such as described in FIGS. 38A-38F with the flow capturing apparatus 2601). The turbines 2702A, 2702B and 2702C can be of different sizes and capacities relative to one another. It should be noted in the example of FIG. 40 that terraforming of the bank is not necessary.

The turbines 2702A, 2702B and 2702C can be used to selectively turn one or more of a plurality of generators 2724A, 2724B and 2724C. These generators 2724A, 2724B and 2724C can have different capacities relative to one another. One or more accumulators 2722 can be used with the system 2700 to store excess power for regeneration. The turbines 2702A, 2702B and 2702C can be brought online for power generation sequentially as water flow velocity increases. Thus, in a lowest flow velocity situation that would provide for feasible power generation, the largest turbine 2702A can be brought online to turn the generator 2724A. As the water flow velocity increases the turbine 2702A could turn the generator 2724B in addition to the generator 2724A. The turbine 2702B can then be brought online as flow velocity conditions dictate to aid in turning one or more of the plurality of generators 2724A, 2724B and 2724C. Eventually, it may be possible to utilize all of the plurality of turbines 2702A, 2702B and 2702C turning all the plurality of generators 2724A, 2724B and 2724C. If an overspeed condition with regard to the generator is reached, excess power can be stored in the one or more accumulators 2722 for regeneration use as previously discussed.

Although described with bringing 2702A turbine on first, it is also contemplated that the third turbine 2702C could be brought online first for power generation and then the turbines 2702B and 2702A can be brought online for power generation.

Figure 41:
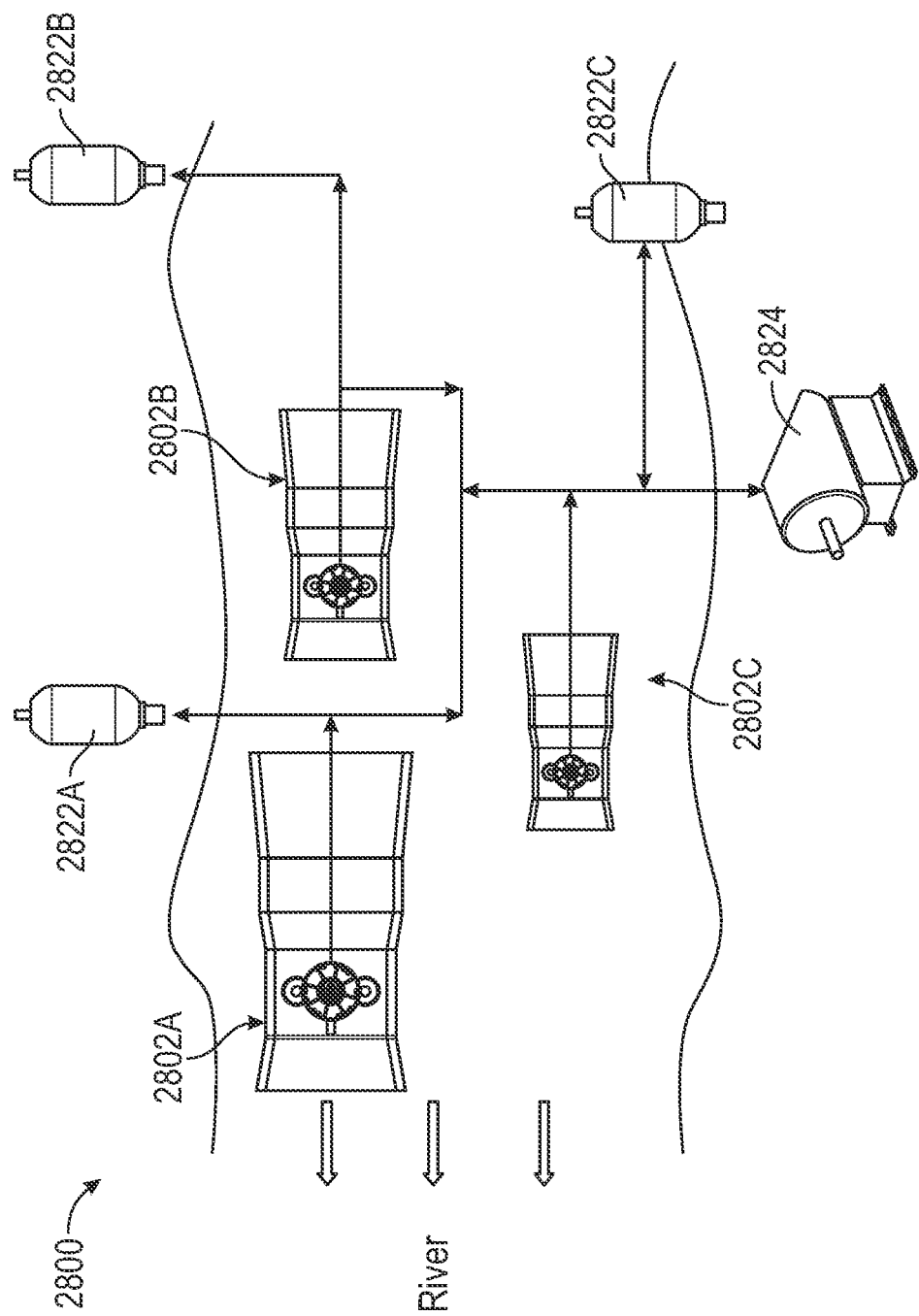
FIG. 41 is a highly schematic view of a river with another power system including one or more hydrokinetic turbines.

FIG. 41 shows yet a further hydrokinetic power system 2800 with various components previously described not explicitly shown. The system 2800 can utilize a plurality of turbines 2802A, 2802B and 2802C (such as described in FIGS. 38A-38F with the flow capturing apparatus 2601). The plurality of turbines 2802A, 2802B and 2802C need not be of different sizes or capacities from one another. The plurality of turbines 2802A, 2802B and 2802C can be used to selectively turn one or more generators 2824. The system 2800 can have a plurality of accumulators 2822A, 2822B and 2822C such as at least one associated with each plurality of turbines 2802A, 2802B and 2802C.

The various operation modes and systems (including those of FIGS. 40 and 41 and subsequently FIGURES) can allow for variation in power extraction in a range of 500% from a low water flow mode of operation (discussed previously) to a full water flow mode (full flood) mode of operation.

The plurality of turbines 2802A, 2802B and 2802C can be brought online for power generation together and in a lowest possible water flow velocity situation for power generation the turbines 2802A, 2802B and 2802C in combination turn the one or more generators 2824 to create electric power. As water flow velocity increases, one or more of the plurality of turbines 2802A, 2802B and 2802C can begin to send energy to the respective one or more of the plurality of accumulators 2822A, 2822B and 2822C for later regeneration use. Eventually, it may be possible at higher water flow velocity to selectively shut down one or more of the plurality of turbines 2802A, 2802B and 2802C. Eventually only one of the plurality of turbines 2802A, for example, may be utilized to turn the one or more generators 2824. If water flow velocity increases sufficiently even this turbine 2702A would have to be shut down. The system 2800 can then operate in a regeneration mode with one or more (or all) of the plurality of accumulators 2822A, 2822B and 2822C providing power to turn the one or more generators 2824 at the desired rate.

Figure 42:
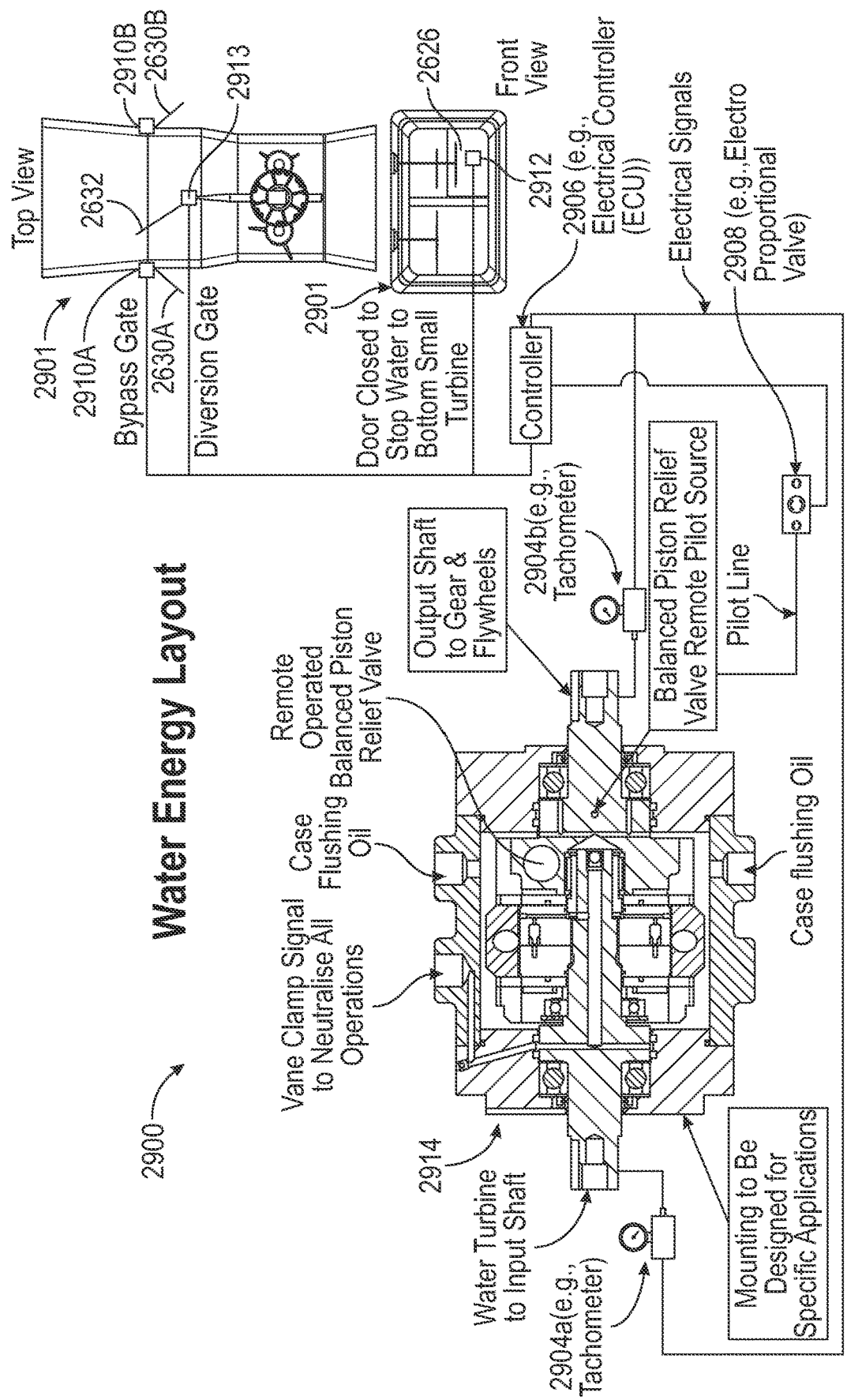
FIG. 42 is a schematic diagram of a river power generation, storage and regeneration system with only some aspects shown including a power split coupling, an electronic controller, a plurality of sensors, one or more valves and the water flow capturing apparatus of FIGS. 38A-38F.

FIG. 42 shows another rendering of a portion of a system 2900. The system 2900 does not show all possible contemplated components including pump/motor, flywheel(s), gearbox, generator, accumulator, etc. as shown with the system 2600 described and illustrated previously but rather focuses on some of the components including an electronic control system. The components of the system 2900 include a power split transmission coupling 2914 (e.g., similar or identical to one or both of power split transmission couplings 2614A and 2614B) and the flow capturing apparatus 2601. The system 2900 additionally includes a plurality of sensors 2904A and 2904B, a controller 2906, one or more valves 2908 and a plurality of actuators 2910A, 2910B, 2912 and 2913.

The sensors 2904A and 2904B can comprise tachometers or other type of suitable sensor that can provide sensing along shaft(s) or rotor(s) for the controller 2906. The sensors 2904A and 2904B can be electronic inputs for the controller 2906 for the various operation modes discussed subsequently. The controller 2906 can be in electrical communication with the plurality of sensors 2904A and 2904B, the one or more valves 2908 and the plurality of actuators 2910A, 2910B, 2912 and 2913. The sensors 2904A and 2904B can sense aspects of the input and output shafts to the power split transmission coupling 2914, rotors or other shafts in the system 2900 (or system 2600, for example). Such aspects can include rotational count, rotational speed of the input and/or output shaft or rotor, acceleration of the input and/or output shaft or rotor, or the like. The one or more valves 2908 can be controlled by the controller 2906 with input from the plurality of sensors 2904A and 2904B. The one or more valves 2908 can send a pilot or other signal to change the operation mode for the power split transmission coupling 2914. Such operation modes and pilot signals are discussed herein and in my prior patents and patent applications incorporated herein by reference. Thus, the controller 2906 can control operations of the power split transmission coupling 2914 and other components to the various modes of operation discussed herein.

The controller 2906 can also control operation of the flow capturing apparatus 2601 and the system 2900 to operate in the various modes discussed previously herein. To facilitate such control operation, the plurality of actuators 2910A, 2910B, 2912 and 2913 can be controlled electrically by the controller 2906.

The plurality of actuators 2910A, 2910B, 2912 and 2913 can include the actuator 2910A for the bypass gate 2630A and the actuator 2910E for the bypass gate 2630B. The actuator 2910A can, at an electronic signal from the controller 2906, open fully, partially close or fully close the bypass gate 2630A. Similarly, the actuator 2910B can, at an electronic signal from the controller 2906, open fully, partially close or fully close the bypass gate 2630B. The actuator 2912 can, at an electronic signal from the controller 2906, open fully, partially close or fully close slide door 2626. The actuator 2913 can, at an electronic signal from the controller 2906, actuate movement of the diversion gate 2632 as previously described.

The system 2900 can have various operation modes including those previously discussed herein. A further operation mode termed a first pulsing mode herein is also contemplated. This pulsing can involve controlling the power split coupling 2914 to facilitate speed variation (by accelerating and/or decelerating) the shaft to one or more of the flywheels 2618A, 2618B and/or one or both of the rotors 2604A and/or 2604B (and hence, the one or more of the plurality of blades 2606A, 2606B and/or 2606BB) within the flow capturing apparatus 2601. This first pulsing mode uses a pulse or pulses for a short duration (a burst, change or cyclical change in revolution speed simply termed a pulse herein) of a fraction of a second (0.01 to 0.99) to several seconds (1 second to 59 seconds) or for longer duration such as several minutes (1 minute to 100 minutes). This pulse(s) would change the rotational speed of the one or both of the rotors 2604A and/or 2604B and/or can change rotational speed (or maintain rotation) of the one or more of the flywheels 2618A, 2618B. The first pulsing mode can be used to match a desired speed provided by the flow velocity of water passing through the flow capture device 2901, for example. Additionally, or alternatively, the first pulsing mode can be used to match or maintain a desired speed for the one or more of the flywheels 2618A, 2618B (FIG. 38A) for power generation (as dictated by the generator). Flywheel(s) rotation can be transmitted via the power split coupling 2914 to the rotors 2604A and/or 2604B (and hence, the one or more of the plurality of blades 2606A, 2606B and/or 2606BB) as pulse(s) as described above. Power resulting from the first pulsing mode can be transmitted via the power split transmission coupling 2914, shafts, etc. to power rotation of one or more of the flywheels 2618A, 2618B (FIG. 38A) to keep rotating for power generation and/or can be fed back through the system (through the power split coupling 2914) to the rotors 2604A and/or 2604B (and hence, the one or more of the plurality of blades 2606A, 2606B and/or 2606BB).

In the first pulsing mode, the power split transmission coupling 2914 (and/or the one or both of power split transmission couplings 2614A and 2614B) can additionally be controlled by the controller 2906 (such as via the one or more valves 2908 via remote pressure control) to provide the pulse (or several pulses) to provide power to the one or more of the flywheels 2618A, 2618B (FIG. 38A) to maintain or facilitate desired rotation of the one or more of the flywheels 2618A, 2618B. Additionally, or alternatively, via the power split coupling 2914 power can be transmitted to the rotors 2604A and/or 2604B as pulse(s) as desired such as to maintain rotation of the rotors 2604A and/or 2604B.

In the first pulsing mode, pulsing can be timed or measured to be done in substantial unison with changes in river flow velocity using a flow sensor(s) within or adjacent the flow capturing apparatus 2601. The pulsing can vary proportionally to the water flow velocity. It is contemplated that the combination of the spinning rotors 2604A and/or 2604B (and hence, spinning of the one or more of the plurality of blades 2606A, 2606B and/or 2606BB) with the venturi as previously described can make water flow velocity increase, which can be advantageous at lower water flow velocity for power extraction.

A further second pulsing mode of operation, termed a second pulsing mode herein is also contemplated. This second pulsing mode of operation builds on the first pulsing mode and further includes the controller 2906 via the actuators 2910A and/or 2910B opening and/or closing the bypass gate 2630A and/or 2630B in substantial unison (harmony with or just fractions of a second off) with the pulse(s) described in the first pulsing mode. This coordination can allow for a higher volume of flow (at a higher water flow velocity) through the flow capturing apparatus 2601 to reach the rotors 2604A and/or 2604B (and hence, the one or more of the plurality of blades 2606A, 2606B and/or 2606BB). Thus, the opening of the bypass gate 2630A and/or 2630B by the actuators 2910A and/or 2910B at the behest of the controller 2906 can have a supercharger or turbocharger effect. Similarly, coordination by the controller 2906 of the actuators 2912 and 2913 is contemplated in further operation modes to further cause supercharging of water flow.

A third pulsing operation mode is contemplated. This third pulsing mode is identical to that of the second operation mode but the opening and/or closing the bypass gate 2630A and/or 2630B is timed to offset or substantially offset that of the pulse(s) described in the first pulsing mode. As an example, the pulsing of the power split coupling 2914 can be cycled in the manner of a sine wave. The opening of the bypass gate 2630A and/or 2630B can be in the manner of a cosine or sine wave that is out of phase (up to 180 degrees) to that of the sine wave of the power split coupling 2914 pulsing. This coordinated offset can provide stability to the system avoiding harmonics or other resonances.

Figure 42A:
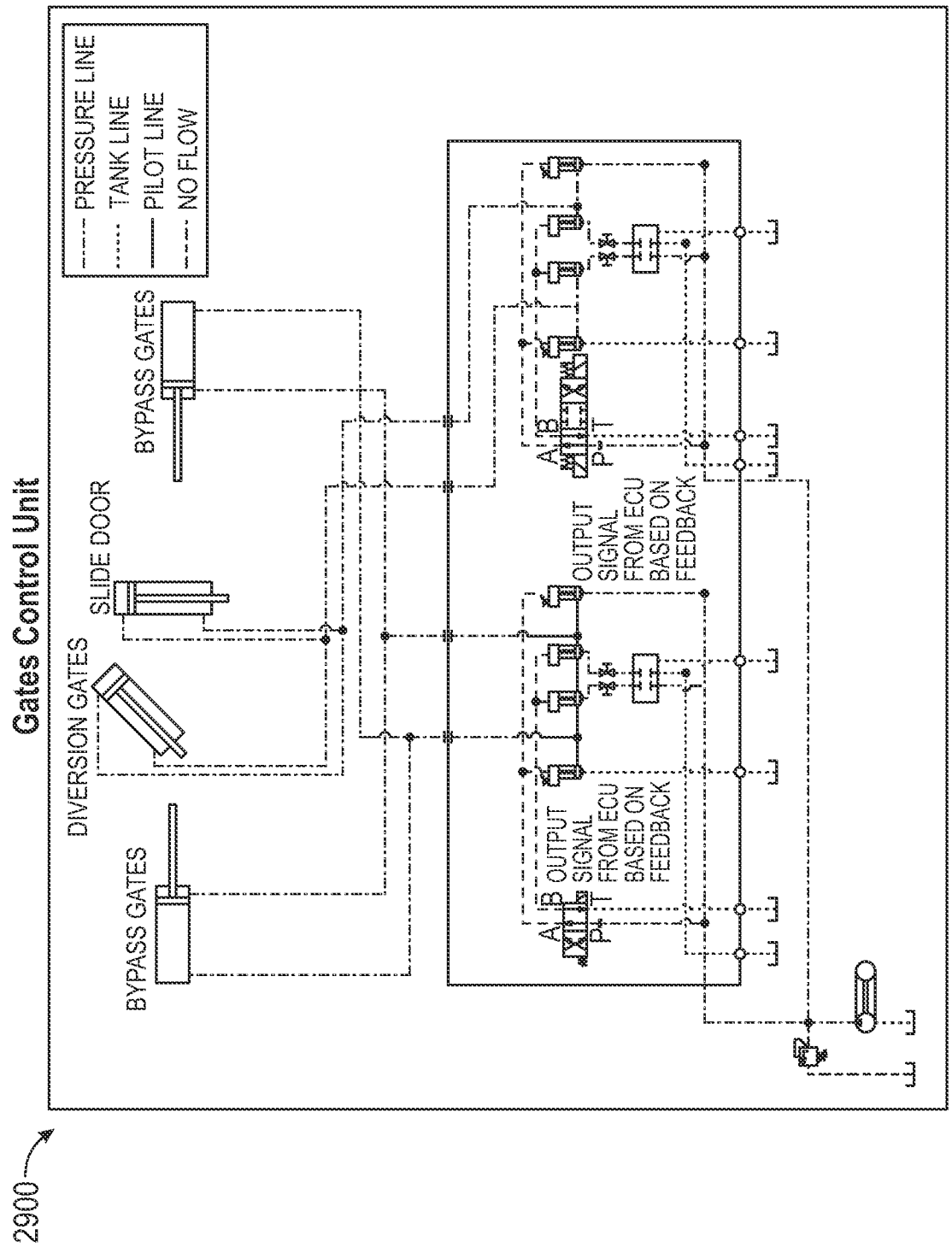
FIG. 42A is a schematic of a portion of the system of FIG. 42 where pressure lines and valves can be used for actuation according to some embodiments.

FIG. 42A shows control of the system 2900 can be via pressure lines and valves rather than by electronic control according to some embodiments.

Figure 43:
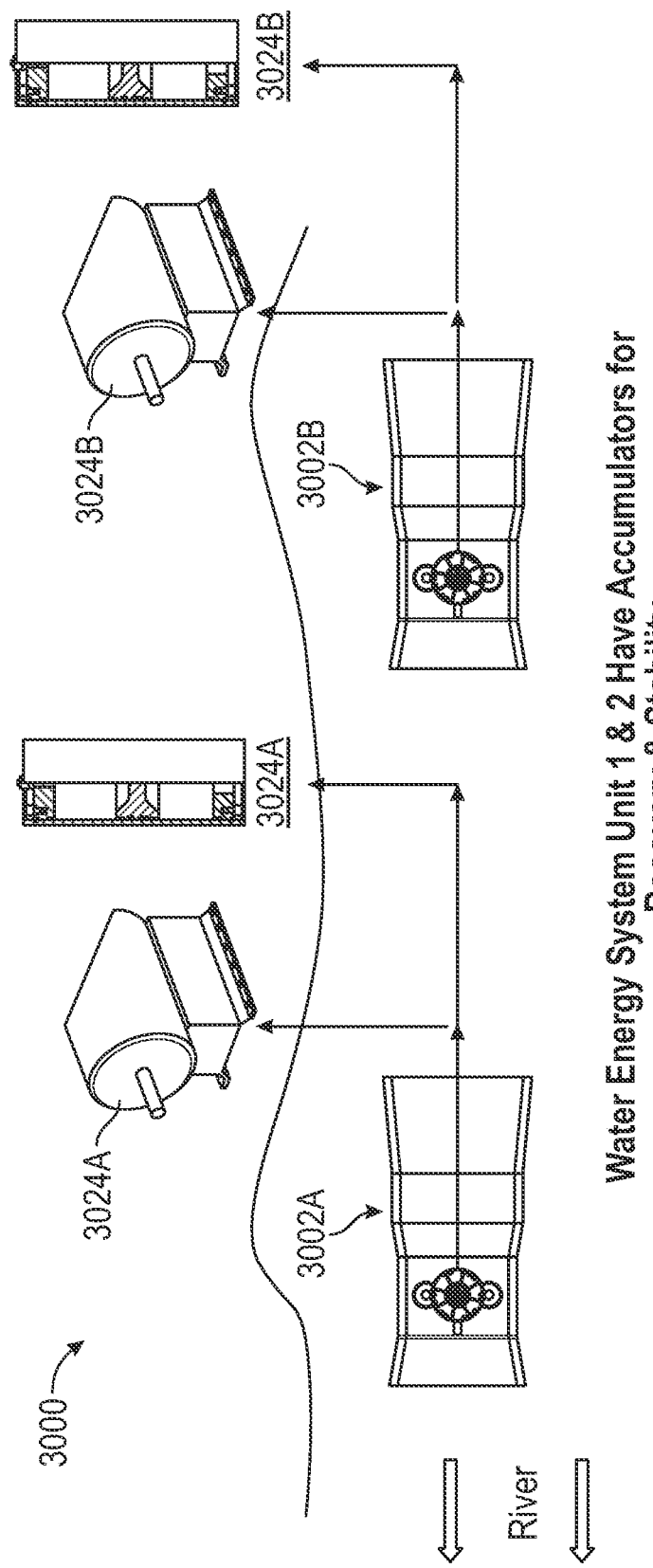
FIG. 43 is a highly schematic view of a river with another power system including one or more hydrokinetic turbines.

FIG. 43 shows yet a further hydrokinetic power system 3000 with various components previously described not explicitly shown. The system 3000 is very similar to those previously illustrated in reference to FIGS. 40 and 41. The system 3000 can utilize at least two turbines 3002A and 3002B (such as described in FIGS. 38A-38F with the flow capturing apparatus 2601). The at least two turbines 3002A and 3002B need not be of different sizes or capacities from one another. The at least two turbines 3002A and 3002B can be used to selectively turn two or more generators 3024A and 3024B. The system 3000 can have two or more accumulators 3022A and 3022B such as at least one associated with each of the turbines 3002A and 3002B.

Figure 43A:
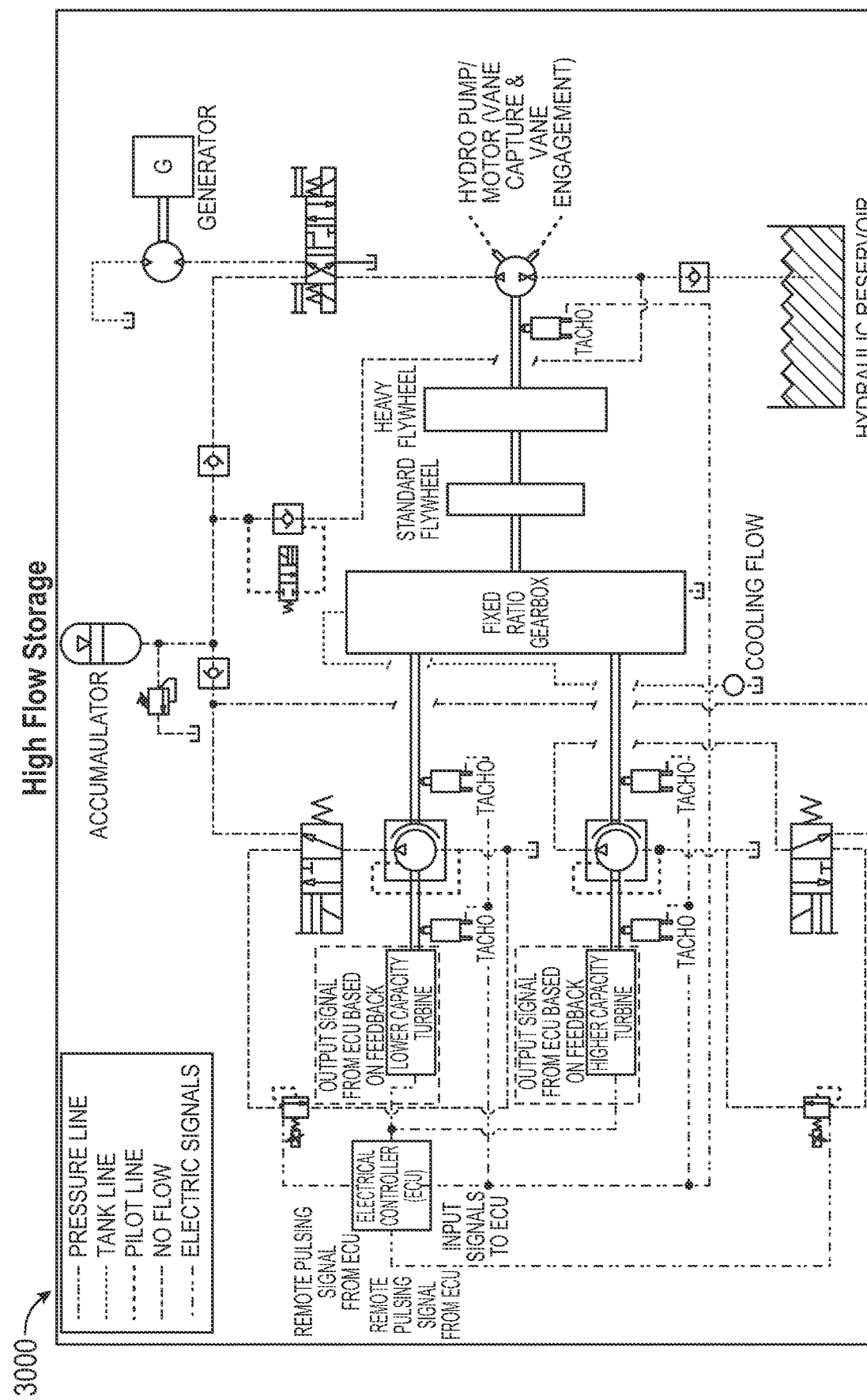
FIG. 43A is a schematic of a high flow storage mode of operation for the system of FIG. 43.
Figure 43B:
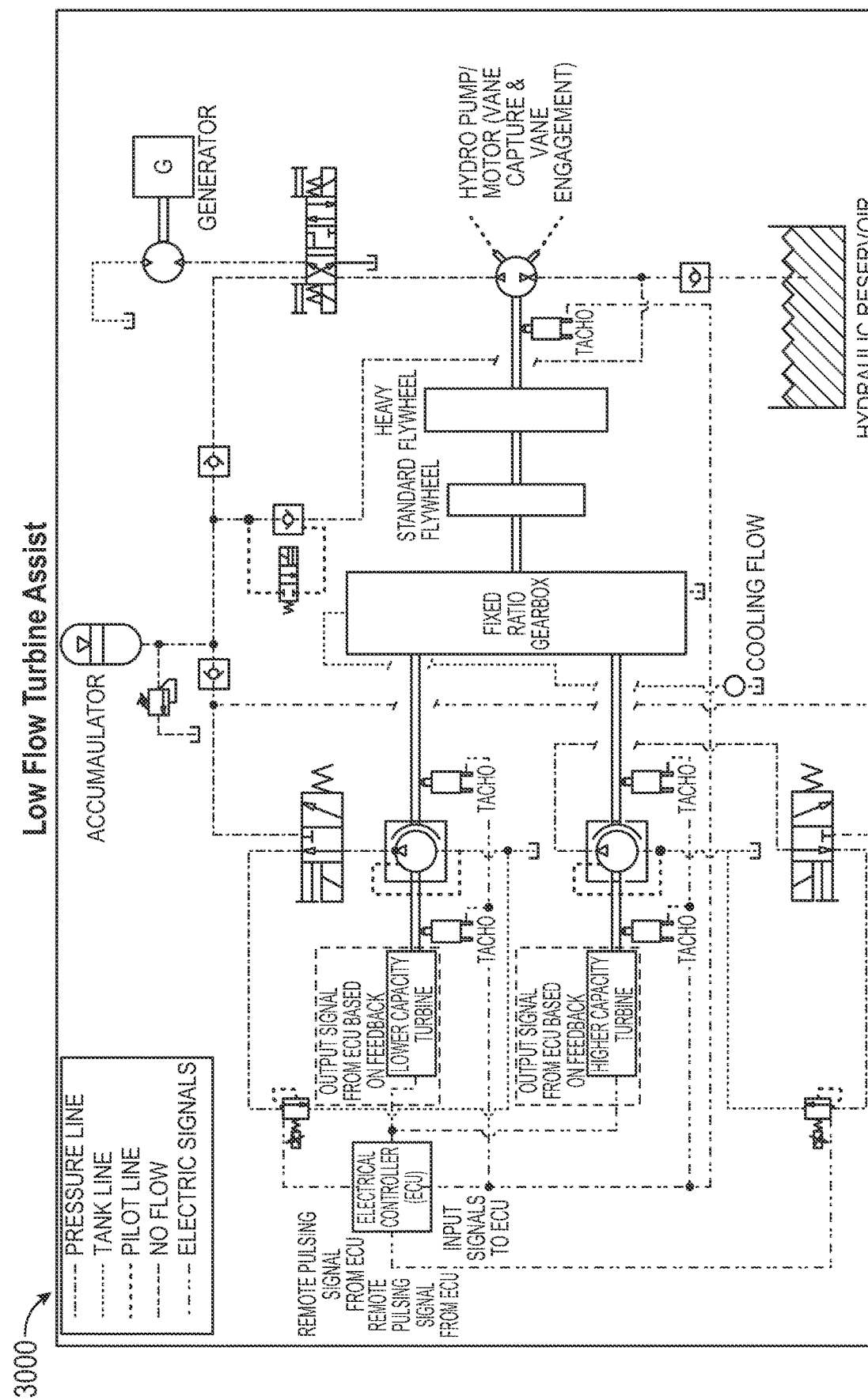
FIG. 43B is a schematic of a low flow turbine assist mode of operation for the system of FIG. 43.

FIGS. 43A and 43B show how the system 3000 operation can be coordinated in a high flow storage mode of operation (FIG. 43A) and a low water flow turbine assist mode of operation (FIG. 43B). Such coordination can be at the behest of a controller (such as electronic controller 3006). One or more of the high flow storage mode of operation (FIG. 43A) and the low water flow turbine assist mode of operation (FIG. 43B) can additionally employ the first, second, third or another pulsing mode of operation previously described in regards to FIG. 42.

Figure 44:
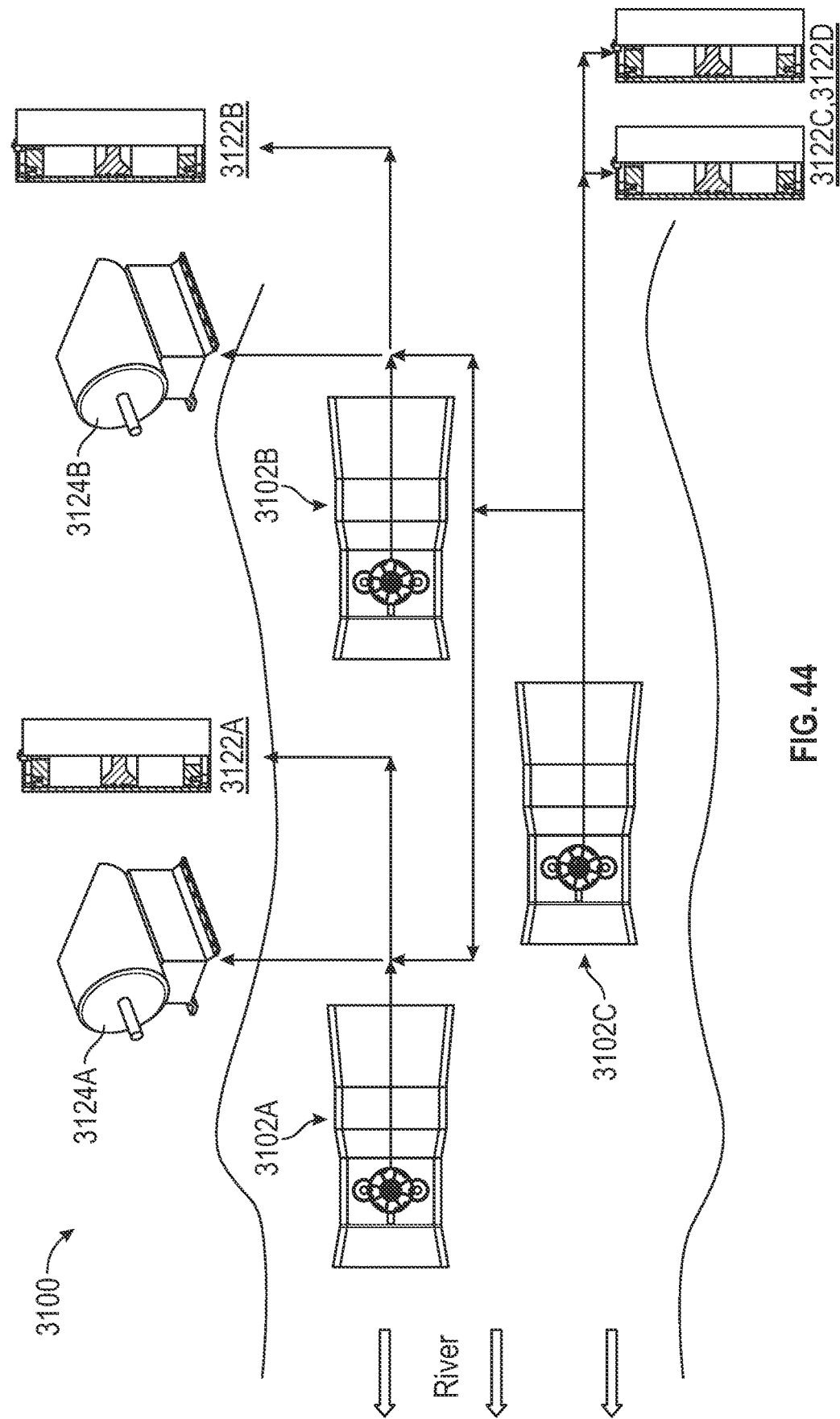
FIG. 44 is a highly schematic view of a river with another power system including one or more hydrokinetic turbines.

FIG. 44 shows yet a further hydrokinetic power system 3100 with various components previously described not explicitly shown. The system 3100 is very similar to that of the system of FIG. 41. The system 3100 can utilize a plurality of turbines 3102A, 3102B and 3102C (such as described in FIGS. 38A-38F with the flow capturing apparatus 2601). The plurality of turbines 3102A, 3102B and 3102C need not be of different sizes or capacities from one another. The plurality of turbines 3102A, 3102B can be used to selectively turn associated generators 3124A and 3124B. The turbine 3102C can be used to feed power to either (or both) of the generators 3124A and/or 3124B for stability and faster recovery for higher power production. The system 3100 can have a plurality of accumulators 3122A, 3122B, 3122C, 3122D, etc., such as at least one associated with each plurality of turbines 3102A, 3102B and 3102C. The accumulators 3122C and/or 3122D can be tapped to provide power to the generators 3124A and/or 3124B via one or more pump motors as previously described.

Figure 44A:
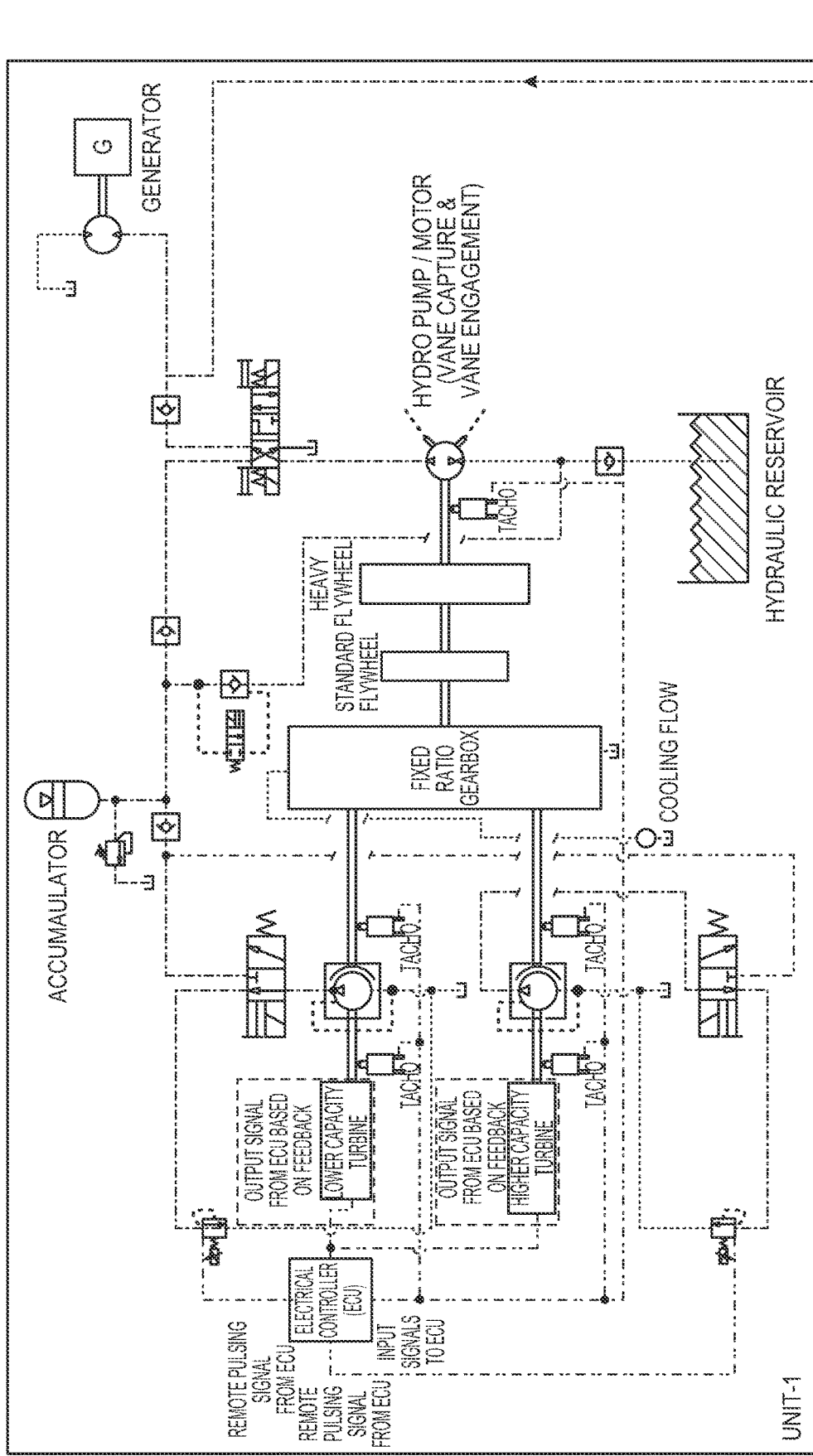
FIG. 44A is a schematic diagram of the system of FIG. 44 with a third turbine providing power to a first and second generator of the system.
Figure 44A:
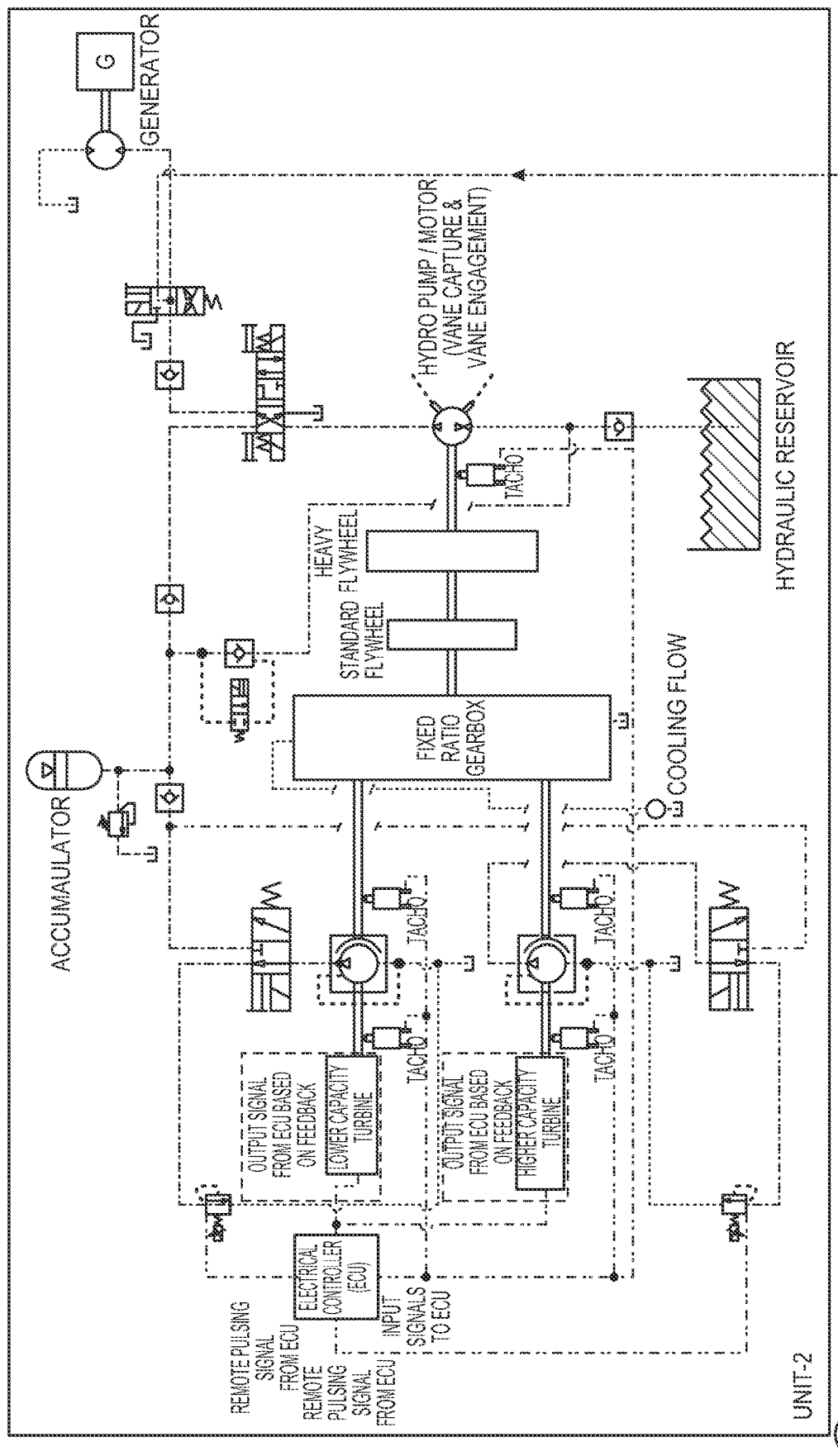
Figure 44A:
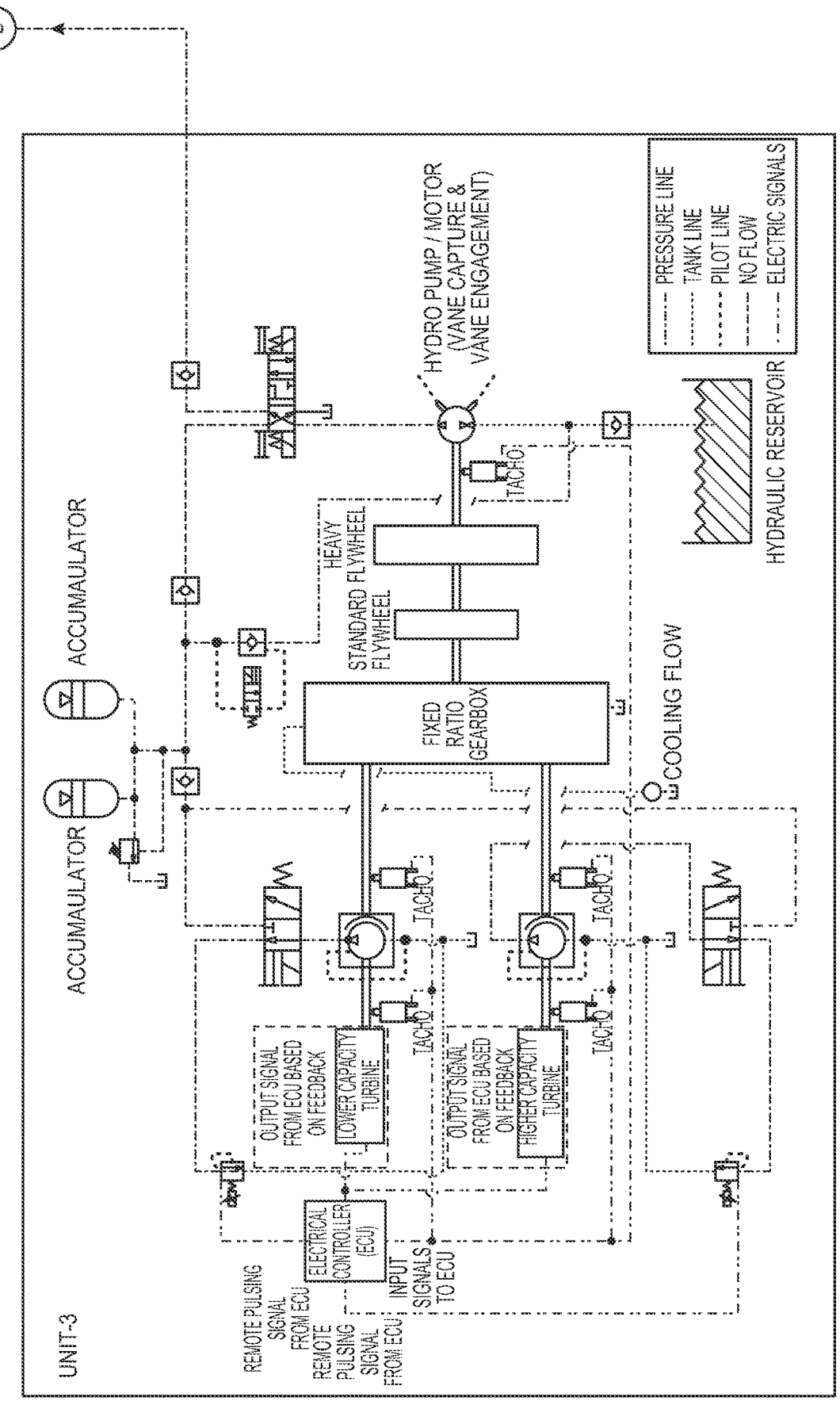

FIG. 44A shows a schematic of the system 3100 showing power from the turbine 3102C being supplied to the generators 3124A and 3124B.

Figure 45:
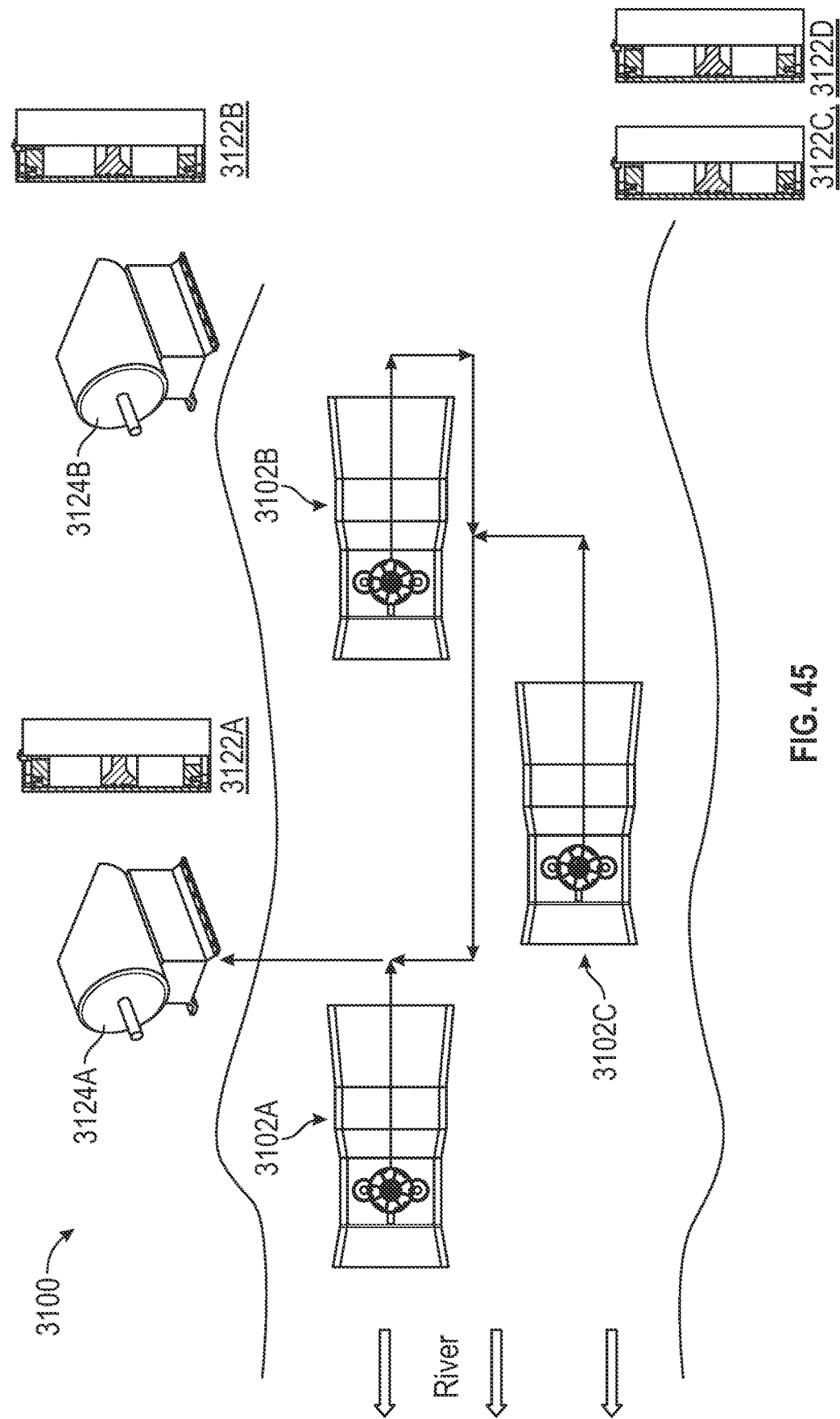
FIG. 45 is the system of FIG. 44 with the third turbine and the second turbine providing power only to the first generator of the system such as would occur in a low water velocity situation.
Figure 45A:
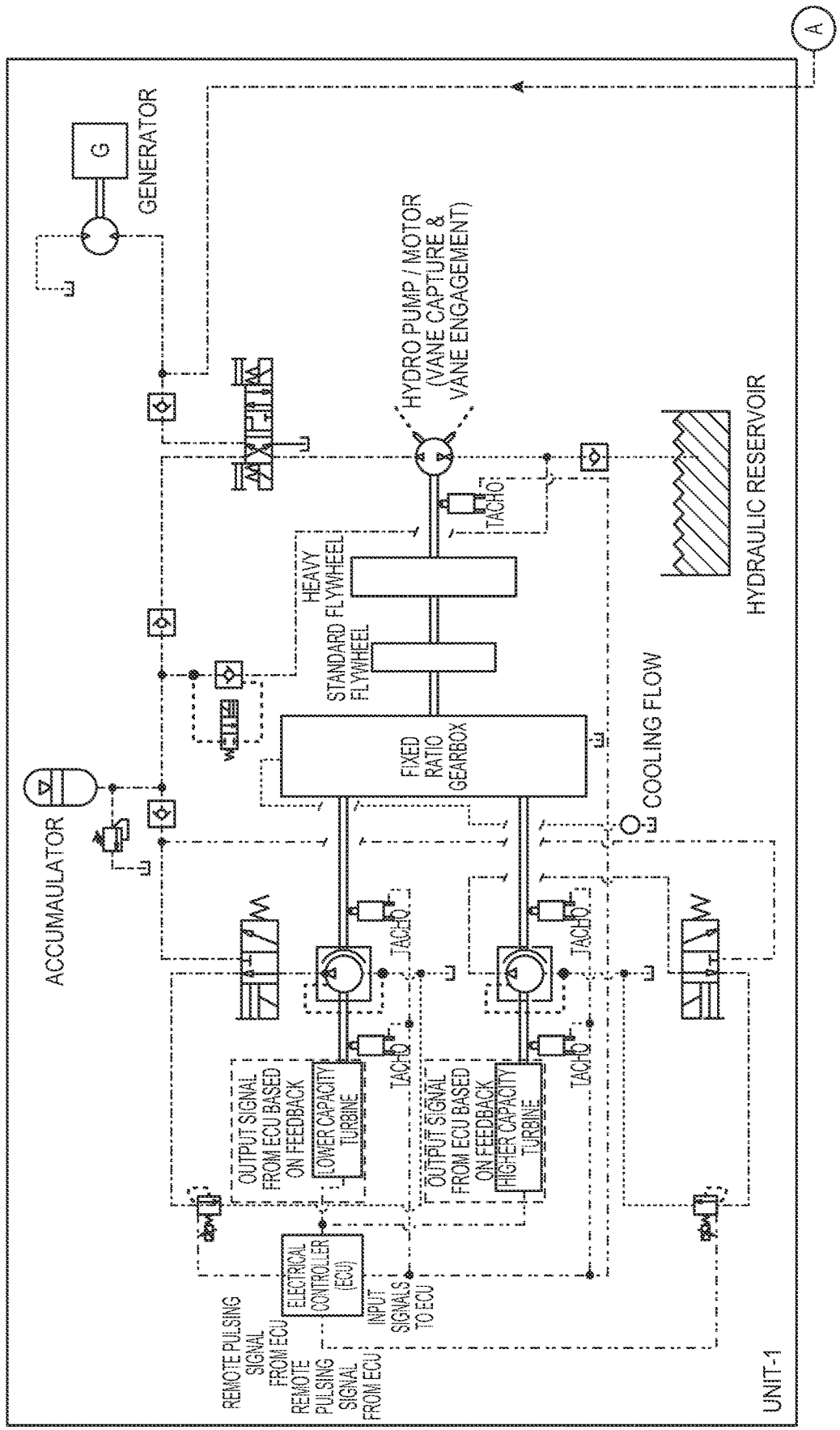
FIG. 45A is a schematic diagram of the system of FIG. 45 operating in the mode to provide power only to the first generator of the system such as would occur in a low water velocity situation.
Figure 45A:
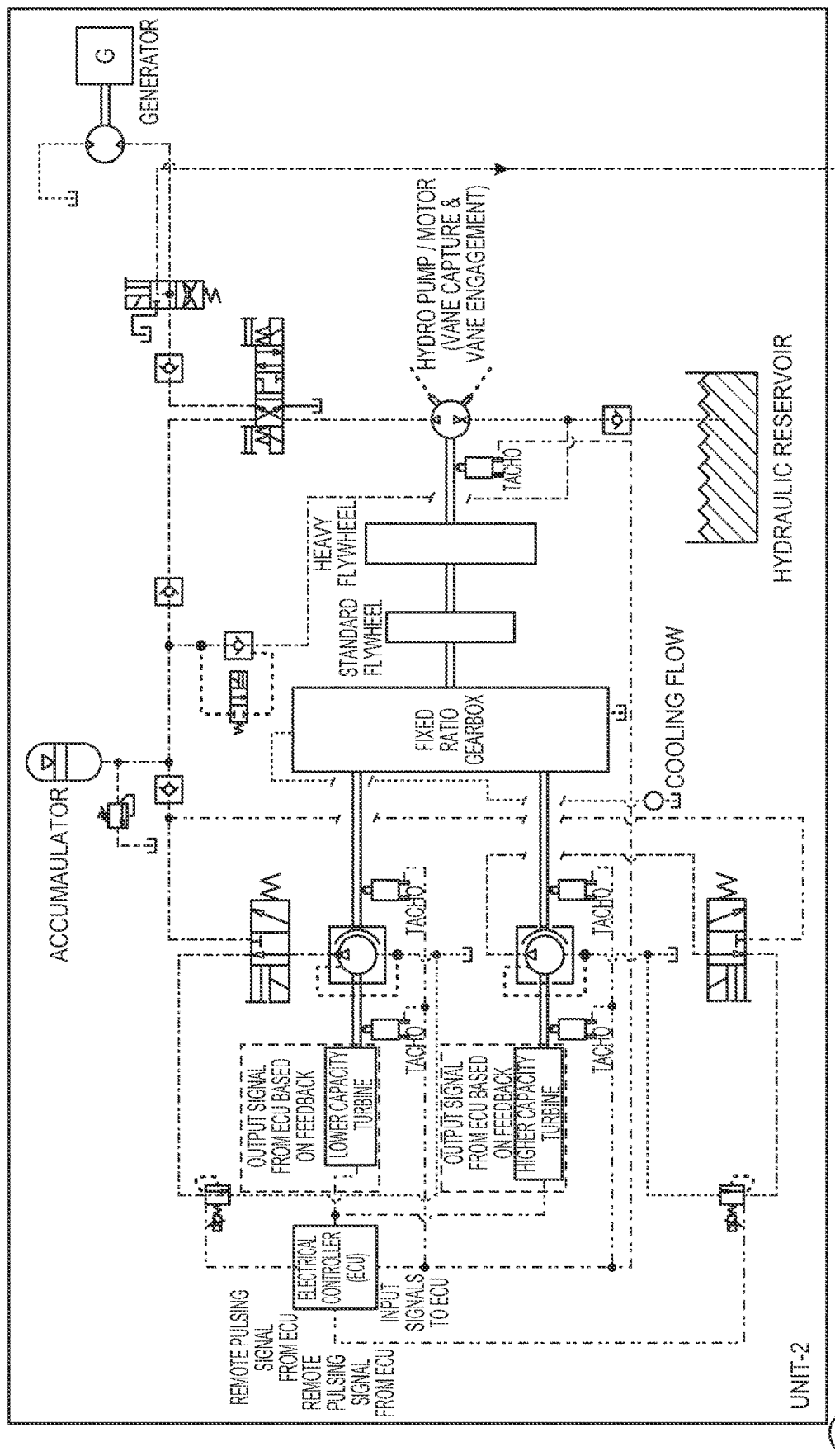
Figure 45A:
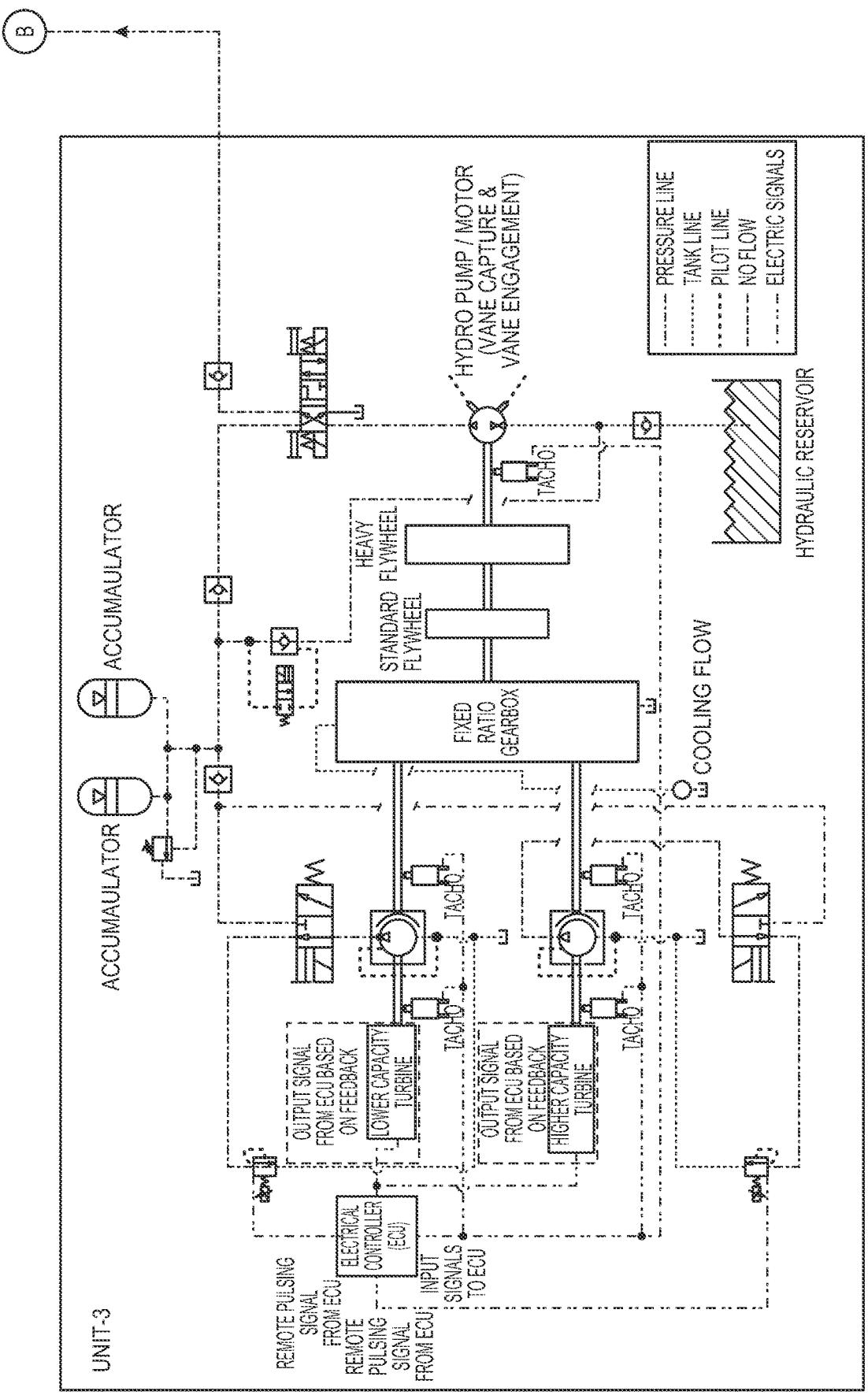

FIGS. 45 and 45A show the system 3100 of FIGS. 44 and 44A operating in a low water flow mode. In this mode, power from the turbines 3102B and 3102C is directed to the generator 3124A for electrical power production. The generator 3124B is not operated but rather is bypassed as power is diverted to turn the generator 3124A.

Each of these non-limiting examples (referred to as aspects and/or techniques) below can stand on its own, or can be combined in various permutations or combinations with one or more of the other examples.

In some aspects, the techniques described herein relate to a hydrokinetic turbine including: a water flow capturing apparatus having an outer nacelle, the outer nacelle having an inlet section and a second section with a reduced cross-sectional area relative to the inlet section; an inner wall within the outer nacelle, the inner wall dividing a cavity through the outer nacelle into at least a first flow passage and a second flow passage; a first plurality of blades and a first rotor positioned in the first flow passage; and a second plurality of blades and a second rotor positioned in the second flow passage.

In some aspects, the techniques described herein relate to a hydrokinetic turbine, wherein the second section is configured as a venturi and the first plurality of blades and the first rotor positioned in the venturi while in the first flow passage and the second plurality of blades and the second rotor are positioned in the venturi while in the second flow passage.

In some aspects, the techniques described herein relate to a hydrokinetic turbine, further including a diversion gate that articulates within the cavity to direct relatively more flow to one of the first flow passage or the second flow passage.

In some aspects, the techniques described herein relate to a hydrokinetic turbine, wherein the diversion gate blocks a substantial portion of a flow of water to one of the first flow passage or the second flow passage when articulated to a first position.

In some aspects, the techniques described herein relate to a hydrokinetic turbine, wherein the diversion gate is lockable in a neutral position so as not to divert relatively more of the flow of the water to the first flow passage or the second flow passage.

In some aspects, the techniques described herein relate to a hydrokinetic turbine, wherein the outer nacelle includes one or more bypass gates to allow a portion of a flow of water within the cavity to exit from the outer nacelle prior to entering one or both of the first flow passage or the second flow passage.

In some aspects, the techniques described herein relate to a hydrokinetic turbine, further including a slide door configured to be selectively moved into and out of the second flow passage.

In some aspects, the techniques described herein relate to a hydrokinetic turbine, wherein the second plurality of blades includes at least two sets of blades, wherein a first of the at least two sets of blades is spaced from a second of the at least two sets of blades by the second rotor.

In some aspects, the techniques described herein relate to a hydrokinetic turbine, wherein the slide door blocks a flow of water through a portion of the second flow passage such that at least one of the at least two sets of blades are not loaded by the flow of the water.

In some aspects, the techniques described herein relate to a system for use in power generation on a river, the system including: one or more hydrokinetic turbines configured to be turned by a flow of water along the river to generate a torque; one or more shafts coupled to the one or more hydrokinetic turbines; one or more flywheels coupled to the one or more shafts; a hydraulic fluid storage vessel configured to store a hydraulic fluid under pressure; a hydraulic motor including a motor output configured to receive the hydraulic fluid stored under pressure and generate a torque on the motor output in response; and a generator operatively coupled to an output shaft coupled to the one or more flywheels and the motor output, wherein the generator produces electrical power in response to at least one of: rotation of: the output shaft, the torque of the motor output, or both.

In some aspects, the techniques described herein relate to a system, further including one or more a power split transmission couplings configured to transmit the torque to the output shaft at an adjustable torque ratio and divert the hydraulic fluid in response to the output shaft exceeding a threshold power.

In some aspects, the techniques described herein relate to a system, further comprising an electronic controller coupled to the one or more power split transmission couplings, wherein the electronic controller is configured to control the one or more power split transmission couplings to pulse to change a rotational speed of at least one of the one or more flywheels and the one or more hydrokinetic turbines.

In some aspects, the techniques described herein relate to a system, wherein at least one of the one or more hydrokinetic turbines comprises:
 a water flow capturing apparatus having an outer nacelle, the outer nacelle having an inlet section and a second section with a reduced cross-sectional area relative to the inlet section;
 an inner wall within the outer nacelle, the inner wall dividing a cavity through the outer nacelle into at least a first flow passage and a second flow passage;
 a first plurality of blades and a first rotor positioned in the first flow passage; and
 a second plurality of blades and a second rotor positioned in the second flow passage.

In some aspects, the techniques described herein relate to a system, further comprising a diversion gate that at the behest of the electronic controller articulates within the cavity to direct relatively more flow to one of the first flow passage or the second flow passage.

In some aspects, the techniques described herein relate to a system, wherein the diversion gate blocks a substantial portion of a flow of water to one of the first flow passage or the second flow passage when articulated to a first position.

In some aspects, the techniques described herein relate to a system, wherein the outer nacelle includes one or more bypass gates to allow a portion of a flow of water within the cavity to exit from the outer nacelle prior to entering one or both of the first flow passage or the second flow passage, wherein the electronic controller is configured to actuate the one or more bypass gates to fully open, partially open or close in a coordinated manner with the pulse of the one or more power split transmission couplings.

In some aspects, the techniques described herein relate to a system, wherein the second plurality of blades includes at least two sets of blades, wherein a first of the at least two sets of blades are spaced from a second of the at least two sets of blades by the second rotor.

In some aspects, the techniques described herein relate to a system, wherein a slide door is moveable at a signal from the electronic controller to block a flow of water through a portion of the second flow passage such that at least one of the at least two sets of blades are not loaded by the flow of the water.

In some aspects, the techniques described herein relate to a system, further including a diversion gate that articulates within the cavity to direct relatively more flow to one of the first flow passage or the second flow passage.

In some aspects, the techniques described herein relate to a system, wherein the diversion gate blocks a substantial portion of a flow of water to one of the first flow passage or the second flow passage when articulated to a first position.

In some aspects, the techniques described herein relate to a system, wherein the outer nacelle includes one or more bypass gates to allow a portion of a flow of water within the cavity to exit from the outer nacelle prior to entering one or both of the first flow passage or the second flow passage.

In some aspects, the techniques described herein relate to a system, further including a slide door configured to be selectively moved into and out of the second flow passage.

In some aspects, the techniques described herein relate to a system, wherein the second plurality of blades includes at least two sets of blades, wherein a first of the at least two sets of blades is spaced from a second of the at least two sets of blades by the second rotor.

In some aspects, the techniques described herein relate to a system, wherein the slide door blocks a flow of water through a portion of the second flow passage such that at least one of the at least two sets of blades are not loaded by the flow of the water.

In some aspects, the techniques described herein relate to a system, wherein the power split transmission couplings include: a cam ring and a hub disposed between the one or more shafts and the output shaft, a hydraulic fluid disposed between the cam ring and the hub, wherein the hub includes a plurality of circumferentially spaced slots configured to house a plurality of vanes therein, the plurality of vanes configured to be movable between a retracted position, a fully extended position, or any partially extended position therebetween; in the retracted position, the one or more shafts are independently rotatable with respect to the output shaft; in the one or more extended positions, the plurality of vanes are configured to work the hydraulic fluid and transmit torque from the one or more shafts to the output shaft at an adjustable torque ratio; an inlet port communicatively coupled to a hydraulic fluid source, the hydraulic fluid transportable from the hydraulic fluid source to the one or more power split transmission couplings; and an outlet port having a closed configuration and an at least partially open configuration, the hydraulic fluid releasable from the power split transmission couplings through the outlet port in response to a power applied to the output shaft exceeding a threshold power, wherein the released hydraulic fluid exits the one or more power split transmission couplings and is stored under pressure.

In some aspects, the techniques described herein relate to a system for use in power generation on a river, the system including: one or more flow channels formed along the river, wherein the one or more flow channels divert an amount of flow of the river from a main flow of the river; one or more turbines positioned within the one or more flow channels, the one or more turbines each having a turbine rotor configured to produce a rotor torque in response to an applied loading by the flow of the river along the one or more flow channels.

In some aspects, the techniques described herein relate to a system, further including: a power split transmission coupling configured to transmit the rotor torque to an output shaft at an adjustable torque ratio and divert hydraulic fluid in response to the output shaft exceeding a threshold power; a hydraulic fluid storage vessel configured to store the diverted hydraulic fluid under pressure; a hydraulic motor including a motor output configured to receive the hydraulic fluid stored under pressure and generate a torque on the motor output in response; and a generator operatively coupled to the output shaft and the motor output, wherein the generator produces electrical power in response to at least one of rotation of: the output shaft, the torque of the motor output, or both.

In some aspects, the techniques described herein relate to a system, further including one or more bypass channels configured to divert an amount of the flow of the river that has entered the one or more flow channels from reaching the one or more turbines.

In some aspects, the techniques described herein relate to a system, further including one or more flow control valves positioned along the one or more bypass channels.

In some aspects, the techniques described herein relate to a system, wherein the one or more flow control valves are position adjustable to control an amount of the flow of the river through the one or more bypass channels.

In some aspects, the techniques described herein relate to a system, wherein the one or more flow channels include a venturi in a section thereof, and wherein the one or more turbines positioned within the venturi.

In some aspects, the techniques described herein relate to a system, wherein the one or more flow channels are configured to magnify the river flow along the one or more channels.

In some aspects, the techniques described herein relate to a system, wherein the one or more flow channels are at least partially formed by a bank of the river.

In some aspects, the techniques described herein relate to a system, wherein the one or more flow channels are one of circular or oval in cross-section.

In some aspects, the techniques described herein relate to a system, wherein the one or more flow channels have a serpentine shape along a length thereof.

In some aspects, the techniques described herein relate to a system, wherein the one or more flow channels include an inlet section that projects outward toward or into the main flow of the river.

In some aspects, the techniques described herein relate to a system, wherein the one or more flow channels have a convolute shape and include at least two restriction sections where the flow of the river through the one or more flow channels is restricted and at least one pool section where the flow of the river is relatively less restricted as compared to the flow in that at least two restriction sections.

In some aspects, the techniques described herein relate to a system, further including one or more wind turbines operatively coupled to the system.

In some aspects, the techniques described herein relate to a system, wherein the one or more flow channels are offset along a bank of the river from a main flow of the river.

In some aspects, the techniques described herein relate to a system, wherein the one or more flow channels include one or more enclosed tunnels.

In some aspects, the techniques described herein relate to a system, wherein the one or more flow channels are shaped by human activity in order to magnify the river flow into the one or more flow channels.

In some aspects, the techniques described herein relate to a system, wherein the power split transmission coupling includes: a cam ring and a hub disposed between an input shaft and the output shaft, a hydraulic fluid disposed between the cam ring and the hub, wherein the hub includes a plurality of circumferentially spaced slots configured to house a plurality of vanes therein, the plurality of vanes configured to be movable between a retracted position, a fully extended position, or any partially extended position therebetween; in the retracted position, the input shaft is independently rotatable with respect to the output shaft; in the one or more extended positions, the plurality of vanes are configured to work the hydraulic fluid and transmit torque from the input shaft to the output shaft at an adjustable torque ratio; an inlet port communicatively coupled to a hydraulic fluid source, the hydraulic fluid transportable from the hydraulic fluid source to the power split transmission coupling; an outlet port having a closed configuration and an at least partially open configuration, the hydraulic fluid releasable from the power split transmission coupling through the outlet port in response to a power applied to the output shaft exceeding a threshold power, wherein the released hydraulic fluid exits the power split transmission coupling and is stored under pressure.

In some aspects, the techniques described herein relate to a system, further including: a compressor configured to compress a gas; a plurality of pressure vessels one or more in selective communication with the compressor.

In some aspects, the techniques described herein relate to a method for operating a turbine for power generation using a flow of water of a river, the method. including: terraforming a hank of a river to form one or more flow channels there along; positioning the turbine within the one or more flow channels formed along the river, wherein the one or more flow channels divert an amount of flow of the river from a main flow of the river; and generating power by passing at least part of the flow of the one or more flow channels across the turbine.

In some aspects, the techniques described herein relate to a method, further including: adjusting a power split transmission coupling to transfer substantially all torque from a turbine rotor to a generator by working a hydraulic fluid, wherein the generator converts mechanical power to electrical power; diverting the hydraulic fluid at high pressure from the power split transmission coupling in response to the electrical power produced by the generator exceeding a threshold to maintain the electrical power produced by the generator at or below the threshold; storing the hydraulic fluid diverted from the power split transmission coupling under high pressure in a storage vessel; and introducing the hydraulic fluid stored at high pressure to a hydraulic motor in response to the generator producing below threshold electrical power, the hydraulic motor operatively coupled to the generator and configured to transmit mechanical power to the generator for electrical power generation.

In some aspects, the techniques described herein relate to a method, further including: compressing air; directing the air to a plurality of pressure vessels until a desired pressure in each of the plurality of pressure vessels is achieved; and communicating the air between and from the plurality of pressure vessels to store the hydraulic fluid and to introduce the hydraulic fluid to the hydraulic motor.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventor also contemplate examples in which only those elements shown or described are provided. Moreover, the present inventor also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The claimed invention is:

1. A system for use in power generation, the system comprising:
   a hydrokinetic turbine comprising:
      a water flow capturing apparatus having an outer nacelle, the outer nacelle having an inlet section and a second section with a reduced cross-sectional area relative to the inlet section;
      an inner wall within the outer nacelle, the inner wall dividing a cavity through the outer nacelle into at least a first flow passage and a second flow passage;
      a first plurality of blades and a first rotor positioned in the first flow passage; and
      a second plurality of blades and a second rotor positioned in the second flow passage;
      the hydrokinetic turbine being configured to be turned by a flow of water to generate a torque;
   one or more shafts coupled to the hydrokinetic turbine;
   one or more flywheels coupled to the one or more shafts;
   a hydraulic fluid storage vessel configured to store a hydraulic fluid under pressure;
   a hydraulic motor including a motor output configured to receive the hydraulic fluid stored under pressure and generate a torque on the motor output in response;
   a generator operatively coupled to an output shaft coupled to the one or more flywheels and the motor output, wherein the generator produces electrical power in response to at least one of rotation of: the output shaft, the torque of the motor output, or both;
   one or more power split transmission couplings configured to transmit the torque to the output shaft at an adjustable torque ratio and divert the hydraulic fluid in response to the output shaft exceeding a threshold power, wherein the one or more power split transmission couplings comprise:

a cam ring and a hub disposed between the one or more shafts and the output shaft, a hydraulic fluid disposed between the cam ring and the hub, wherein the hub includes a plurality of circumferentially spaced slots configured to house a plurality of vanes therein, the plurality of vanes configured to be movable between a retracted position, a fully extended position, or any partially extended position therebetween;

in the retracted position, the one or more shafts are independently rotatable with respect to the output shaft;

in the fully extended position and the any partially extended position therebetween, the plurality of vanes are configured to work the hydraulic fluid and transmit torque from the one or more shafts to the output shaft at an adjustable torque ratio;

an inlet port communicatively coupled to a hydraulic fluid source, the hydraulic fluid transportable from the hydraulic fluid source to the one or more power split transmission couplings; and an outlet port having a closed configuration and an at least partially open configuration, the hydraulic fluid releasable from the one or more power split transmission couplings through the outlet port in response to a power applied to the output shaft exceeding a threshold power, wherein the released hydraulic fluid exits the one or more power split transmission couplings and is stored under pressure.

2. The system of claim 1, further comprising an electronic controller coupled to the one or more power split transmission couplings, wherein the electronic controller is configured to control the one or more power split transmission couplings to pulse to change a rotational speed of at least one of the one or more flywheels and the hydrokinetic turbine.

3. The system of claim 2, further comprising:
a diversion gate that is controlled by the electronic controller to articulate within the cavity to direct relatively more flow to one of the first flow passage or the second flow passage, wherein the diversion gate blocks a substantial portion of a flow of water to one of the first flow passage or the second flow passage when the diversion gate is articulated to a first position;
wherein the second plurality of blades includes at least two sets of blades, wherein a first of the at least two sets of blades are spaced from a second of the at least two sets of blades by the second rotor;
a slide door is moveable at a signal from the electronic controller to block a flow of water through a portion of the second flow passage such that at least one of the at least two sets of blades are not loaded by the flow of the water;
wherein the outer nacelle includes one or more bypass gates to allow a portion of a flow of water within the cavity to exit from the outer nacelle prior to entering one or both of the first flow passage or the second flow passage, wherein the electronic controller is configured to actuate the one or more bypass gates to fully open, partially open or close in a coordinated manner with the pulse of the one or more power split transmission couplings.

4. The system of claim 1, wherein the second section is configured as a venturi and the first plurality of blades and the first rotor are positioned in the venturi in the first flow passage and the second plurality of blades and the second rotor are positioned in the venturi in the second flow passage.

5. The system of claim 1, further comprising a diversion gate that articulates within the cavity to direct relatively more flow to one of the first flow passage or the second flow passage.

6. The system of claim 5, wherein the diversion gate blocks a substantial portion of a flow of water to one of the first flow passage or the second flow passage when articulated to a first position.

7. The system of claim 6, wherein the diversion gate is lockable in a neutral position so as not to divert relatively more of the flow of the water to the first flow passage or the second flow passage.

8. The system of claim 1 wherein the outer nacelle includes one or more bypass gates to allow a portion of a flow of water within the cavity to exit from the outer nacelle prior to entering one or both of the first flow passage or the second flow passage.

9. The system of claim 1, further comprising a slide door configured to be selectively moved into and out of the second flow passage.

10. The system of claim 9, wherein the second plurality of blades includes at least two sets of blades, wherein a first of the at least two sets of blades is spaced from a second of the at least two sets of blades by the second rotor.

11. The system of claim 10, wherein the slide door blocks a flow of water through a portion of the second flow passage.

12. The system of claim 1, further comprising:
a flow channel, wherein the flow channel diverts an amount of flow from a main flow;
wherein the hydrokinetic turbine is positioned within the flow channel, the hydrokinetic turbine having a turbine rotor configured to produce a rotor torque in response to an applied loading by the flow along the flow channel.

* * * * *